(12) United States Patent
Wakizaka et al.

(10) Patent No.: US 9,279,913 B2
(45) Date of Patent: Mar. 8, 2016

(54) ANTIREFLECTIVE FILM, POLARIZING PLATE, AND IMAGE DISPLAY DEVICE

(75) Inventors: Daiki Wakizaka, Minami-Ashigara (JP); Miho Asahi, Minami-Ashigara (JP); Takato Suzuki, Minami-Ashigara (JP)

(73) Assignee: FUJIFILM Corporation, Tokyo (JP)

( * ) Notice: Subject to any disclaimer, the term of this patent is extended or adjusted under 35 U.S.C. 154(b) by 783 days.

(21) Appl. No.: 12/506,717

(22) Filed: Jul. 21, 2009

(65) Prior Publication Data

US 2010/0021694 A1    Jan. 28, 2010

(30) Foreign Application Priority Data

Jul. 22, 2008 (JP) ................ P2008-189152
Nov. 27, 2008 (JP) ................ P2008-302932

(51) Int. Cl.
| | |
|---|---|
| *B32B 27/30* | (2006.01) |
| *G02B 1/11* | (2006.01) |
| *C08F 136/16* | (2006.01) |
| *C08F 116/14* | (2006.01) |
| *C08L 27/12* | (2006.01) |
| *C08F 214/18* | (2006.01) |
| *G02B 1/111* | (2015.01) |
| *G02B 5/30* | (2006.01) |

(52) U.S. Cl.
CPC ............ *G02B 1/111* (2013.01); *G02B 5/3033* (2013.01); *Y10T 428/24612* (2015.01); *Y10T 428/24942* (2015.01); *Y10T 428/3154* (2015.04)

(58) Field of Classification Search
None
See application file for complete search history.

(56) References Cited

U.S. PATENT DOCUMENTS

| | | | |
|---|---|---|---|
| 5,194,990 A | 3/1993 | Boulos et al. | |
| 2005/0249942 A1* | 11/2005 | Coggio et al. | ................ 428/336 |
| 2006/0008652 A1* | 1/2006 | Araki et al. | ................ 428/421 |
| 2007/0086091 A1 | 4/2007 | Sawanobori et al. | |
| 2009/0274891 A1 | 11/2009 | Sawanobori et al. | |

FOREIGN PATENT DOCUMENTS

| | | | |
|---|---|---|---|
| JP | 3034044 B2 | | 4/2000 |
| JP | 2005-316350 A | | 11/2005 |
| JP | 2005-326713 A | | 11/2005 |
| JP | 2006-28280 A | | 2/2006 |
| JP | 2006028409 A | * | 2/2006 |
| JP | 2007-114772 A | | 5/2007 |
| JP | 2007-293313 A | | 11/2007 |
| JP | 2008-106036 A | | 5/2008 |
| WO | WO-03/022906 A1 | | 3/2003 |
| WO | WO 2006/009065 A1 | | 1/2006 |

OTHER PUBLICATIONS

Machine Translation of JP2006-028409. Retrieved Aug. 19, 2011.*
Machine Translation of JP2006-284761. Retrieved Nov. 16, 2011.*
Japanese Office Action dated Mar. 19, 2013 for Japanese Patent Application No. 2009-168470, with English translation.
Japanese Office Action for Japanese Application No. 2013-106545, dated Apr. 22, 2014, with an English translation.

* cited by examiner

*Primary Examiner* — Prashant J Khatri
(74) *Attorney, Agent, or Firm* — Birch, Stewart, Kolasch & Birch, LLP

(57) ABSTRACT

An antireflective film is provided, the antireflective film including: a transparent support; and at least one low refractive index layer, wherein the low refractive index layer is formed from a composition containing at least following (A) to (C): (A) a fluorine-containing antifouling agent having at least one polymerizable unsaturated group; (B) a fluorine-containing copolymer having at least one polymerizable unsaturated group; and (C) inorganic fine particles.

18 Claims, No Drawings

ANTIREFLECTIVE FILM, POLARIZING PLATE, AND IMAGE DISPLAY DEVICE

BACKGROUND OF THE INVENTION

1. Field of the Invention

The present invention relates to an antireflective film, a polarizing plate using the antireflective film, and an image display device using the antireflective film or the polarizing plate on the outermost surface of the display.

2. Description of the Related Art

Antireflective films are generally provided on the outermost surface of the display for reducing reflectivity using the principle of optical interference, in order to prevent contrast reduction or reflection of an image due to the reflection of the outside light in image display devices such as a cathode ray tube displays (CRT), plasma displays (PDP), electroluminescence displays (ELD), and liquid crystal devices (LCD). For this, the antireflective film is required to have a high antifouling property against fat and oil components such as those from a fingerprint, a sebaceous oil, and the like, high physical strengths (scratch resistance, and the like), a high permeation rate, chemical resistance, and weather resistance (moisture/heat resistance, light resistance), in addition to high antireflective performances.

As a technology for providing an antifouling property, there has been generally known a method in which a silicone compound having a polydimethylsiloxane structure or a fluorine-based compound is used to reduce the surface free energy of a coated film surface. For example, there has been suggested that a compound having a long-chained fluorine-containing polyether chain and an unsaturated double bond in an antireflective film so as to provide an antifouling performance while not deteriorating the low refractive index and not reducing the rigidity could be used (Pamphlet of International Publication No. 03/022906). However, this compound does not necessarily satisfy the low refractive index property, the scratch resistance, and the antifouling durability, and therefore, there has been room for improvement.

Further, in the antireflective films as described above, at least a low refractive index layer which is a thin film layer having a thickness of 200 nm or less is provided on the outermost surface, and antireflection is performed by the optical interference of the low refractive index layer. However, in the case of a one-layer thin film interference type for performing antireflection on one layer of the low refractive index layers which have the simplest structure, there is no practical low refractive index material satisfying a reflectivity of 0.5% or less and further, having a neutral color tint, high scratch resistance, chemical resistance, and weather resistance. On the contrary, there have been known a multi-layer thin film interference type antireflective film for preventing the reflection by multi-layer optical interference, such as a two-layer thin film interference type for forming a high refractive index layer between a transparent support and a low refractive index layer, a three-layer thin film interference type for forming a medium refractive index layer and a high refractive index layer in this order between a transparent support and a low refractive index layer, and the like, so as to attain a reflectivity of 0.5% or less. In particular, the three-layer thin film interference type is preferred since it prevents the reflection at a wide wavelength range and gives a low reflectivity while inhibiting the reflected color.

In the case of a mono-layer, a layer having a lower refractive index than that of the substrate (low refractive index layer) may be formed to, in terms of optical layer thickness, a thickness of about ¼ of the designed wavelength. Furthermore, when further reduction of the reflection is required, it is known to form a layer having a refractive index higher than that of the substrate (high refractive index layer) between the substrate and the layer having a low refractive index (U.S. Pat. No. 3,034,044).

However, such a multilayer-type antireflective film can reduce the reflection, but a variation in the layer thickness or the refractive index of each of the layers leads to a change in the reflected colors. Particularly, if a fingerprint or a sebaceous oil is attached on the surface of a coated film, even if it is wiped off, some residue of the fat and oil components, if any, remains, and thus, are noticeable by the eyes because the attachment trace is more readily recognized as the change in the color tints, as compared to a mono-layer, from the change in the refractive index, and reduces the perceivability of the image. By this, in conventional multi-layer type antireflective films, even when the fluorine-containing compound having water/oil repellency or the silicone compound having a polydimethylsiloxane structure as above is used, the antifouling property could not be satisfied.

SUMMARY OF THE INVENTION

The present invention aims to provide an antireflective film having a low refractive index, an excellent antifouling property and scratch resistance.

The present inventors have made extensive studies in order to solve the above-described problems, and as a result, they have found that the purposes can be attained by solving the problems by the constitutions as below, thereby leading to the completion of the present invention.

(1) An antireflective film, including:
a transparent support; and
at least one low refractive index layer,
wherein the low refractive index layer is formed from a composition containing following (A) to (C):
(A) a fluorine-containing antifouling agent having at least one polymerizable unsaturated group;
(B) a fluorine-containing copolymer having at least one polymerizable unsaturated group; and
(C) inorganic fine particles.

(2) The antireflective film as described in item (1) above, wherein the fluorine-containing antifouling agent having a polymerizable unsaturated group (A) has a perfluoropolyether structure, and a plurality of polymerizable unsaturated groups in one molecule of the fluorine-containing antifouling agent.

(3) The antireflective film as described in item (2) above, wherein the plurality of polymerizable unsaturated groups is four or more.

(4) The antireflective film as described in any of items (1) to (3) above,
wherein the fluorine-containing antifouling agent having a polymerizable unsaturated group (A) has a weight average molecular weight of 400 or more and less than 5000.

(5) The antireflective film as described in any of items (1) to (4) above,
wherein the fluorine-containing copolymer having a polymerizable unsaturated group (B) has a weight average molecular weight of 5000 or more and less than 500000.

(6) The antireflective film as described in any of items (1) to (5) above,
wherein the inorganic fine particles (C) are hollow silica particles.

(7) The antireflective film as described in any of items (1) to (6) above, wherein the composition further contains a polyfunctional monomer having 3 or more polymerizable unsaturated groups (D).

(8) The antireflective film as described in item (7) above, wherein the polyfunctional monomer having 3 or more polymerizable unsaturated groups (D) is represented by formula (1):

$$Rf^2\{-(L)_m-Y\}_n \quad \text{formula (1)}$$

wherein $Rf^2$ represents an n-valent group having at least a carbon atom and a fluorine atom;
n represents an integer of 3 or more;
L represents a single bond or a divalent linking group;
m represents 0 or 1; and
Y represents a polymerizable unsaturated group, and
wherein the polyfunctional monomer contains 35% by weight or more of fluorine and has a calculated value of entire intercrosslink molecular weight of less than 500.

(9) The antireflective film as described in item (8) above, wherein the polyfunctional monomer represented by formula (1) is represented by formula (2) or formula (3):

$$Rf^2-\{CH_2-OC(O)CH=CH_2\}_n \quad \text{formula (2)}$$

$$Rf^2-\{C(O)OCH=CH_2\}_n \quad \text{formula (3)}$$

wherein $Rf^2$ represents an n-valent group consisting of a carbon atom(s) and a fluorine atom(s), or an n-valent group consisting of a carbon atom(s), a fluorine atom(s) and an oxygen atom(s); and n represents an integer of 3 or more.

(10) The antireflective film as described in item (8) above, wherein the polyfunctional monomer represented by formula (1) is represented by formula (4) or formula (5):

$$Rf^{21}-\{Rf^{22}-CH_2-OC(O)CH=CH_2\}_n \quad \text{formula (4)}$$

$$Rf^{21}-\{Rf^{22}-C(O)OCH=CH_2\}_n \quad \text{formula (5)}$$

wherein $Rf^{21}$ represents an n-valent group having at least a carbon atom and a fluorine atom; $Rf^{22}$ represents a divalent group having at least a carbon atom and a fluorine atom; and n represents an integer of 3 or more.

(11) The antireflective film as described in any of items (1) to (10) above,
wherein color tint of regular reflecting light for incident light at an angle of 5° of a CIE standard light source D65 in a wavelength region from 380 to 780 nm satisfies following conditions that a* value and b* value in CIE1976 L*a*b* color space are in ranges of 0≤a*≤8 and −10≤b*≤0, respectively, and within this color tint variation range, a color difference ΔE due to 2.5% variation in a thickness of an arbitrary layer out of the layers contained in the antireflective film falls in a range of equation (5):

$$\Delta E=\{(L^*-L^{*'})^2+(a^*-a^{*'})^2+(b^*-b^{*'})^2\}^{1/2}\leq 3 \quad \text{equation (5)}$$

wherein $L^{*'}$, $a^{*'}$, and $b^{*'}$ are color tints of reflected light at a designed film thickness.

(12) The antireflective film as described in any of items (1) to (11) above,
a medium refractive index layer and a high refractive index layer, the antireflective film comprising the medium refractive index layer, the high refractive index layer,
and the low refractive index layer in this order from a side of the transparent support,
wherein the medium refractive index layer has a refractive index at a wavelength of 550 nm of 1.60 to 1.65 and a thickness of 50.0 nm to 70.0 nm,
the high refractive index layer has a refractive index at a wavelength of 550 nm of 1.70 to 1.74 and a thickness of 90.0 nm to 115.0 nm, and the low refractive index layer has a refractive index at a wavelength of 550 nm of 1.33 to 1.38 and a thickness of 85.0 nm to 95.0 nm.

(13) The antireflective film as described in any of items (1) to (12) above,
wherein at least one of the medium refractive index layer and the high refractive index layer contains conductive inorganic fine particles.

(14) The antireflective film as described in any of items (1) to (13) above,
wherein the conductive inorganic fine particles contain at least one metal oxide selected from the group consisting of tin-doped indium oxide, antimony-doped tin oxide, fluorine-doped tin oxide, phosphorous-doped tin oxide, zinc antimonate, indium-doped zinc oxide, zinc oxide, ruthenium oxide, rhenium oxide, silver oxide, nickel oxide, and copper oxide.

(15) A polarizing plate, including:
a polarizing film; and
two protective films that protect both sides of the polarizing film,
wherein at least one of the two protective films is the antireflective film as described in any of items (1) to (14) above.

(16) An image display device, including:
a display; and
the antireflective film as described in any of items (1) to (14) or the polarizing plate as described in item (15) above which is provided at an outermost surface of the display.

DETAILED DESCRIPTION OF THE INVENTION

Hereinbelow, the present invention will be described. However, the present invention is not limited to the description below. Further, in the present specification, in cases where the numeral values denote physical property values, characteristic values, or the like, an expression "(numeral value 1) to (numeral value 2)" means "(numeral value 1) or more and (numeral value 2) or less". Further, in the present specification, an expression "(meth)acrylate" means "at least one of acrylate and methacrylate". The same shall apply to "(meth)acrylic acid", and the like.

The antireflective film of the present invention is characterized by having at least one low refractive index layer on a transparent substrate film, wherein the low refractive index layer is formed of a coating composition (composition for low refractive index layer) containing at least the following (A) to (C):

(A) a fluorine-containing antifouling agent having a polymerizable unsaturated group,
(B) a fluorine-containing copolymer having a polymerizable unsaturated group, and
(C) an inorganic fine particle.

Hereinbelow, the antireflective film of the present invention will be described in detail.

(A) Fluorine-Containing Antifouling Agent having Polymerizable Unsaturated Group The low refractive index layer of the present invention contains a fluorine-containing antifouling agent as an essential component for the purpose of imparting an antifouling property, water resistance, chemical resistance, slipperiness, and the like. Further, the fluorine-containing antifouling agent is characterized by having a polymerizable unsaturated group, whereby the inhibition of the backside transfer of a fluorine compound when a coated product is stored in the roll state, the enhancement of the scratch resistance of a coated film, and the durability caused by repeatedly wiping off a stain can be improved. Conventionally, it has been known to use a silicone compound having a dimethylsiloxane structure so as to exhibit an antifouling property, but a fluorine-containing antifouling agent may be used to exhibit a better antifouling property in some cases. The fluorine-containing antifouling agent having a polymerizable unsaturated group is an antifouling agent comprising a fluorine-based compound, and the polymerizable unsaturated group is not particularly limited, but it is preferably a functional group having an unsaturated double bond, and most preferably a methacryloyloxy group or an acryloyloxy group.

The fluorine-based compound is preferably a compound containing a fluoroalkyl group. The fluoroalkyl group preferably contains 1 to 20 carbon atoms, and more preferably 1 to 10 carbon atoms, and may have a straight chain structure (for example, —$CF_2CF_3$, —$CH_2(CF_2)_4H$, —$CH_2(CF_2)_8CF_3$, —$CH_2CH_2(CF_2)_4H$, and the like), a branched structure (for example, $CH(CF_3)_2$, $CH_2CF(CF_3)_2$, $CH(CH_3)CF_2CF_3$, $CH(CH_3)(CF_2)_5CF_2H$, and the like), an alicyclic structure (preferably, a 5- or 6-membered ring, for example, a perfluorocyclohexyl group, a perfluorocyclopentyl group, or may be a substituted alkyl group thereof, and the like), or an ether bond (for example, $CH_2OCH_2CF_2CF_3$, $CH_2CH_2OCH_2C_4F_8H$, $CH_2CH_2OCH_2CH_2C_8F_{17}$, $CH_2CH_2OCF_2CF_2OCF_2CF_2H$, and the like). A plurality of the fluoroalkyl groups may be contained in the same molecule.

Fluorine-containing antifouling agent having polymerizable unsaturated group (A) having a perfluoro polyether structure and more than one polymerizable unsaturated group in one molecule is preferable, because stains are easily wiped out (especially when wipe off a finger print) and durability against wipe is excellent. Fluorine-containing antifouling agent having polymerizable unsaturated group (A) having more than four polymerizable unsaturated groups in one molecule is more preferable.

It is preferable that the fluorine-based compound has a substituent which contributes bond formation or compatibility with the fluorine-containing copolymer having a polymerizable unsaturated group (B), as described later, to form a coating of a low refractive index layer. The substituents may be the same as or different from each other, and the number thereof is preferably at least two. Examples of the preferable substituents include an acryloyl group, a methacryloyl group, a vinyl group, an aryl group, a cinnamoyl group, an epoxy group, an oxethanyl group, a hydroxyl group, a polyoxyalkylene group, a carboxyl group, an amino group, and the like.

The fluorine-based compound may be a polymer or oligomer with a fluorine atom-free compound, and is not particularly limited in the molecular weights. The fluorine atom content in the fluorine-based compound is not particularly limited, but it is preferably 20% by mass or more, particularly preferably from 30 to 70% by mass, and most preferably from 40 to 70% by mass. Examples of the preferable fluorine-based compound include, but are not limited to, R-2020, M-2020, R-3833, M-3833, and Optool DAC (all trade names), manufactured by Daikin Industries, Ltd., and Megafac F-171, F-172, F-179A, and Defensa MCF-300 and MCF-323 (all trade names), manufactured by Dainippon Ink & Chemicals, Inc.), and the like.

In the present invention, the compound in which the polymerizable unsaturated group is a (meth)acryloyloxy group may have a plurality of (meth)acryloyloxy groups. By allowing the fluorine-containing antifouling agent to have a plurality of (meth)acryloyloxy groups, it shows a three dimensional web structure, when cured, and has a high glass transition temperature (Tg) and low transfer property of an antifouling agent, and its durability can be improved by repeatedly wiping stains off. Further, a cured coating film having excellent heat resistance, weather resistance, and the like can be obtained.

The weight average molecular weight of the fluorine-containing antifouling agent having a polymerizable unsaturated group (A) is preferably 400 or more and less than 5000, more preferably 800 or more and less than 4000, and most preferably 1000 or more and less than 3000. If the weight average molecular weight is less than 5000, white turbidity is less likely to occur, which is thus preferable, since compatibility with the fluorine-containing copolymer having a polymerizable unsaturated group is good. Further, if the weight average molecular weight is 400 or more, the antifouling property is exhibited, which is thus preferable.

Further, in the present invention, preferred embodiments of the fluorine-containing compound having a polymerizable unsaturated group include a compound represented by the following formula (F).

$$(Rf^1)—[(W)—(R_A)_n]_m \quad \text{formula (F)}$$

In formula (F), Rf represents a (per)fluoroalkyl group or a (per)fluoropolyether group, W represents a single bond or a linking group, $R_A$ represents a functional group having an unsaturated double bond, n represents an integer of 1 to 3, and m represents an integer of 1 to 3.

In formula (F), as $Rf^1$, a (per)fluoropolyether group is preferred since it allows a fingerprint to be easily wiped off; n is preferably 2 to 3, and most preferably 3; m is preferably 2 to 3. If n and m are each 2 to 3, the fluorine-containing antifouling agent is strongly fixed on the low refractive index layer, and therefore, durability caused by wiping off a stain such as from a magic marker or a fingerprint is excellent. Particularly when the coated film is subjected to a saponification treatment, the wiping-off durability is excellent, which is thus preferable.

In the compound represented by the formula (F), W represents, for example, alkylene, arylene, heteroalkylene, or a combined linking group thereof. These may further contain each of the structures such as carbonyl, carbonyloxy, carbonylimino, urethane, ester, amide, sulfoneamide, and the like, and a linking group having a combined structure thereof.

As the functional group ($R_A$) having an unsaturated double bond, the following can be preferably used.

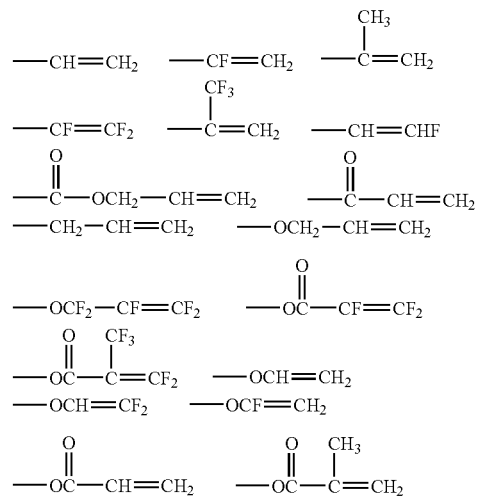

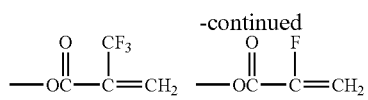

Further, ($R_A$) may have a plurality of unsaturated double bonds, and examples of the structure preferably include the following structures:

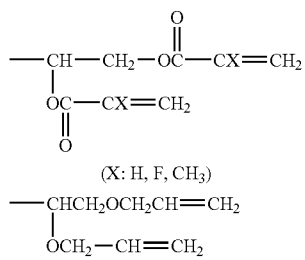

In the present invention, one having a structure of —O(C=O)CF=CH$_2$ has a particularly high polymerization (curing) reactivity and is preferred in that it is capable of efficiently yielding a cured product.

In the formula (F), with regard to the case where n and m are 1 at the same time, in more preferred embodiments, the compounds represented by the formulae (F-1) to (F-3) may be mentioned.

$$Rf^{11}(CF_2CF_2)_nCH_2CH_2—(W)—OCOCR^1=CH_2 \quad \text{formula (F-1)}$$

In formula (F-1), $Rf^{11}$ represents at least one of fluorine atom and a fluoroalkyl group having 1 to 10 carbon atoms, $R^1$ represents a hydrogen atom or a methyl group, W represents a single bond or a linking group, n represents an integer indicative of the polymerization degree, and the polymerization degree n is no less than k (in which k represents an integer of 2 or more).

Examples of the telomeric acrylate containing a fluorine atom in the formula (F-1) include partially or fully fluorinated alkyl ester derivatives of (meth)acrylic acids, and the like.

Specific examples of the compound represented by the formula (F-1) are shown below, but the present invention is not limited to these.

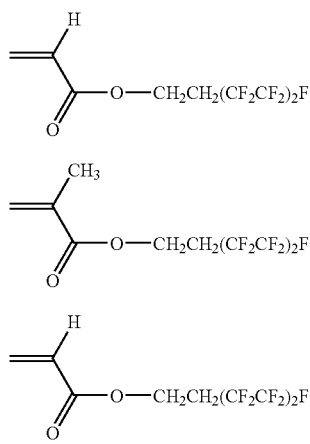

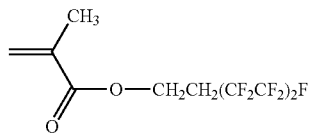

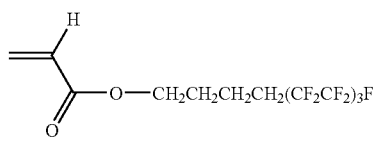

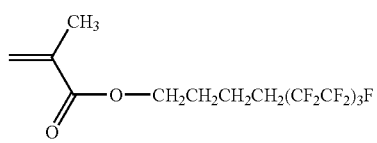

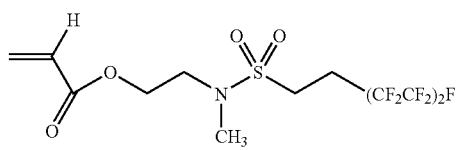

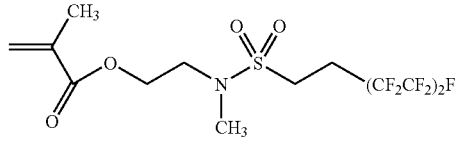

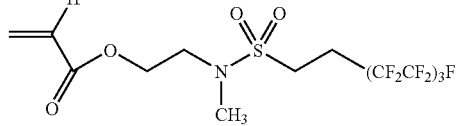

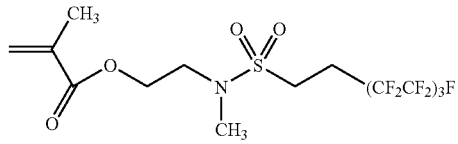

The compound represented by the formula (F-1) may comprise a plurality of fluorine-containing (meth)acrylic acid esters in which n of the group of the formula (F-1), $Rf^{11}$ (CF$_2$CF$_2$)$_n$—CH$_2$CH$_2$—(W)—, is each k, k+1, k+2, . . . , or the like, according to the telomerization condition, the separation condition of a reaction mixture, and the like, in the case of using telomerization upon synthesis.

$$F(CF_2)_p—CH_2—CHX—CH_2Y \quad \text{formula (F-2)}$$

In formula (F-2), p is an integer of 1 to 20, and X and Y are either a (meth)acryloyloxy group or a hydroxyl group, and at least one thereof is a (meth)acryloyloxy group.

The fluorine-containing (meth)acrylic acid ester represented by the formula (F-2) has a fluoroalkyl group having 1 to 20 carbon atoms, having a trifluoromethyl group (CF$_3$—) at its end, and this fluorine-containing (meth)acrylic acid ester allows the trifluoromethyl group to be effectively oriented on the surface even at a small amount. In particular, even during the coating of a film by the fluorine-containing compound with a high fluorine content, and having a film forming property and a polymerizable double bond, the trifluoromethyl group is effectively oriented on the surface. Accordingly, the obtained fluorine-containing curable coated film can exhibit the characteristics such as an antifouling property, reduction of a refractive index, and the like. From the viewpoints of an antifouling property and easy preparation, a fluoroalkyl group having 6 to 20 carbon atoms is preferred, and a fluoroalkyl group having 8 to 10 carbon atoms is particularly preferred. A fluorine-containing (meth)acrylic acid ester having the fluoroalkyl group having 8 to 10 carbon atoms exhibits remarkable water/oil repellency, and therefore, has a better antifouling property, as compared with other fluorine-containing (meth)acrylic acid esters having a chain-length fluoroalkyl group.

Specific examples of the fluorine-containing (meth)acrylic acid ester represented by formula (F-2) include 1-(meth)acryloyloxy-2-hydroxy-4,4,5,5,6,6,7,7,8,8,9,9,10,10,11,11,12,12,13,13,13-heneicosafluorotridecane, 2-(meth)acryloyloxy-1-hydroxy-4,4,5,5,6,6,7,7,8,8,9,9,10,10,11,11,12,12,13,13,13-heneicosafluorotridecane, 1,2-bis(meth)acryloyloxy-4,4,5,5,6,6,7,7,8,8,9,9,10,10,11,11,12,12,13,13,13-heneicosafluorotridecane, and the like. In the present invention, 1-acryloyloxy-2-hydroxy-4,4,5,5,6,6,7,7,8,8,9,9,10,10,11,11,12,12,13,13,13-heneicosafluorotridecane is preferred.

formula (F-3)

In the formula (F-3), R is a hydrogen atom or a methyl group, m is an integer of 1 to 20, and n represents an integer of 1 to 4.

The fluorine atom-containing monofunctional (meth)acrylate represented by the formula (F-3) can be obtained by reacting a fluorine atom-containing alcohol compound represented by the following formula (FG-3) with a (meth)acrylic acid halide:

formula (FG-3)

in the formula (FG-3), m represents an integer of 1 to 20 and n represents an integer of 1 to 4.

Specific examples of the fluorine atom-containing alcohol compound represented by the formula (FG-3) include 1H,1H-perfluoro-3,6-dioxaheptan-1-ol, 1H,1H-perfluoro-3,6-dioxaoctan-1-ol, 1H,1H-perfluoro-3,6-dioxadecan-1-ol, 1H,1H-perfluoro-3,6,9-trioxadecan-1-ol, 1H,1H-perfluoro-3,6,9-trioxaundecan-1-ol, 1H,1H-perfluoro-3,6,9-trioxatridecan-1-ol, 1H,1H-perfluoro-3,6,9,12-tetraoxatridecan-1-ol, 1H,1H-perfluoro-3,6,9,12-tetraoxatetradecan-1-ol, 1H,1H-perfluoro-3,6,9,12-tetraoxahexadecan-1-ol, 1H,1H-perfluoro-3,6,9,12,15-pentaoxahexadecan-1-ol, 1H,1H-perfluoro-3,6,9,12,15-pentaoxaheptadecan-1-ol, 1H,1H-perfluoro-3,6,9,12,15-pentaoxanonadecan-1-ol, 1H,1H-perfluoro-3,6,9,12,15,18-hexaoxaicosan-1-ol, 1H,1H-perfluoro-3,6,9,12,15,18-hexaoxadocosan-1-ol, 1H,1H-perfluoro-3,6,9,12,15,18,21-heptaoxatricosan-1-ol, 1H,1H-perfluoro-3,6,9,12,15,18,21-heptaoxapentacosan-1-ol, and the like. These are commercially available, and specific examples thereof include 1H,1H-perfluoro-3,6-dioxaheptan-1-ol: trade name: C5GOL: manufactured by Exfluor, 1H,1H-perfluoro-3,6,9-trioxadecan-1-ol: trade name: C7GOL: manufactured by Exfluor, 1H,1H-perfluoro-3,6-dioxadecan-1-ol: trade name: C8GOL: manufactured by Exfluor, 1H,1H-perfluoro-3,6,9-trioxatridecan-1-ol: trade name: C10GOL: manufactured by Exfluor, 1H,1H-perfluoro-3,6,9,12-tetraoxahexadecan-1-ol: trade name: C12GOL: manufactured by Exfluor, and the like. In the present invention, 1H,1H-perfluoro-3,6,9,12-tetraoxatridecan-1-ol is preferably used.

Further, examples of the (meth)acrylic acid halide to be reacted with the fluorine atom-containing alcohol compound represented by the formula (FG-3) include (meth)acrylic acid fluoride, (meth)acryl acid chloride, (meth)acrylic acid bromide, and (meth)acrylic acid iodide, but (meth)acrylic acid chloride is typically preferred from the viewpoint of easy availability.

Preferred specific examples of the compound represented by the formula (F-3) include, but are not limited to, the following.

 (b-1)

 (b-2)

Furthermore, as a compound represented by formula (F-3), a compound represented by the following formula (F-3)' can also be preferably used.

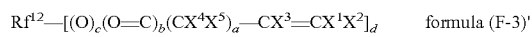 formula (F-3)'

In formula (F-3)', $X^1$ and $X^2$ each independently represents H or F; $X^3$ represents H, F, $CH_3$, or $CF_3$; $X^4$ and $X^5$ each independently represents H, F, or $CF_3$; a, b, and c each independently represents 0 or 1; d represents an integer of 1 to 4; $Rf^{12}$ represents a group having an ether bond having 18 to 200 carbon atoms and has 6 or more repeating units represented by the formula (FG-3)': $-(CX^6X^7CF_2CF_2O)-$ (wherein $X^6$ and $^7$ each independently represents F or H).

Examples of the fluorine-containing polyether compound represented by the formula (F-3)' include:

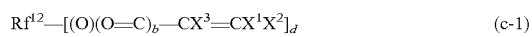 (c-1)

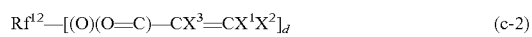 (c-2)

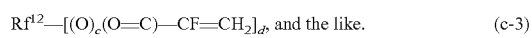 (c-3)

As for the Rf group in the fluorine-containing polyether compound represented by the formula (F-3)', it is important that Rf group contains 6 or more repeating units of the fluorine-containing polyether chain of the formula (FG-3)', whereby an antifouling property can be imparted.

Furthermore, more specifically, when used as a structure unit of the specific fluorine-containing polymer to be described below, a photopolymerizable composition, and a coating composition, use may be made of a mixture containing 6 or less repeating units of the fluorine-containing polyether chain, but in the case of using the form of a mixture, a mixture in which in the distribution of the fluorine-containing unsaturated compound having less than 6 repeating units and a fluorine-containing unsaturated compound having 6 or more repeating units, the highest presence ratio of the fluorine-containing unsaturated compound having 6 or more repeating units of the polyether chain is preferred.

The fluorine-containing polyether chain of the formula (FG-3)' preferably has 6.5 to 8 repeating units, 10 or more repeating units, and 18 to 22 repeating units, and more preferably 20 or more repeating units, whereby water repellency as well as an antifouling property, particularly a property of removing stains including oil components can be improved, which is thus preferable, and a gas permeation property can be even more effectively imparted, which is thus also preferable. Further, the fluorine-containing polyether chain may be present at the end of the $Rf^{12}$ group or in the middle of chain.

Specifically, the $Rf^{12}$ group preferably has a structure of the formula (c-4):

wherein $X^6$ and $X^7$ are the same as in the formula (FG-3)', $R^1$ is at least one selected from a hydrogen atom, a halogen atom, an alkyl group, a fluorine-containing alkyl group, an alkyl group comprising an ether bond, and a fluorine-containing alkyl group comprising an ether bond, $R^2$ is a divalent or greater organic group, n is an integer of 6 to 66, and e is 0 or 1.

That is, the $Rf^{12}$ group preferably bonds to a reactive carbon-carbon double bond via a divalent or greater organic group $R^2$ and is a fluorine-containing organic group having $R^1$ at the end.

$R^2$ may be any organic group that is capable of allowing the fluorine-containing polyether chain of the formula (FG-3)' to bond to the reactive carbon-carbon double bond, and for example, it is selected from an alkylene group, a fluorine-containing alkylene group, an alkylene group comprising an ether bond, and a fluorine-containing alkylene group comprising an ether bond. Among these, a fluorine-containing alkylene group and a fluorine-containing alkylene group comprising an ether bond are preferred from the viewpoint of transparency and low refractive index property.

As specific examples of the fluorine-containing polyether compound represented by the general formula (F-3)', the compounds mentioned in Republication Patent WO2003/022906, and the like are preferably used. In the present invention, $CH_2=CF-COO-CH_2CF_2CF_2-(OCF_2CF_2CF_2)_{20}-OC_8F_{17}$ can be particularly preferably used.

In the formula (F), in the case where n and m are not 1 at the same time, specific examples of the following preferred embodiments include (F-4) to (F-5) below.

formula (F-4)

In the formula (F-4), $Rf^1$ represents a (per)fluoroalkyl group or a (per)fluoropolyether group, W represents a linking group, and $R_A$ represents a functional group having an unsaturated double bond. n represents an integer of 1 to 3, m represents an integer of 1 to 3, and n and m are not 1 at the same time. From the viewpoints of its excellent water/oil repellency with excellent stability (antifouling durability), it is preferable that n represents 2 to 3 and m represents 1 to 3. It is more preferable that n represents 2 to 3 and m represents 2 to 3. It is most preferable that n represents 3 and m represents 2 to 3.

$Rf^1$ which is monovalent to trivalent can be used. In the case where the Rf is monovalent, the terminal group is preferably $(C_nF_{2n+1})-$, $(C_nF_{2n+1}O)-$, $(XC_nF_{2n}O)-$, or $(XC_nF_{2n+1})-$ (wherein X is hydrogen, chlorine, or bromine, and n is an integer of 1 to 10). Specifically, $CF_3O(C_2F_4O)_pCF_2-$, $C_3F_7O(CF_2CF_2CF_2O)_pCF_2CF_2-$, $C_3F_7O(CF(CF_3)CF_2O)_pCF(CF_3)-$, $F(CF(CF_3)CF_2O)_pCF(CF_3)-$, or the like can be preferably used.

Here, the average value of p is from 0 to 50, preferably from 3 to 30, more preferably from 3 to 20, and most preferably from 4 to 15.

In the case where $Rf^1$ is divalent, $-(CF_2O)_q(C_2F_4O)_rCF_2-$, $-(CF_2)_3O(C_4F_8O)_r(CF_2)_3-$, $-CF_2O(C_2F_4O)_rCF_2-$, $-C_2F_4O(C_3F_6O)_rC_2F_4-$, $-CF(CF_3)(OCF_2CF(CF_3))_sOC_tF_{2t}O(CF(CF_3)CF_2O)_rCF(CF_3)-$, or the like can be preferably used.

Here, q, r, and s in the formula are average values from 0 to 50. Preferably, they are from 3 to 30, more preferably from 3 to 20, and most preferably from 4 to 15. t is an integer of 2 to 6.

Specific examples or synthesis methods for the compound represented by the formula (F-4) are described in the pamphlet of International Publication WO 2005/113690.

Hereinbelow, a case where the average value of p in $F(CF(CF_3)CF_2O)_pCF(CF_3)-$ is from 6 to 7 is denoted as "HFPO—", representing a specific compound of the formula (F-4), but not limited thereto.

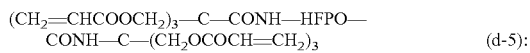

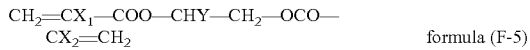

Furthermore, a compound represented by formula (F-5) may be used as a compound represented by formula (F-4).

$$CH_2=CX_1-COO-CHY-CH_2-OCO-CX_2=CH_2 \qquad \text{formula (F-5)}$$

In formula (F-5), $X_1$ and $X_2$ each independently represents a hydrogen atom or a methyl group, and Y represents a fluoroalkyl group having 2 to 20 carbon atoms and containing 3 or more fluorine atoms, or a fluorocycloalkyl group having 4 to 20 carbon atoms and containing 4 or more fluorine atoms).

Specific examples of the fluorine atom-containing an alcohol compound represented by the general formula (F-5) preferably include di(meth)acrylic acid-2,2,2-trifluoroethyl ethylene glycol, di(meth)acrylic acid-2,2,3,3,3-pentafluoropropyl ethylene glycol, di(meth)acrylic acid-2,2,3,3,4,4,4-heptafluorobutyl ethylene glycol, di(meth)acrylic acid-2,2,3,3,4,4,5,5,5-nonafluoropentyl ethylene glycol, di(meth)acrylic acid-2,2,3,3,4,4,5,5,6,6,6-undecafluorohexyl ethylene glycol, di(meth)acrylic acid-2,2,3,3,4,4,5,5,6,6,7,7,7-tridecafluoroheptyl ethylene glycol, di(meth)acrylic acid-2,2,3,3,4,4,5,5,6,6,7,7,8,8,8-pentadecafluorooctyl ethylene glycol, di(meth)acrylic acid-3,3,4,4,5,5,6,6,7,7,8,8,8-tridecafluorooctyl ethylene glycol, di(meth)acrylic acid-2,2,3,3,4,4,5,5,6,6,7,7,8,8,9,9,9-heptadecafluorononyl ethylene glycol, di(meth)acrylic acid-2,2,3,3,4,4,5,5,6,6,7,7,8,8,9,9,10,10,10-nonadecafluorodecylethylene glycol, di(meth)acrylic acid-3,3,4,4,5,5,6,6,7,7,8,8,9,9,10,10,10-heptadecafluorodecylethylene glycol, di(meth)acrylic acid-2-trifluoromethyl-3,3,3-trifluoropropyl ethylene glycol, di(meth)acrylic acid-3-trifluoromethyl-4,4,4-trifluorobutyl ethylene glycol, di(meth)acrylic acid-1-methyl-2,2,3,3,3-pentafluoropropyl ethylene glycol, di(meth)acrylic acid-1-methyl-2,2,3,3,4,4,4-heptafluorobutyl ethylene glycol, and the like, these can be singly or in mixture in use. For performing the preparation of such a di(meth)acrylic acid ester 1, preparation can be conducted by a known method including the methods as mentioned in JP-A-6-306326. In the present invention, diacrylic acid-2,2,3,3,4,4,5,5,6,6,7,7,8,8,9,9,9-heptadecafluorononyl ethylene glycol is preferably used.

In the present invention, as a preferred second embodiment of the compound in which the polymerizable unsaturated group is a (meth)acryloyloxy group, a compound having a plurality of (per)fluoroalkyl group or (per)fluoropolyether group in one molecule can be mentioned.

Furthermore, the compound in which the polymerizable unsaturated group is a (meth)acryloyloxy group may be a siloxane compound. By allowing the fluorine-containing antifouling agent to have a siloxane skeleton, the antifouling agent is likely to be omnipresent on the surface, the upper surface after the curing exhibits excellent water/oil repellency and an excellent antifouling property. In addition, the scratch resistance can be imparted. Further, a preferred embodiment (the formula (F-6)) will be described below.

$$R_a R^f_b R^A_c SiO_{(4-a-b-c)/2} \quad \text{formula (F-6)}$$

The formula (F-6) represents a fluorine-containing (meth)acrylate compound, wherein R is a hydrogen atom, a methyl group, an ethyl group, a propyl group, or a phenyl group; $R^f$ is an organic group containing a fluorine atom; $R^A$ is an organic group containing a (meth)acryl group; and a+b+c<4.

a is from 1 to 1.75, and preferably from 1 to 1.5, and thus, if a is less than 1, it becomes more difficult to industrially synthesize the compound, whereas if a is more than 1.75, compatibility between the curability and the antifouling property cannot be attained.

$R^f$ is an organic group containing a fluorine atom, and it is preferably a group represented by $C_xF_{2x+1}(CH_2)_p$— (wherein x is an integer of 1 to 8 and p is an integer of 2 to 10) or a perfluoropolyether-substituted alkyl group. b is from 0.2 to 0.4, and preferably from 0.2 to 0.25, and thus, if b is less than 0.2, the antifouling property is reduced, whereas if b is more than 0.4, the curability is deteriorated.

$R^A$ is an organic group containing a (meth)acryl group, and it is preferable that its bond to a Si atom is a Si—O—C bond, from the viewpoint of ease of industrial synthesis.

c is from 0.4 to 0.8, and preferably 0.6 to 0.8, and thus, if c is less than 0.4, the curability is deteriorated, whereas if c is more than 0.8, the antifouling property is reduced.

Further, a+b+c is from 2 to 2.7, and preferably from 2 to 2.5, and thus, if a+b+c is less than 2, it becomes more difficult to be omnipresent on the surface, whereas if a+b+c is more than 2.7, compatibility between the curability and the antifouling property cannot be attained.

The polyfunctional acrylate of the present invention contains 3 or more F atoms and 3 or more Si atoms, and preferably 3 to 17 F atoms and 3 to 8 Si atoms in one molecule. If it contains less than 3 F atoms, the antifouling property becomes insufficient, whereas if it contains less than 3 Si atoms, the omnipresence on the surface is insufficient, and thus, the antifouling property becomes insufficient.

The compound represented by (F-6) can be prepared by a known method including the methods as mentioned in JP-A-2007-145884.

The siloxane structure may have any of straight chained, branched, and cyclic structures, but among these, particularly branched and cyclic structures are preferred due to good compatibility with other polyfunctional (meth)acrylates, and the like, as described later, there is no repelling and the omnipresence on the surface easily occurs.

Here, as the polyfunctional (meth)acrylate compound in which the siloxane structure is branched, one represented by the following general formula is preferred:

$R^f SiR_k[OSiR_m(OR^A)_{3-m}]_{3-k}$ (wherein R, $R^f$, and $R^A$ are the same as above, respectively, m=0, 1, or 2, and particularly m=2, and k=0 or 1).

Further, as the polyfunctional (meth)acrylate compound in which the siloxane structure is a cyclic structure, one represented by the following general formula is preferred:

$(R^f RSiO)(R^A RSiO)_n$ (wherein R, $R^f$, and $R^A$ are the same as above, and n≥2, and particularly 3≤n≤5).

Specific examples of the polyfunctional (meth)acrylate compound include the following compounds Rf is preferably a perfluoroalkyl group having 8 carbon atoms.

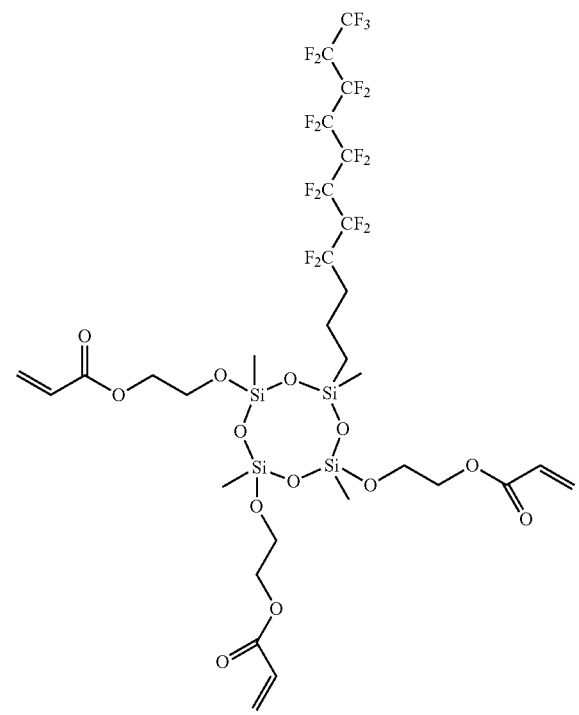

B-1

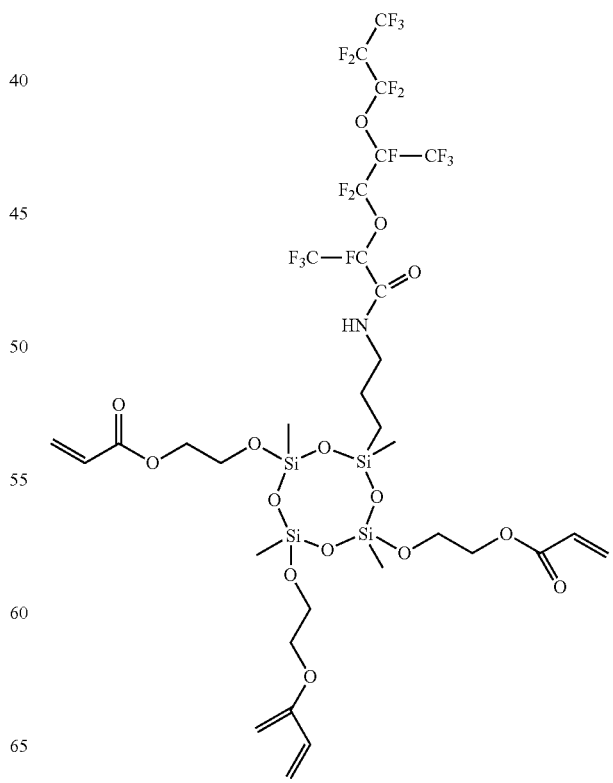

B-2

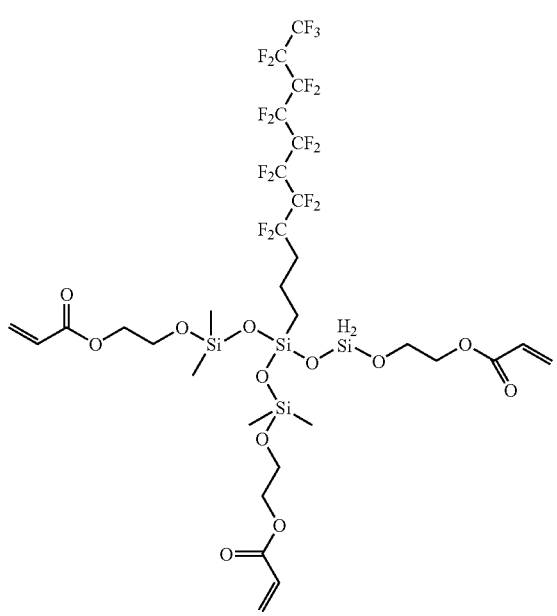

B-3

(B) Fluorine-Containing Copolymer having Polymerizable Unsaturated Group

The composition for a low refractive index layer in the present invention contains the fluorine-containing copolymer having a polymerizable unsaturated group (B). The fluorine-containing copolymer having a polymerizable unsaturated group (B) forms a film of a low refractive index layer, and can serve as a binder.

The fluorine-containing copolymer having a polymerizable unsaturated group (B) is preferably obtained by polymerizing at least one kind of fluorine-containing vinyl monomers.

Examples of the fluorine-containing vinyl monomer include fluoroolefins (for example, fluoroethylene, vinylidene fluoride, tetrafluoroethylene, hexafluoropropylene), partially or fully fluorinated alkyl ester derivatives of (meth)acrylic acid (for example, Biscoat 6FM (trade name, manufactured by Osaka Organic Chemical Industry Ltd.), R-2020 (trade name, manufactured by Daikin Industries, Ltd.), and the like), fully or partially fluorinated vinyl ethers, and the like, but perfluoroolefins are preferred, and hexafluoropropylene is particularly preferred in terms of refractive index, solubility, transparency, availability, and the like. Although the refractive index can be lowered by raising the fraction of such a fluorine-containing vinyl monomer, the film strength is lowered. In the present invention, it is preferable that the fluorine-containing vinyl monomers be introduced so that the fluorine content in the copolymer falls in the range from 20 to 60% by mass, preferably from 25 to 55% by mass, and particularly preferably from 30 to 50% by mass.

The copolymers with the units represented by the following (A1), (B1), and (C1) can be preferably used in order to impart crosslinking reactivity with the fluorine-containing vinyl monomers.

(A1): A constituting unit obtained by polymerizing a monomer in which a self-crosslinkable functional group is introduced into the molecule in advance, such as glycidyl (meth)acrylate or glycidyl vinyl ether.

(B1): A constituting unit obtained by polymerizing a monomer having a carboxyl group, a hydroxyl group, an amino group, a sulfo group, or the like (for example, (meth)acrylic acid, methylol(meth)acrylate, hydroxyalkyl(meth)acrylate, allyl acrylate, hydroxyethyl vinyl ether, hydroxybutyl vinyl ether, maleic acid, crotonic acid, and the like).

(C1): A constituting unit obtained by allowing a compound having not only a group capable of reacting with the functional group included in (A1) or (B1) into the molecule but also a crosslinkable functional group to react with the constituting unit of (A1) or (B1) (for example, a constituting unit synthesized using a method of acting acrylic acid chloride on a hydroxyl group, or other methods).

In the constituting unit of (C1), the crosslinkable functional group is preferably a photopolymerizable group. Examples of the photopolymerizable group include a (meth)acryloyl group, an alkenyl group, a cinnamoyl group, a cinnamylideneacetyl group, a benzalacetophenone group, a styrylpyridine group, an α-phenylmaleimido group, a phenylazido group, a sulfonylazido group, a carbonylazido group, a diazo group, an o-quinonediazido group, a furylacryloyl group, a coumarin group, a pyrone group, an anthracene group, a benzophenone group, a stilbene group, a dithiocarbamate group, a xanthate group, a 1,2,3-thiadiazole group, a cyclopropene group and an azadioxabicyclo group. Only one or two or more of these groups may be used. Among these groups, a (meth)acryloyl group and a cinnamoyl group are preferred, and a (meth)acryloyl group is particularly preferred.

Examples of the specific method for preparing a copolymer having a photopolymerizable group include, but are not limited to, the following four methods.

1. A method of performing esterification by allowing (meth)acrylic acid chloride to react with a copolymer containing a hydroxyl group as well as a crosslinkable functional group, 2. A method of performing urethanation by allowing a (meth)acrylic acid ester containing an isocyanate group to react with a copolymer containing a hydroxyl group as well as a crosslinkable functional group, 3. A method of performing esterification by allowing (meth)acrylic acid to react with a copolymer containing epoxy groups as well as crosslinkable functional groups, and 4. A method of performing esterification by allowing a (meth)acrylic acid ester containing an epoxy group to react with a copolymer containing a carboxyl group as well as a crosslinkable functional group.

The amount of the photopolymerizable groups to be introduced can be arbitrarily controlled, and it is also preferable that a carboxyl group, a hydroxyl group, or the like, be left in a certain amount from the viewpoints of the stability of coating film surface condition, reduction in the surface state faults in the coexistence of the inorganic particles, enhancement in the film strength, and the like.

In the copolymer useful for the present invention, in addition to the repeating unit derived from the fluorine-containing vinyl monomer and the repeating unit having a (meth)acryloyl group in the side chain, other vinyl monomers may be appropriately copolymerized, from various viewpoints such as adhesion to substrate, Tg (contributing to film hardness) of a polymer, solubility in a solvent, transparency, slipperiness, antidust/antifouling property and the like. A plurality of these vinyl monomers may be combined according to the purposes, and these monomers are preferably introduced in a total range from 0 to 65 mol %, more preferably from 0 to 40 mol %, and particularly preferably from 0 to 30 mol %, based on the copolymer.

The vinyl monomer unit which can be used in combination is not particularly limited, and examples thereof include olefins (for example, ethylene, propylene, isoprene, vinyl chloride, vinylidene chloride, and the like), acrylic acid esters (for example, methyl acrylate, ethyl acrylate, 2-ethylhexyl acrylate, 2-hydroxyethyl acrylate, and the like), methacrylic acid esters (for example, methyl methacrylate, ethyl methacrylate, butyl methacrylate, 2-hydroxyethyl methacrylate, and the like), styrene derivatives (for example, styrene, p-hydroxymethylstyrene, p-methoxystyrene, and the like), vinyl ethers (for example, methyl vinyl ether, ethyl vinyl ether, cyclohexyl vinyl ether, hydroxyethyl vinyl ether, hydroxybutyl vinyl ether, and the like), vinyl esters (for example, vinyl acetate, vinyl propionate, vinyl cinnamate, and the like), unsaturated carboxylic acids (for example, acrylic acid, methacrylic acid, crotonic acid, maleic acid, itaconic acid, and the like), acrylamides (for example, N,N-dimethylacrylamide, N-tert-butylacrylamide, N-cyclohexylacrylamide, and the like), methacrylamides (for example, N,N-dimethylmethacrylamide, and the like), acrylonitrile, and the like.

The fluorine-containing polymer which is particularly useful in the present invention is a random copolymer of perfluoroolefin with vinyl ethers or vinyl esters. In particular, the fluorine-containing polymer preferably has a group capable of undergoing a crosslinking reaction by itself (for example, a radical reactive group such as a (meth)acryloyl group, and the like, or a ring-opening polymerizable group such as an epoxy group, an oxetanyl group, and the like). The crosslinking reactive group-containing polymerization unit preferably occupies from 5 to 70 mol %, and more preferably from 30 to 60 mol %, in all polymerization units of the polymer. Examples of the preferred polymer include those as described in JP-A-2002-243907, JP-A-2002-372601, JP-A-2003-26732, JP-A-2003-222702, JP-A-2003-294911, JP-A-2003-329804, JP-A-2004-4444, and JP-A-2004-45462.

For the purpose of imparting the antifouling property and scratch resistance, a polysiloxane structure may be introduced into the fluorine-containing polymer of the present invention. The method for introducing the polysiloxane structure is not limited, but preferred examples thereof include a method of introducing a polysiloxane block copolymerization component by using a silicone macroazo initiator described in JP-A-6-93100, JP-A-11-189621, JP-A-11-228631, and JP-A-2000-313709; and a method of introducing a polysiloxane graft copolymerization component by using a silicone macromer described in JP-A-2-251555 and JP-A-2-308806. Particularly preferred compounds include the polymers in Examples 1, 2, and 3 of JP-A-11-189621, and Copolymers A-2 and A-3 of JP-A-2-251555. The content of the polysiloxane component in the polymer is preferably from 0.5 to 10% by mass, and particularly preferably from 1 to 5% by mass.

The preferable molecular weight of the fluorine-containing copolymer having a polymerizable unsaturated group (B) is, in terms of the weight average molecular weight, 5000 or more and less than 500000, more preferably 10000 or more and less than 500000, still more preferably 15000 or more and less than 200000, and most preferably 15000 or more and less than 100000. If the weight average molecular weight is 5000 or more, the coating property is excellent and repellence or unevenness (inplane variability in film thickness of coated film) is less likely to occoroccur. Further, if it is less than 500000, the solubility in a solvent is excellent, which is thus preferable.

In addition, by using a polymer having a different average molecular weight in combination as the fluorine-containing copolymer having a polymerizable unsaturated group (B), improvement in the coated film surface condition or improvement in the scratch resistance can also be performed.

(C) Inorganic Fine Particle

In the present invention, from the viewpoint of reducing the refractive index and improving the scratch resistance, the inorganic fine particle is preferably used in the low refractive index layer. The inorganic fine particle is not particularly limited as long as it has an average particle size of from 5 to 120 nm, but from the viewpoint of reducing the refractive index, an inorganic low refractive index particle is preferred.

The inorganic fine particle includes, because of low refractive index, a magnesium fluoride fine particle and a silica fine particle. Particularly, from the viewpoint of refractive index, dispersion stability, and cost, a silica fine particle is preferred. The size (primary particle diameter) of the inorganic particle is preferably from 5 to 120 nm, more preferably from 10 to 100 nm and from 20 to 100 nm, and most preferably from 40 to 90 nm.

If the particle diameter of the inorganic fine particle is too small, the effect of improving the scratch resistance decreases, whereas if it is too large, fine irregularities are generated on the low refractive index layer surface and the appearance (for example, dense blackness) or integrated reflectivity may be deteriorated. Further, in the case where a hollow silica fine particle, as described later, is used, if the particle diameter is too small, the proportion of hollow is reduced and sufficient reduction in refractive index can not be achieved. The inorganic fine particle may be crystalline or amorphous, and it may be a monodisperse particle or may even be an aggregate particle as long as the predetermined particle diameter is satisfied. The shape is most preferably spherical, but it may be an indefinite form.

The coated amount of the inorganic fine particle is preferably from 1 to 100 $mg/m^2$, more preferably from 5 to 80 $mg/m^2$, and still more preferably from 10 to 60 $mg/m^2$. If the coated amount is too small, sufficient reduction in refractive index can not be achieved or the effect of improving the scratch resistance decreases, whereas if it is too large, fine irregularities are generated on the low refractive index layer surface and the appearance (for example, dense blackness) or the integrated reflectivity may be deteriorated.

(Porous or Hollow Fine Particle)

In order to reduce the refractive index, a fine particle having a porous or hollow structure is preferably used, and a silica particle having a hollows structure is particularly preferably used. The void percentage of the particle is preferably from 10 to 80%, more preferably from 20 to 60%, and most preferably from 30 to 60%. The void percentage of the hollow fine particle is preferably in the above-described range from the viewpoint of reducing the refractive index and maintaining the durability of the particle.

In the case where the porous or hollow particle is silica, the refractive index of the fine particle is preferably from 1.10 to 1.40, more preferably from 1.15 to 1.35, and most preferably from 1.15 to 1.30. The refractive index as used herein indicates a refractive index of the particle as a whole, and does not indicate a refractive index of only silica in the outer shell forming the silica particle.

In addition, two or more kinds of hollow silica different in average particle size can be used in combination. The average particle diameter of hollow silica can be determined from electron micrographs.

In the present invention, the specific surface area of the hollow silica is preferably from 20 to 300 m$^2$/g, more preferably from 30 to 120 m$^2$/g, and most preferably from 40 to 90 m$^2$/g. The surface area can be determined by a BET method using nitrogen.

In the present invention, a void-free silica particle may be used in combination with the hollow silica. The particle size of the void-free silica is preferably 30 nm or more and 150 nm or less, more preferably 35 nm or more and 100 nm or less, and most preferably 40 nm or more and 80 nm or less.

[Method for Preparation of Porous or Hollow Fine Particle]

A preferred method for preparation of a hollow fine particle is described below. The first step is the formation of a core particle which can be removed by an after-treatment, the second step is the formation of a shell layer, the third step is the dissolution of the core particle, and if desired, the fourth step is the formation of an additional shell phase. Specifically, the hollow particle can be prepared in accordance with the method for preparation of a hollow silica fine particle as described, for example, in JP-A-2001-233611.

A preferred production method of the porous particle is a method where in the first step, a porous core particle is prepared by controlling the degree of hydrolysis or condensation of an alkoxide or the kind or amount of the coexisting substance, and in the second step, a shell layer is formed on the surface of the core particle. Specifically, the porous particle can be prepared by the method described, for example, in JP-A-2003-327424, JP-A-2003-335515, JP-A-2003-226516, JP-A-2003-238140, and the like.

(Coated Particle)

The adsorbed water amount can be decreased by increasing the shell thickness and thereby decreasing the adsorption site on the particle surface, which is thus preferred. Furthermore, when the shell is formed of a conductive component, conductivity can also be advantageously imparted. In particular, a combination using a silica-based porous or hollow particle as the core particle and using $ZnO_2$, $Y_2O_3$, $Sb_2O_5$, ATO, ITO or $SnO_2$ as the shell is preferred. The coated particle is described in the paragraph numbers [0033] to [0040] of JP-A-2008-242314, and can also be suitably used in the present invention.

[Method for Surface Treatment of Inorganic Fine Particle]

Furthermore, in the present invention, the inorganic fine particle can be used by surface treatment with a silane coupling agent, and the like by a conventional method.

Particularly, in order to improve the dispersibility in the binder for the formation of a low refractive index layer, the surface of the inorganic fine particle is preferably treated with a hydrolysate of an organosilane compound and/or a partial condensate thereof, more preferably a hydrolysate of an organosilane compound and/or a partial condensate thereof, and it is still more preferred that either one or both of an acid catalyst and a metal chelate compound are used in the treatment. The method for the surface treatment of the inorganic fine particle is described in the paragraph numbers [0046] to [0076] of JP-A-2008-242314, and the organosilane compound, the siloxane compound, the solvent for surface treatment, the catalyst for surface treatment, the metal chelate compound, and the like as described in this document can also be suitably used in the present invention.

(Photopolymerization Initiator)

The composition for a low refractive index layer in the present invention preferably comprises a photopolymerization initiator. Examples of the photopolymerization initiator include acetophenones, benzoins, benzophenones, phosphine oxides, ketals, anthraquinones, thioxanthones, azo compounds, peroxides, 2,3-dialkyldione compounds, disulfide compounds, fluoroamine compounds, aromatic sulfoniums, lophine dimers, onium salts, borate salts, active esters, active halogens, inorganic complexes, coumarins, and the like. The photopolymerization initiator is described in the paragraph numbers [0141] to [0159] of JP-A-2008-134585, and can also be suitably used in the present invention.

Various examples are also described in "Saishin UV Koka Gijutsu (Latest UV Curing Technologies)", Technical Information Institute Co., Ltd. (1991), p. 159, and "Shigaisen Koka System (Ultraviolet Curing System)", edited by Kiyomi Kato, Sogo Gijutsu Center (1989), p. 65-148, and these are useful in the present invention.

Preferred examples of the commercially available photo-radial polymerization initiator of a photo-cleavage type include "Irgacure 651", "Irgacure 184", "Irgacure 819", "Irgacure 907", "Irgacure 1870" (a 7/3 mixed initiator of CGI-403/Irg184), "Irgacure 500", "Irgacure 369", "Irgacure 1173", "Irgacure 2959", "Irgacure 4265", "Irgacure 4263", "Irgacure 127", "OXE01", and the like, manufactured by Ciba Specialty Chemicals Corp.; "KAYACURE DETX-S", "KAYACURE BP-100", "KAYACURE BDMK", "KAYACURE CTX", "KAYACURE BMS", "KAYACURE 2-EAQ", "KAYACURE ABQ", "KAYACURE CPTX", "KAYACURE EPD", "KAYACURE ITX", "KAYACURE QTX", "KAYACURE BTC", "KAYACURE MCA", and the like, manufactured by Nippon Kayaku Co., Ltd.; "Esacure (KIP100F, KB1, EB3, BP, X33, KTO46, KT37, KIP150, TZT)", and the like, manufactured by Sartomer Company, Inc.; and a combination thereof.

The photopolymerization initiator is preferably used in an amount of 0.1 to 15 parts by mass, and more preferably from 1 to 10 parts by mass, based on 100 parts by mass of the organic component having a polymerizable group.

In addition to the photopolymerization initiator, a photosensitizer may be used. Specific examples of the photosensitizer include n-butylamine, triethylamine, tri-n-butylphosphine, Michler's ketone, thioxanthone, and the like. Furthermore, one or more auxiliary agents such as an azide compound, a thiourea compound, a mercapto compound, and the like may be used in combination.

Examples of the commercially available photosensitizer include "KAYACURE (DMBI, EPA)" manufactured by Nippon Kayaku Co., Ltd., and the like.

(D) Polyfunctional Monomer having 3 or more Polymerizable Unsaturated Groups

In the present invention, the composition for a low refractive index layer preferably comprises a (D) polyfunctional monomer having 3 or more polymerizable unsaturated groups. The polyfunctional monomer having 3 or more polymerizable unsaturated groups (D) can serve as a curing agent. By using the fluorine-containing copolymer having a polymerizable unsaturated group (B) and the polyfunctional monomer having 3 or more polymerizable unsaturated groups (D) in combination, the scratch resistance or the scratch resistance after chemical treatment can be improved.

The polyfunctional monomer having 3 or more polymerizable unsaturated groups (D) may or may not contain fluorine.

The non-fluorine-containing polyfunctional monomer used in the present invention is described. Examples of the monomer include compounds containing polymerizable functional groups such as a (meth)acryloyl group, a vinyl group, a styryl group, an allyl group, and the like, and among these, a (meth)acryloyl group is preferred. Particularly preferably, the compound containing 3 or more (meth)acryloyl groups in one molecule, as described later, can be used.

Specific examples of the compound having a polymerizable unsaturated bond include (meth)acrylic acid diesters of alkylene glycol, (meth)acrylic acid diesters of polyoxyalkylene glycol, (meth)acrylic acid diesters of polyhydric alcohol, (meth)acrylic acid diesters of ethylene oxide or propylene oxide adducts, epoxy (meth)acrylates, urethane (meth)acrylates, polyester (meth)acrylates, and the like.

Among these, an ester of a polyhydric alcohol and a (meth)acrylic acid is preferred. Examples thereof include pentaerythritol tetra(meth)acrylate, pentaerythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth)acrylate, trimethylolethane tri(meth)acrylate, ditrimethylolpropane tetra(meth)acrylate, dipentaerythritol tetra(meth)acrylate, dipentaerythritol penta(meth)acrylate, dipentaerythritol hexa(meth)acrylate, pentaerythritol hexa(meth)acrylate, 1,2,3-cyclohexane tetramethacrylate, polyurethane polyacrylate, polyester polyacrylate, caprolactone-modified tris(acryloxyethyl)isocyanurate, and the like.

As the polyfunctional acrylate-based compound having a (meth)acryloyl group, commercially available ones may be used, and examples thereof include KAYARAD DPHA, KAYARAD PET-30, and the like, manufactured by Nippon Kayaku Co., Ltd.

The non-fluorine-containing polyfunctional monomer is described in the paragraph numbers [0114] to [0122] of JP-A-2009-98658, and can also be suitably used in the present invention.

In the present invention, at least one of the polyfunctional monomers having a polymerizable unsaturated group (D) is preferably a fluorine-containing polyfunctional monomer which is represented by the following general formula (1), contains 35% by weight of fluorine, and has a calculated value of the entire intercrosslink molecular weight of less than 500.

$$Rf^2\{-(L)_m-Y\}_n \qquad \text{formula (1)}$$

In formula (1), $Rf^2$ represents an n-valent group containing at least a carbon atom and a fluorine atom, n represents an integer of 3 or more, L represents a single bond or a divalent linking group, and m represents 0 or 1 and Y represents a group containing a polymerizable unsaturated group, where $Rf^2$ may contain any of oxygen atom and hydrogen atom and $Rf^2$ has chained (straightened or branched) or cyclic structure.

Y is preferably a group containing two carbon atoms forming unsaturated bonds, more preferably a radically polymerizable group, and particularly preferably selected from a (meth)acryloyl group, an allyl group, an α-fluoroacryloyl group, and $-C(O)OCH=CH_2$. Among these, a (meth)acryloyl group, an allyl group, an α-fluoroacryloyl group, and $-C(O)OCH=CH_2$, each having radical polymerizability, are more preferred from the viewpoint of polymerizability.

L represents a divalent linking group, in particular, an alkylene group having 1 to 10 carbon atoms, an arylene group having 6 to 10 carbon atoms, $-O-$, $-S-$, $-N(R)-$, a group obtained by the combination of an alkylene group having 1 to 10 carbon atoms, and $-O-$, $-S-$, or $-N(R)-$, or a group obtained by combination of an arylene group having 6 to 10 carbon atoms, and $-O-$, $-S-$, or $-N(R)-$. R represents a hydrogen atom or an alkyl group having 1 to 5 carbon atoms. If L represents an alkylene group or an arylene group, the alkylene group and the arylene group represented by L are preferably substituted with halogen atoms, and more preferably substituted with fluorine atoms.

As the fluorine-containing polyfunctional monomer in the present invention, a monomer represented by the following general formula (2) or (3) and which contains fluorine in amount of 35% by mass or more and has a calculated value of intercrosslink molecular weight is less than 500 is more preferred, from the viewpoints of refractive index and polymerizability.

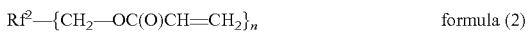

$$Rf^2-\{CH_2-OC(O)CH=CH_2\}_n \qquad \text{formula (2)}$$

$$Rf^2-\{C(O)OCH=CH_2\}_n \qquad \text{formula (3)}$$

In formula (2) and (3), $Rf^2$ represents an n-valent group composed of only a carbon atom and a fluorine atom, or an n-valent group composed of only a carbon atom, a fluorine atom, and an oxygen atom, and n represents an integer of 3 or more. $Rf^2$ has chained (straightened or branched) or cyclic structure.

As the fluorine-containing polyfunctional monomer in the present invention, a monomer represented by the following general formula (4) or (5) and which contains fluorine in amount of 35% by mass or more and has a calculated value of intercrosslink molecular weight is less than 500 is also preferred.

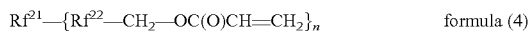  formula (4)

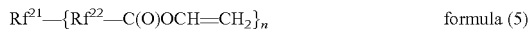  formula (5)

In formula (4) and (5), $Rf^{21}$ represents an n-valent group having at least a carbon atom and a fluorine atom; $Rf^{22}$ represents a divalent group having at least a carbon atom and a fluorine atom; and n represents an integer of 3 or more, where $Rf^{21}$ and $Rf^{22}$ may contain any of oxygen atom and hydrogen atom, and $Rf^{21}$ and $Rf^{22}$ have chained (straightened or branched) or cyclic structure.

As used herein, the calculated value of the intercrosslink molecular weight refers to a total value of the atomic weights of an atomic group sandwiched by (a) and (a), (b) and (b), or (a) and (b), in the case where carbon atoms substituted with a total of 3 or more carbon atoms and/or silicon atoms are denoted as (a), and silicon atoms substituted with a total of 3 or more carbon atoms and/or oxygen atoms are denoted as (b), in a polymer obtained by the polymerization of all of the polymerizable unsaturated groups of the fluorine-containing polyfunctional monomer. For example, in the fluorine-containing polyfunctional monomer as described later, description is given by way of an example of X-22. Assuming that all of the polymerizable groups of X-22 are polymerized, it is represented by the X-22-1 below.

In this case, a partial structure to be a subject used for calculation of the intercrosslink molecular weight as defined above is a part surrounded by dotted lines, and the calculated values of the intercrosslink molecular weights are $C_2F_4O=116.0$ and $C_5H_2F_6O_3=224.1$, respectively, both of which are less than 500.

The calculated value of the intercrosslink molecular weight is also explained as follows. The calculated value of the intercrosslink molecular weight refers to a total value of the atomic weights of an atomic group sandwiched by (a) and (a), (b) and (b), (c) and (c), (a) and (b), (a) and (c) or (b) and (c), in the case where carbon atoms bonded to each of three or more polymerizable unsaturated groups via divalent or more linking group containing a carbon atom, silicon atom or oxygen atom, and carbon atoms which is directly bonded to the carbon atom, silicon atom or oxygen atom of the divalent or more linking group are denoted as (a), silicon atoms substituted with a total of 3 or more carbon atoms and/or oxygen atoms are denoted as (b), carbon atoms which are closer to the carbon atoms (a) mentioned above out of two carbon atoms constituting the unsaturated linkage is denoted as (c). For example, in the fluorine-containing polyfunctional monomer as described later, description is given by way of an example of X-22.

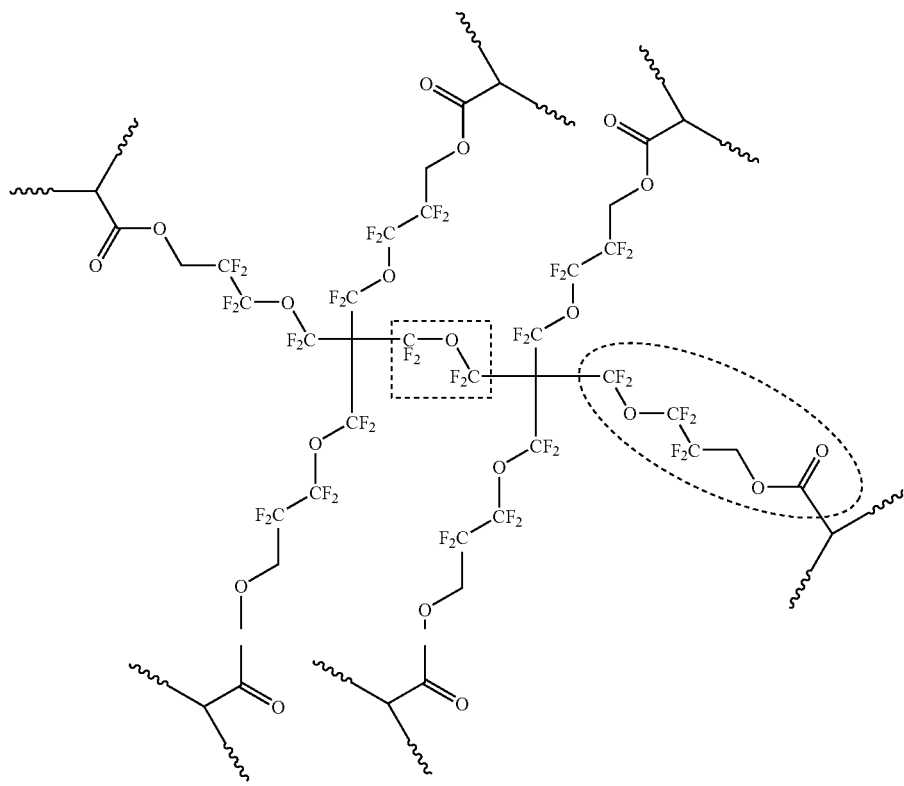

X-22-1

X-22

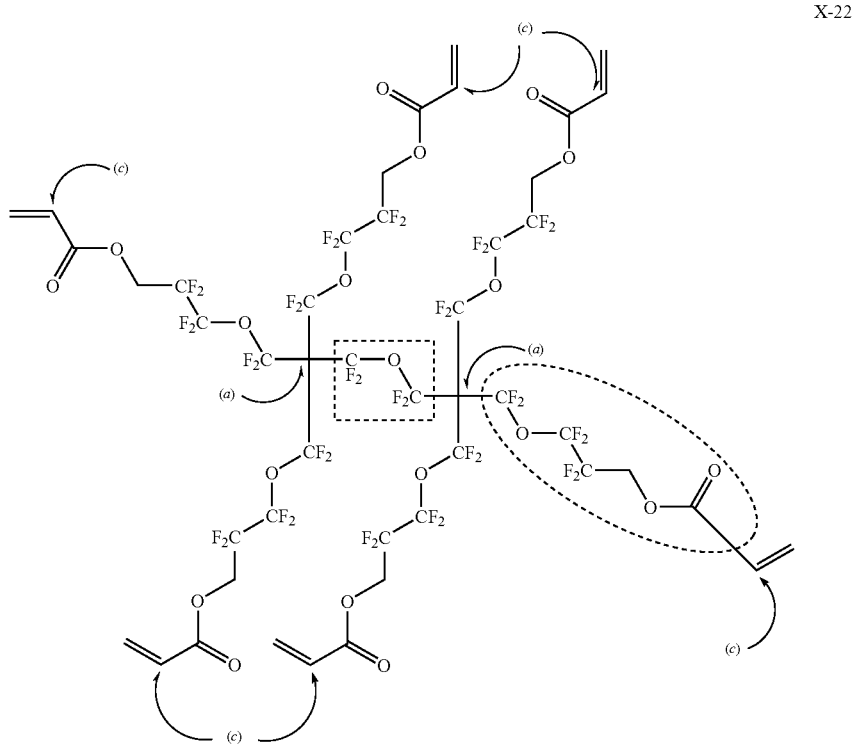

In this case, a partial structure to be a subject used for calculation of the intercrosslink molecular weight as defined above is a part surrounded by dotted lines, and the calculated values of the intercrosslink molecular weights are $C_2F_4O=116.0$ and $C_5H_2F_6O_3=224.1$, respectively, both of which are less than 500.

The calculated value of the intercrosslink molecular weight is preferably more than 50 and less than 500, more preferably more than 50 and less than 400, and most preferably more than 100 and less than 300. If the intercrosslink molecular weight is 500 or more, the hardness of a coated film may be reduced in some cases. Also, if it is less than 50, the fluorine content is reduced, and as a result, the refractive index may increase, or the compatibility together with the fluorine-containing antifouling agent having a polymerizable unsaturated group (A) or the fluorine-containing copolymer having a polymerizable unsaturated group (B) may be worsened, thereby leading to deterioration of the antifouling durability, in some cases.

The contained amount of fluorine atom in one molecule is preferably 35% by mass or more, and more preferably 40% by mass or more. If the contained amount of fluorine atom is 35% by mass or more, the compatibility with a fluorine contained polymer having a polymerizable unsaturated group or a fluorine contained antifouling agent having a polymerizable unsaturated group is excellent, and is thus preferable.

In the low refractive index layer, if the fluorine-containing polyfunctional monomer is used in combination as the component (D), in addition to the fluorine-containing antifouling agent having a polymerizable unsaturated group (A), the fluorine-containing copolymer having a polymerizable unsaturated group (B), the inorganic fine particle (C), and the photopolymerization initiator (D), it is possible to impart excellent scratch resistance with a low refractive index, as well as to obtain an antireflective film excellent in antifouling durability. Here, it is more preferable to use a non-fluorine-containing polyfunctional monomer and a fluorine-containing polyfunctional monomer in combination as the component (D), from the viewpoint of scratch resistance and antifouling durability.

Specific examples of the monomer represented by the formula (1) and having a calculated value of the entire intercrosslink molecular weight of less than 500 are shown below, but not limited to thereto. The contained amount of fluorine atom is represented by $C_f$ (% by mass).

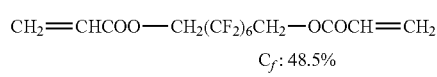

X-1

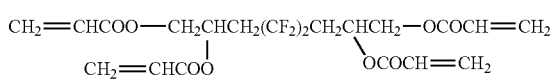

X-2

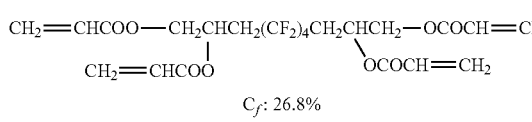

X-3

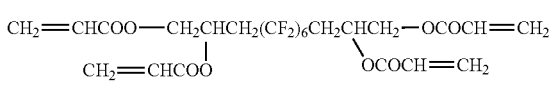

X-4

-continued
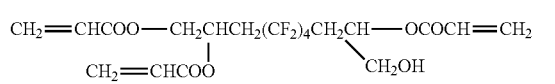
X-6
$C_f$: 24.8%
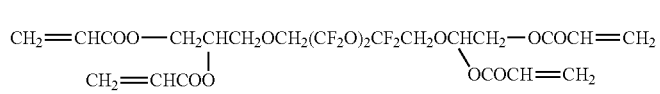
X-8
$C_f$: 19.2%
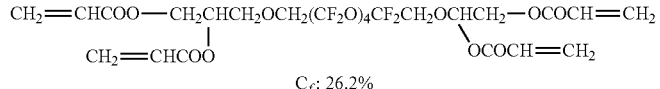
X-9
$C_f$: 26.2%
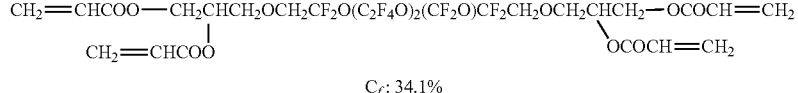
X-10
$C_f$: 34.1%
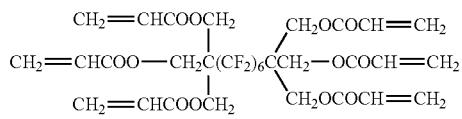
X-11
$C_f$: 27.3%
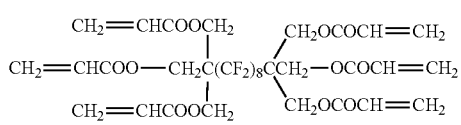
X-12
$C_f$: 32.5%
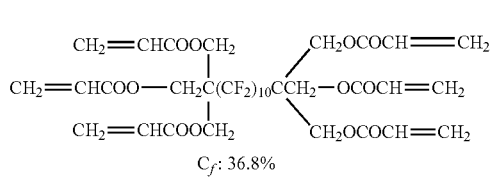
X-13
$C_f$: 36.8%
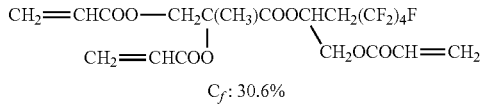
X-14
$C_f$: 30.6%
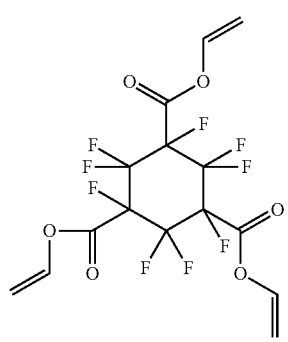
X-21
$C_f$: 37.5%

-continued
X-22
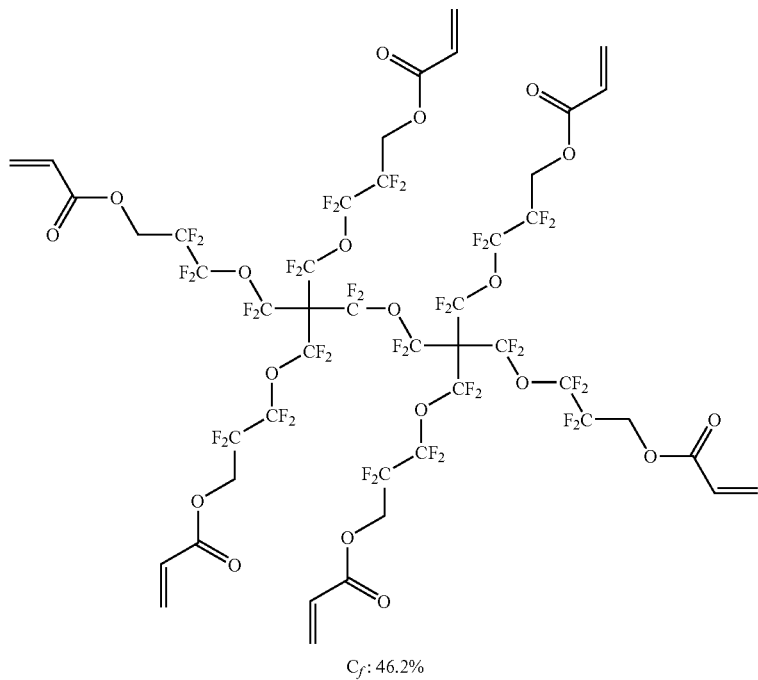
$C_f$: 46.2%
X-23
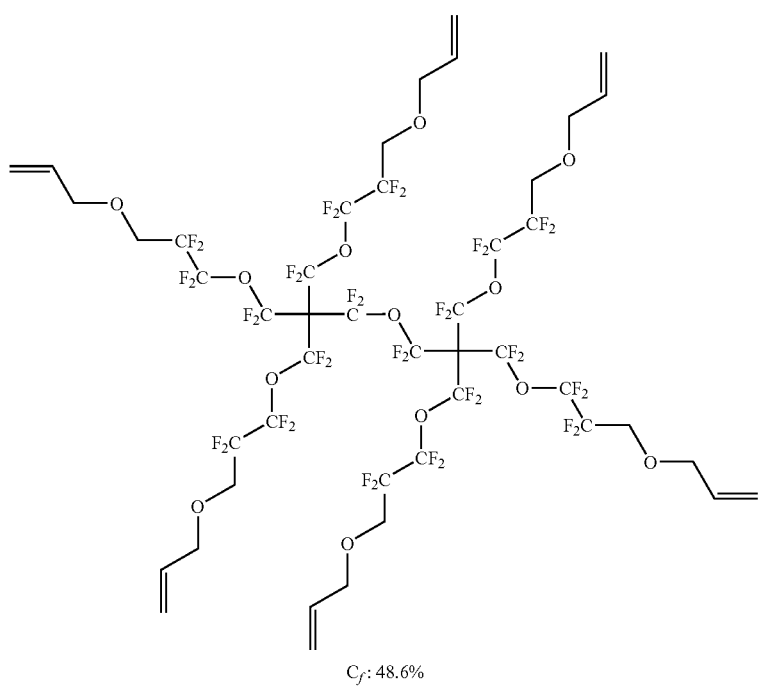
$C_f$: 48.6%

-continued
X-24
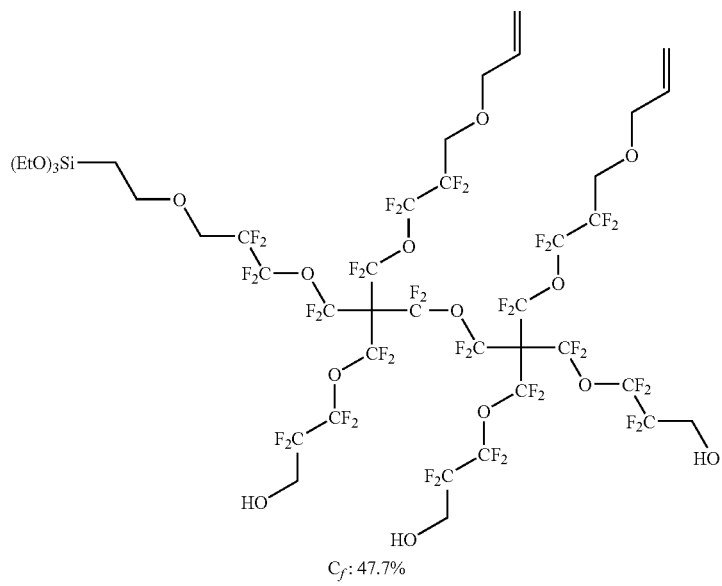
Cf: 47.7%
X-25
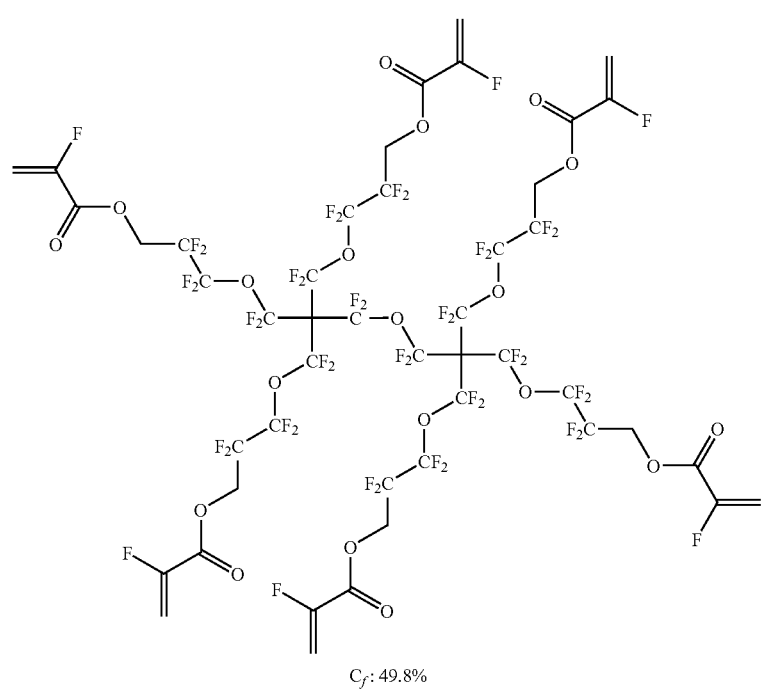
Cf: 49.8%

-continued
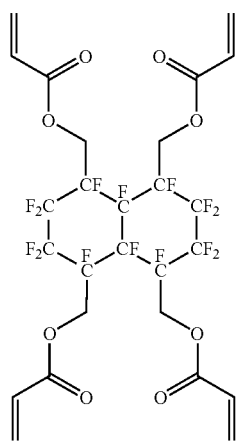
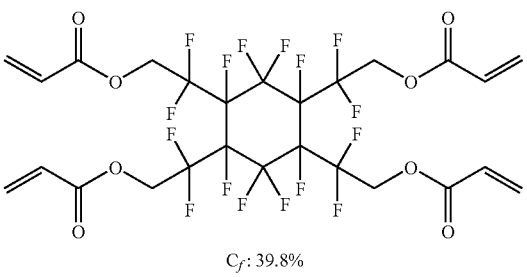
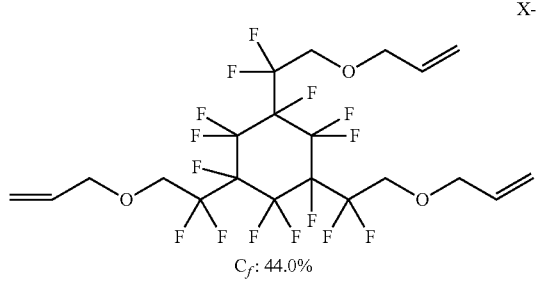
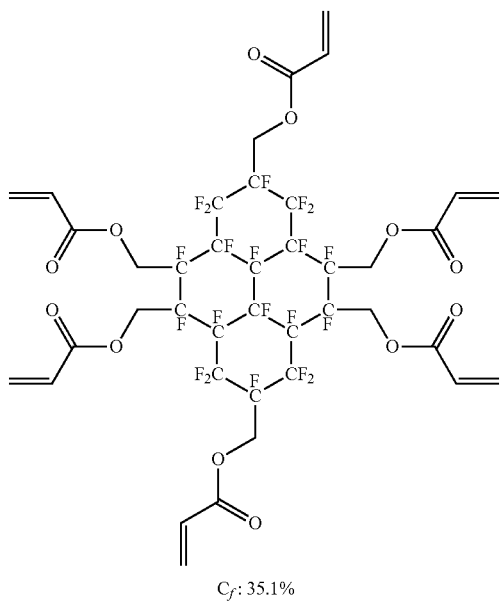
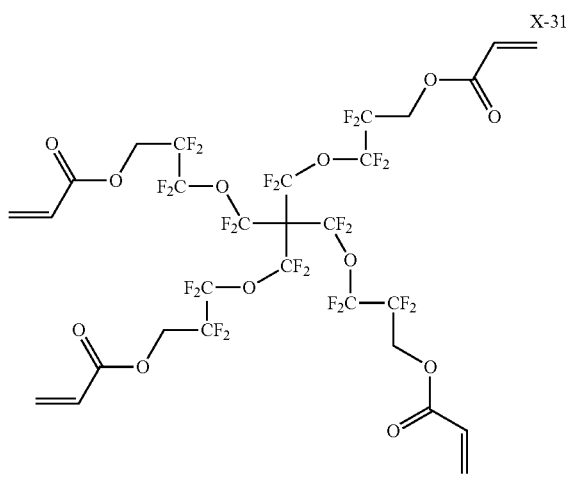
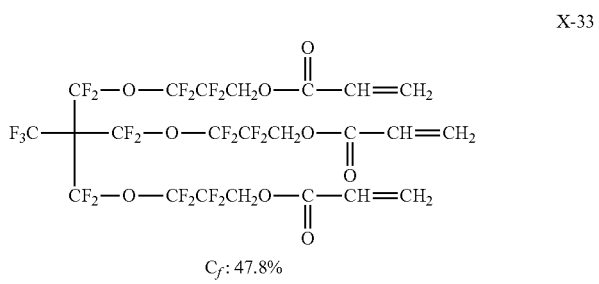

Further, the following M-1 to M-16 as described in the paragraph numbers [0062] to [0065] of JP-A-2006-284761 can also be preferably used.
M-1
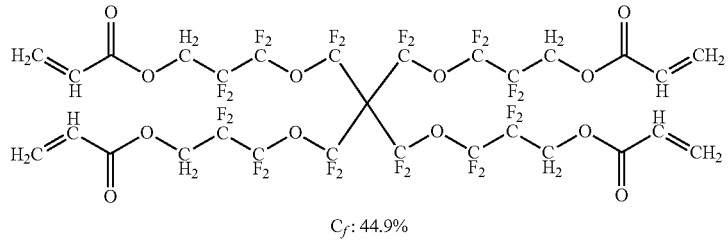
M-2
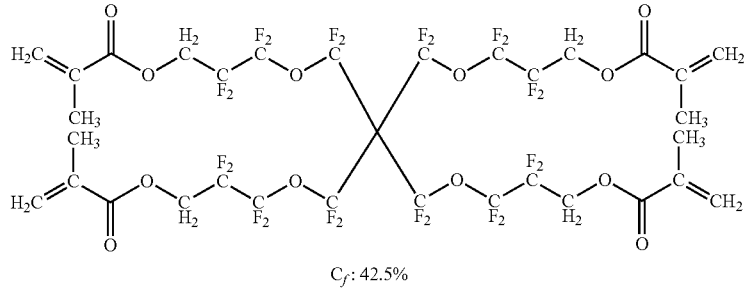
M-3
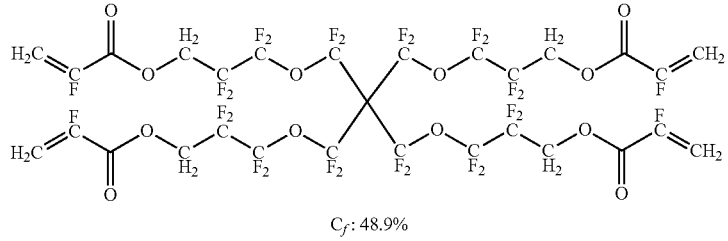
M-4
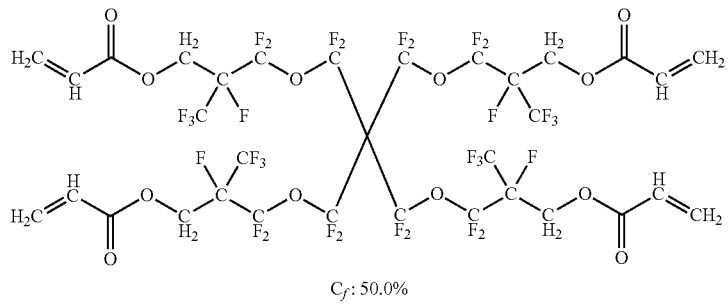
M-5
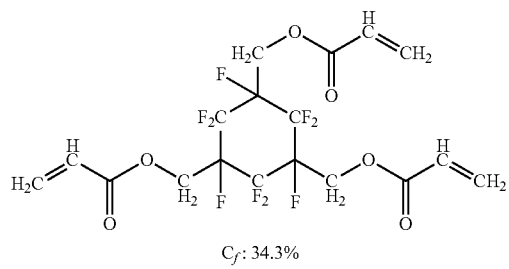
M-6
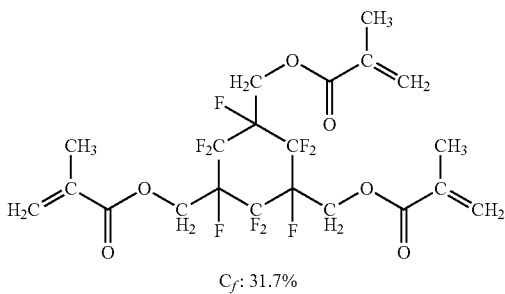

-continued
M-7
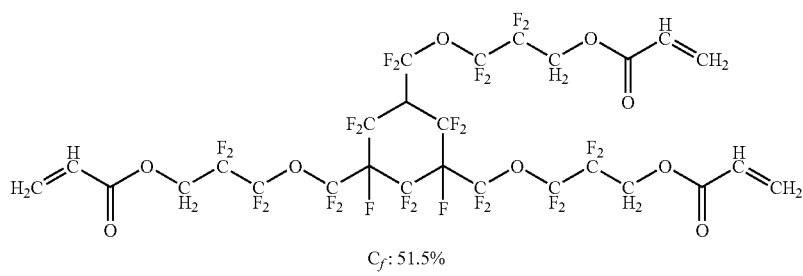
M-8
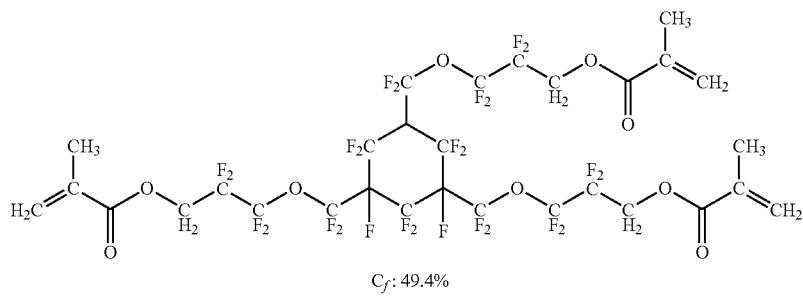
M-9
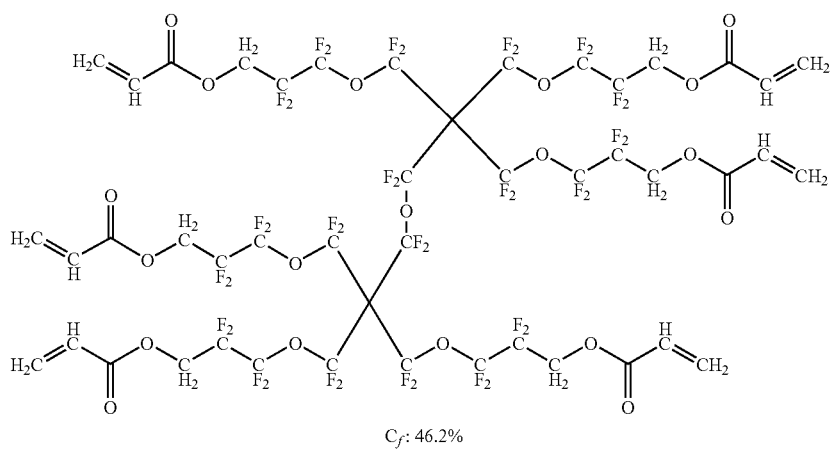
M-10
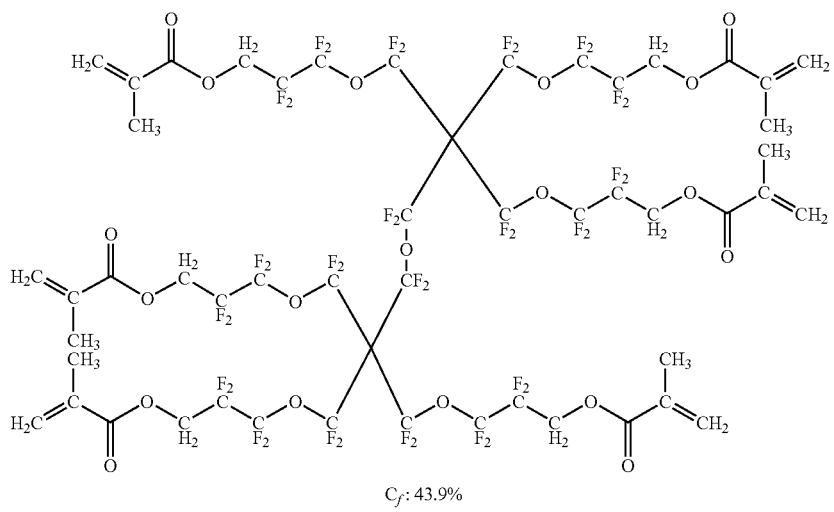

-continued
M-11
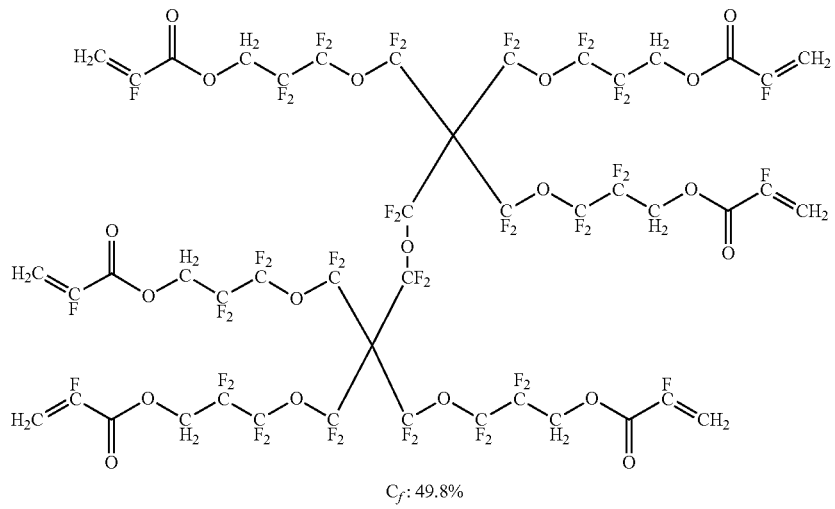
$C_f$: 49.8%
M-12
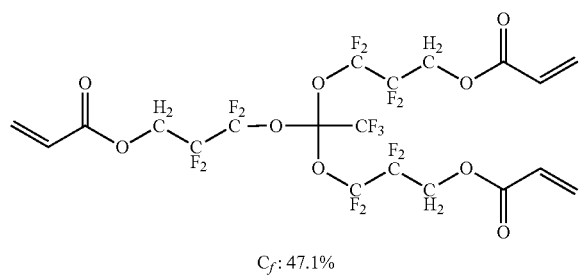
$C_f$: 47.1%
M-13
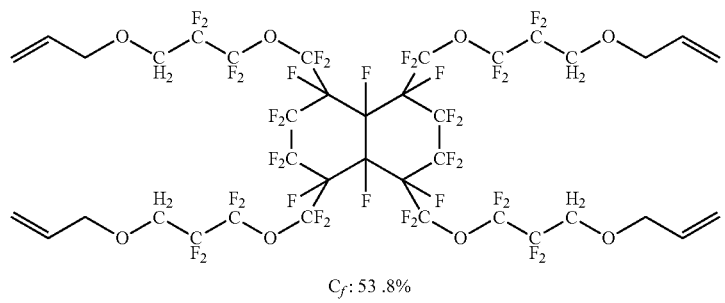
$C_f$: 53.8%
M-14
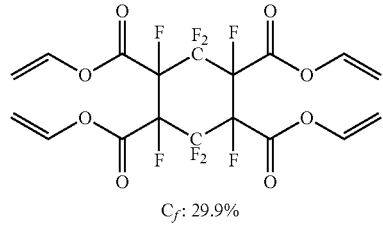
$C_f$: 29.9%
M-16
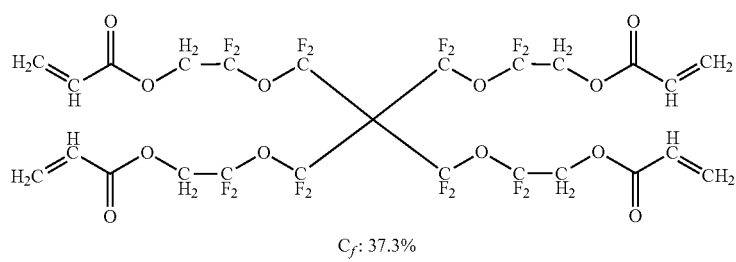
$C_f$: 37.3%

Further, the compounds MA1 to MA20 as shown below can also be preferably used.
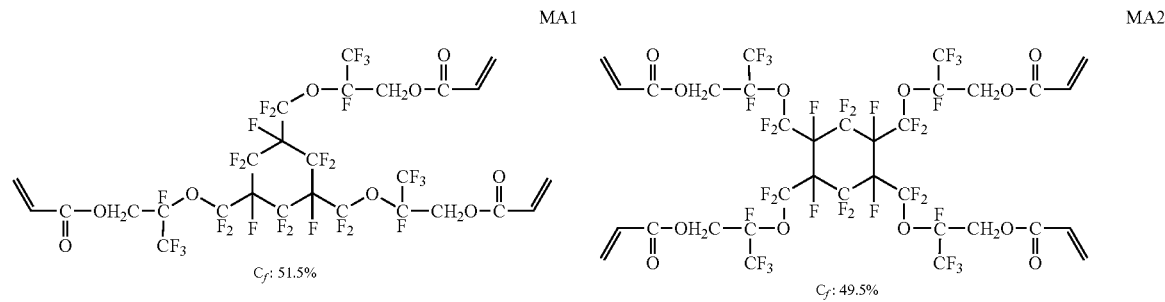
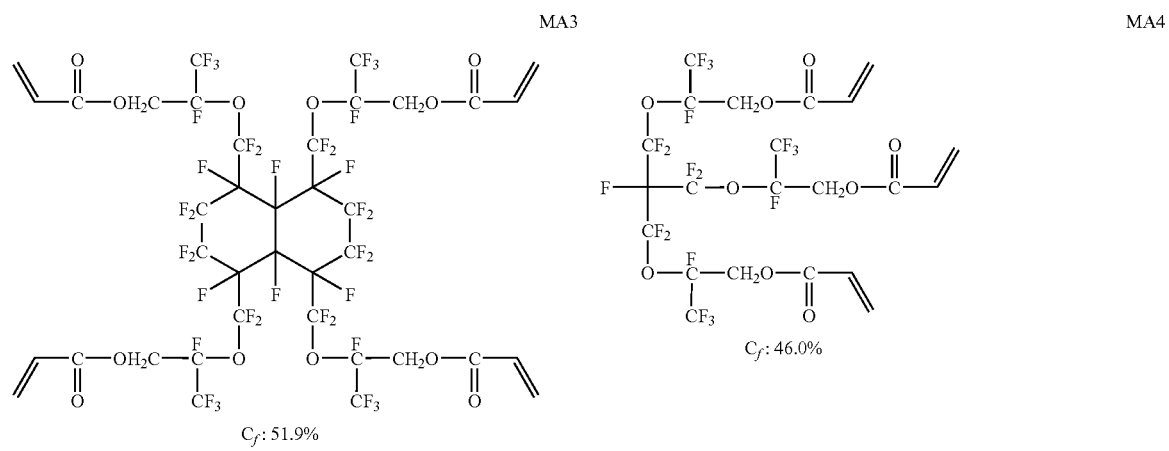
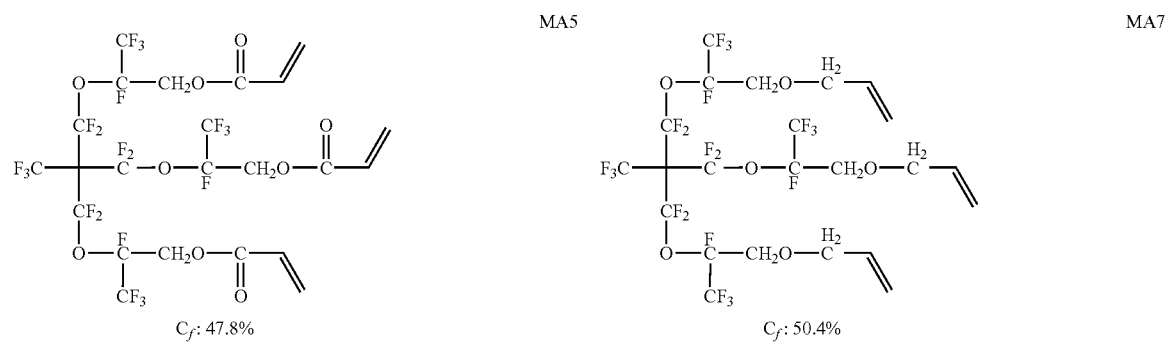
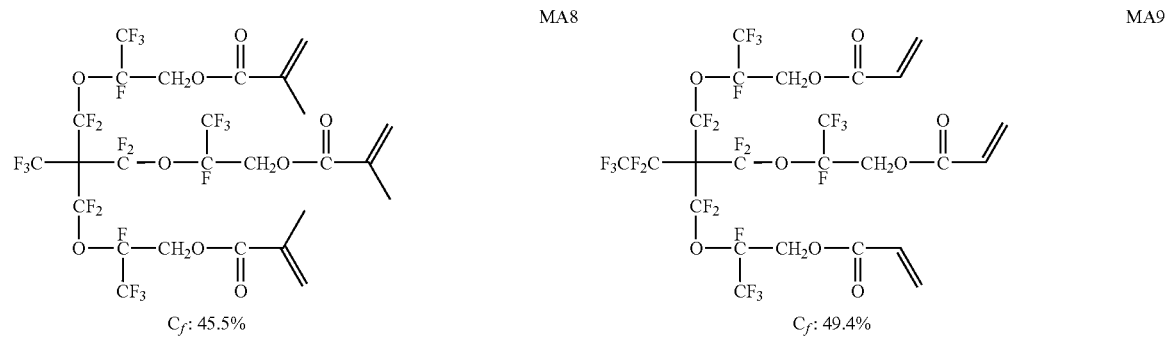

-continued
MA10
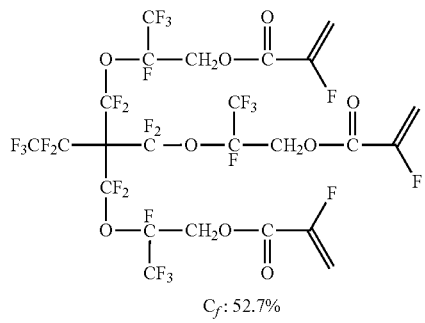
$C_f$: 52.7%
MA11
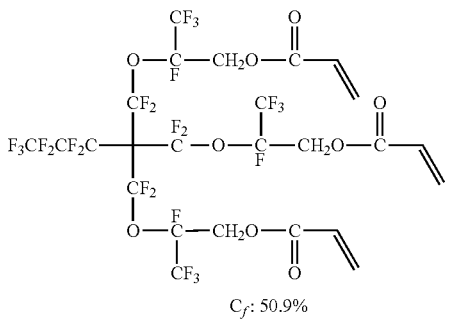
$C_f$: 50.9%
MA12
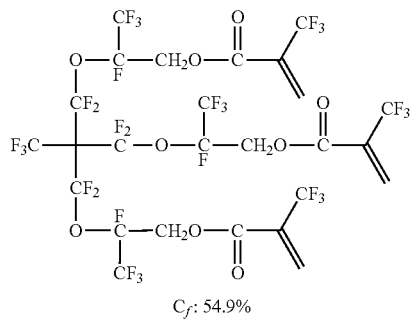
$C_f$: 54.9%
MA13
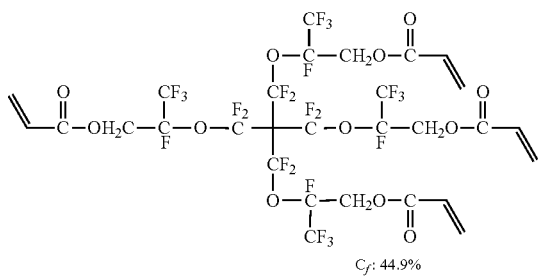
$C_f$: 44.9%
MA14
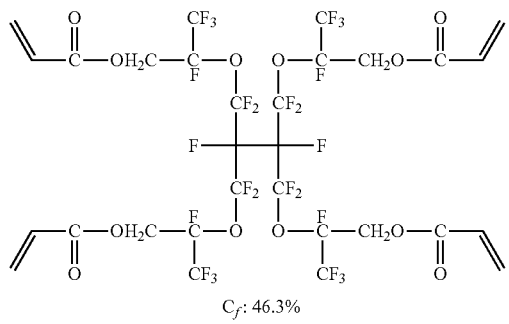
$C_f$: 46.3%
MA15
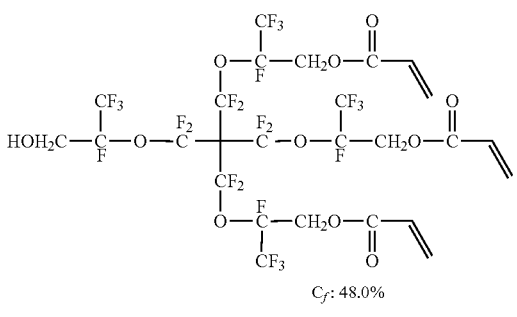
$C_f$: 48.0%
MA17
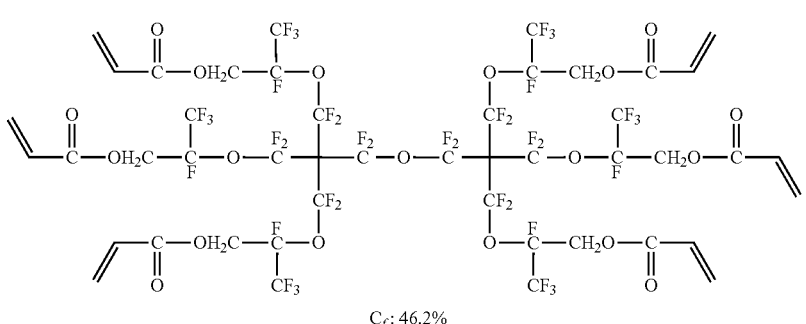
$C_f$: 46.2%

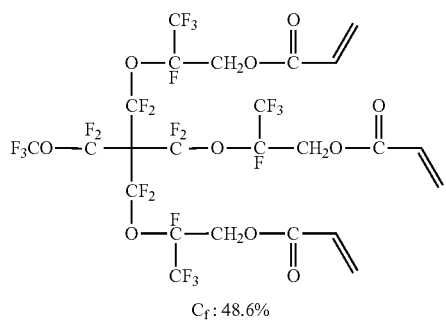

MA18

$C_f$: 48.6%

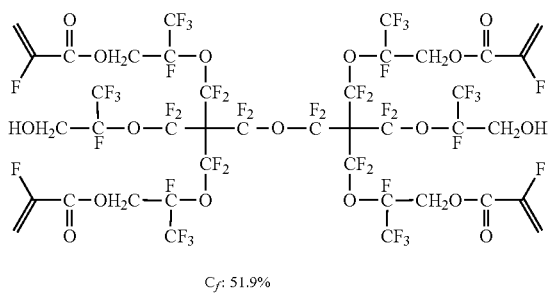

MA19

$C_f$: 51.9%

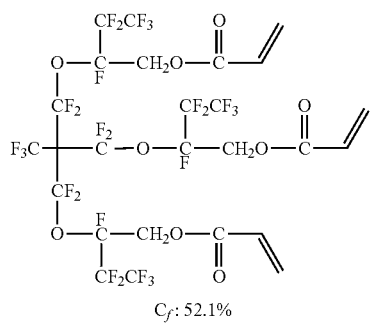

MA20

$C_f$: 52.1%

Among these, it is particularly preferable to use X-22 and M-1, and it is most preferable to use M-1, from the viewpoint of obtaining a coated film in high scratch resistance, low refractive index property, and excellent antifouling durability.

In the present invention, as the constituting component of the low refractive index layer, a polyfunctional fluorine-containing acrylate represented by the following general formula (FM) can also be preferably used.

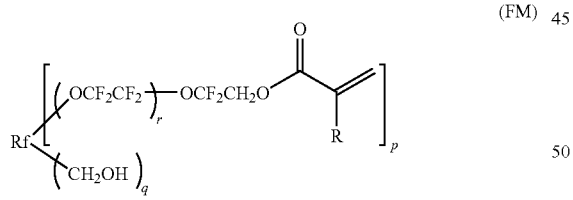

(FM)

In the formula, Rf represents a (p+q)-valent group having at least a carbon atom and a fluorine atom; p represents an integer of 2 to 10; q represents an integer of 0 to 8; and (p+q) represents an integer of 2 to 10, where Rf may be straight chain or branched and may have an ether bond, Rf is preferably a (p+q)-valent group composed of only a carbon atom and a fluorine atom, or a (p+q)-valent group composed of only carbon atom, a fluorine atom, and an oxygen atom.

Rf preferably has 1 to 20 carbon atoms, and more preferably 1 to 10 carbon atoms. Preferable examples of Rf are shown below, but the present invention is not limited thereto.

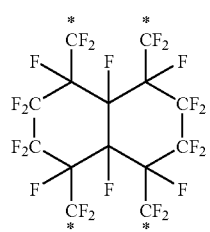

Rf-1

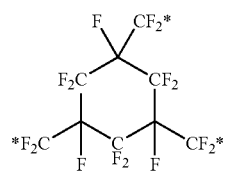

Rf-2

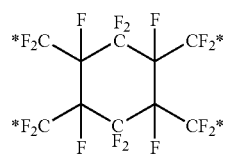

Rf-3

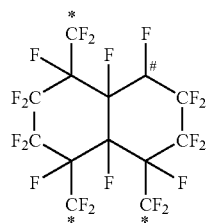

Rf-4

-continued

Rf-5 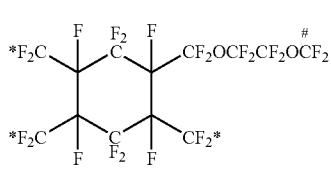

Rf-6 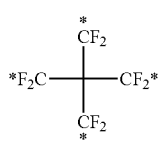

Rf-7 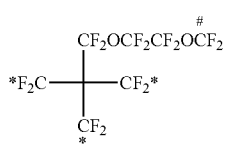

Rf-8 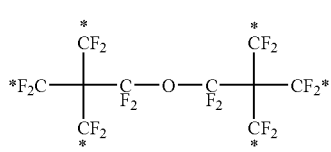

Rf-9 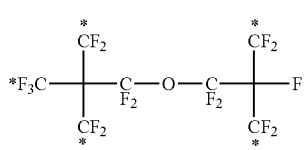

Rf-10 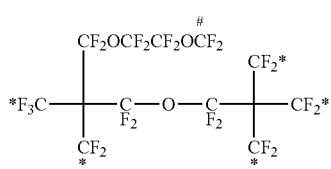

Rf-11 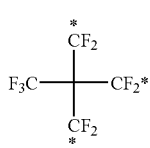

Rf-12 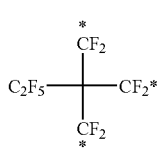

Rf-13 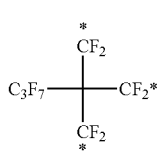

Rf-14 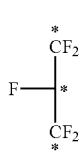

Rf-15 

Rf-16 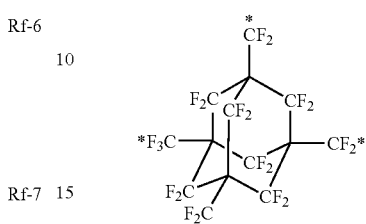

Rf-17 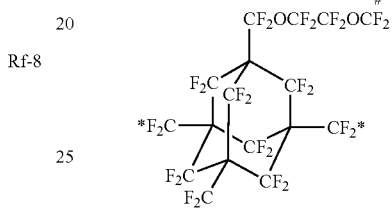

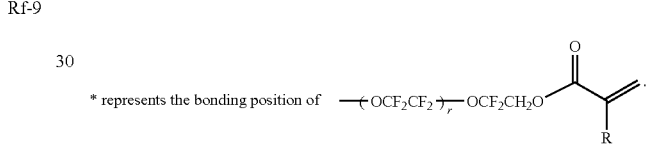

p is preferably an integer of 3 to 6, and at the same time, q is preferably an integer of 0 to 3, and (p+q) becomes an integer of 3 to 6.

r represents a repeating number of repeating unit (OCF$_2$CF$_2$) in formula (FM) and can be selected in the range such that the calculated value of the intercrosslink molecular weight be less than 500, and the value is preferably 1 or 2, and more preferably 1. The polyfunctional fluorine-containing acrylate, represented by the general formula (FM) has p numbers of linking groups represented by —(OCF$_2$CF$_2$)$_r$—OCF$_2$CH$_2$O— in one molecule, but each r in one molecule may be the same or different. If r is 2 or less, the density of the crosslinking groups becomes higher, which is thus preferable since it can allow the strength of the coated film to be enhanced. Particularly, it is possible to improve the efficiency of the outer layer of the coated film, while providing excellent antifouling durability.

R represents a hydrogen atom, a methyl group, a fluorine atom, or a trifluoromethyl group, and preferably a hydrogen atom.

The polyfunctional fluorine-containing acrylates represented by the general formula (FM) may be used singly or in combination of two or more thereof. Specific examples of the polyfunctional fluorine-containing acrylates represented by the general formula (FM) are shown below. Here, as a representative example, only a case where r=1 is shown without limitation.

(FM-1)
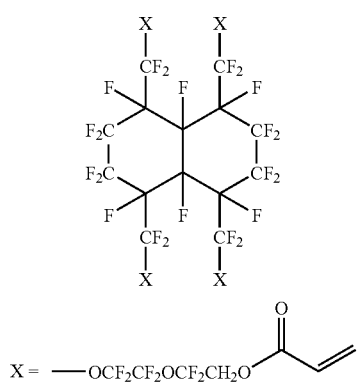
(FM-2)
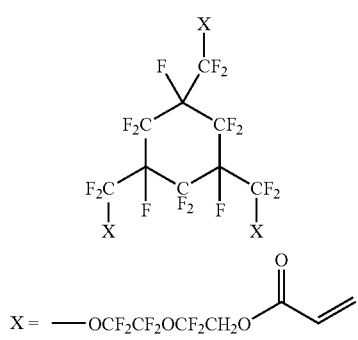
(FM-3)
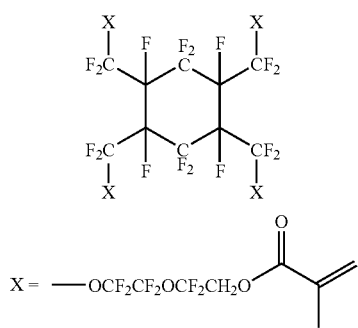
(FM-4)
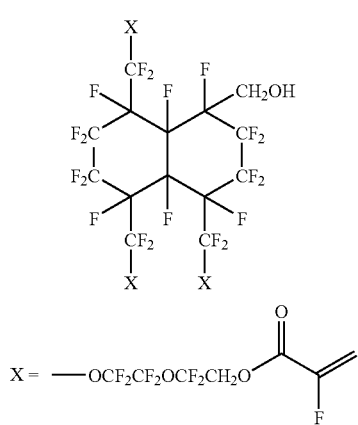
(FM-5)
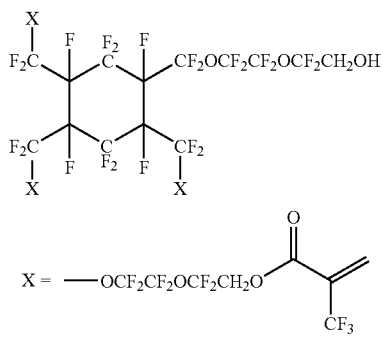
(FM-6)
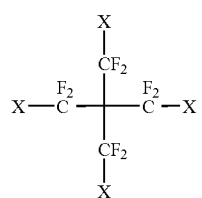
(FM-7)
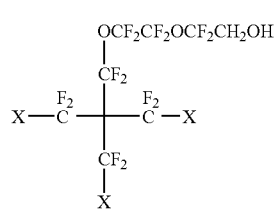
(FM-8)
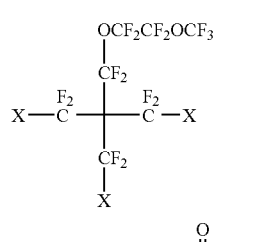
(FM-9)
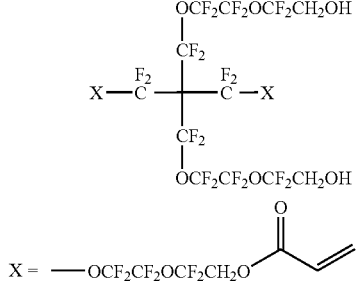

(FM-10)
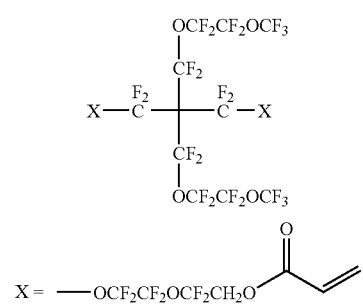
(FM-11)
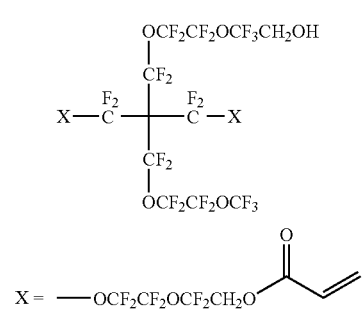
(FM-12)
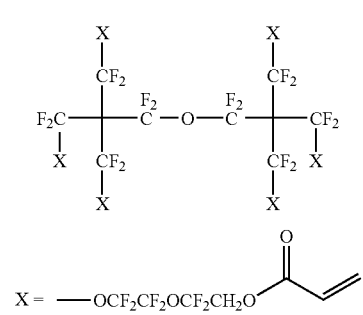
(FM-13)
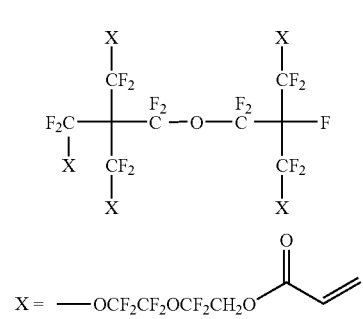
(FM-14)
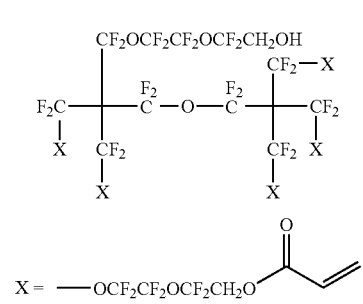
(FM-15)
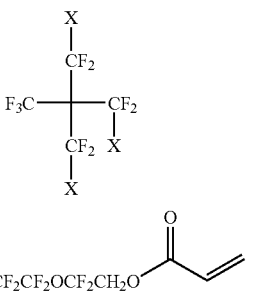
(FM-16)
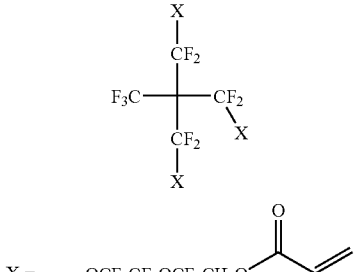
(FM-17)
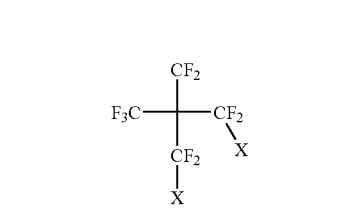
(FM-18)
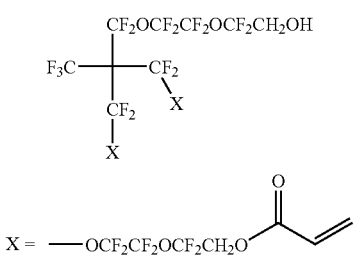
(FM-19)
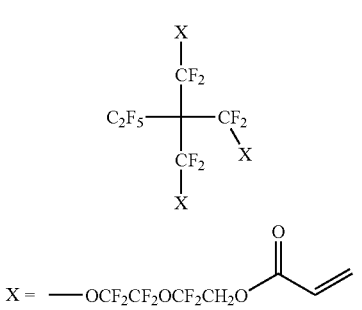

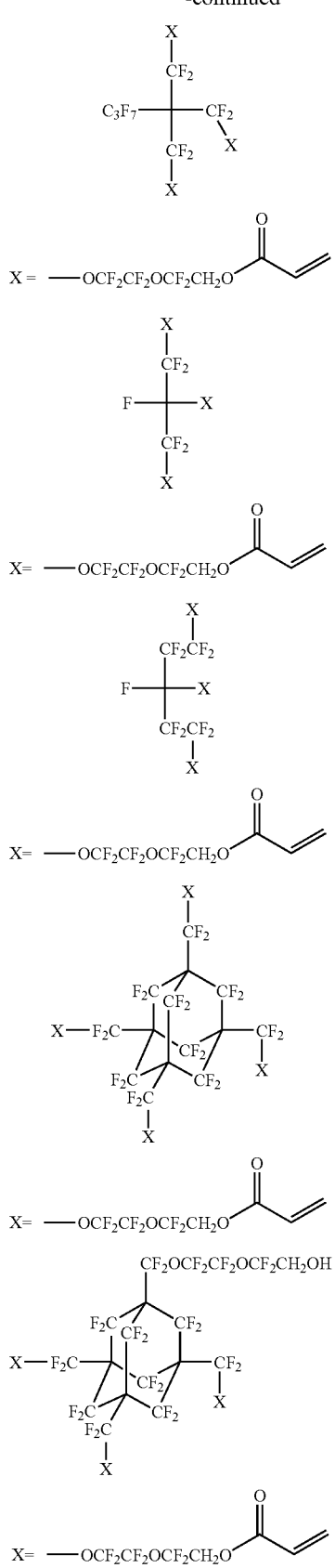

the liquid-phase fluorination reaction as described in Pamphlet of International Publication No. 90/03353 or Pamphlet of International Publication No. 00/56694.

[Solvent]

The solvent which is used to dissolve the coating composition for forming any of the above-described layers is not particularly limited, but alcohol- and ketone-based solvents are preferably used. Specific examples thereof include acetone, methyl ethyl ketone, 2-pentanone, 3-pentanone, 2-hexane, 2-heptanone, 4-heptanone, methyl isopropyl ketone, ethyl isopropyl ketone, diisopropyl ketone, methyl isobutyl ketone, methyl-t-butyl ketone, diacetyl, acetylacetone, acetonylacetone, diacetone alcohol, mesityl oxide, chloroacetone, cyclopentanone, cyclohexanone, acetophenone, and the like. Among these, methyl ethyl ketone and methyl isobutyl ketone are preferred. These solvents may be used singly or in combination thereof at any mixing ratio.

Auxiliary solvents may be used appropriately, including an ester-based solvent (for example, propylene glycol monomethyl ether acetate, and the like) or a fluorine-based solvent (for example, fluorine-based alcohols, and the like). These solvents may also be used singly or in combination at any mixing ratio.

[Composition for Low Refractive Index Layer]

The coating composition as a composition for low refractive index layer of the present invention contains a fluorine-containing antifouling agent having a polymerizable unsaturated group (A), a fluorine-containing copolymer having a polymerizable unsaturated group (B), an inorganic fine particle (C), and, if needed, a polyfunctional monomer having a polymerizable unsaturated group (D) and photopolymerization initiator or the like. Preferable content of each component in coating composition for forming the low refractive index layer is explained. Here, content means ratio of solid content (% by mass) with respect to the total solid content contained in the coating composition. The content of (A) is preferably from 1 to 15% by mass, more preferably from 1 to 10% by mass, and most preferably from 2 to 7% by mass. The content of (B) is preferably from 5 to 70% by mass, more preferably from 5 to 50% by mass, and most preferably from 5 to 30% by mass. The content of (C) is preferably from 10 to 70% by mass, more preferably from 20 to 60% by mass, and most preferably from 35 to 55% by mass. The content of (D) is preferably from 0 to 60% by mass, more preferably from 5 to 60% by mass, particularly preferably from 10 to 50% by mass, and most preferably from 20 to 40% by mass. If the content of (A) is less than 1% by mass, an effect of improving the antifouling property cannot be obtained, whereas if it is more than 15% by mass, the surface state deterioration is caused by blurring, and the like. If the content of the component (C) is present at less than 10% by mass, an effect of improving the scratch resistance cannot be obtained, whereas if it is more than 70% by mass, deterioration of the surface state such as whitening of the coated film, and the like is caused. If the content of the component (D) is 5 to 60% by mass, an antireflective film having good scratch resistance, antifouling durability, coating property, and refractive index can be obtained.

In the case where the coating composition contains the solvent mentioned above, the solvent is preferably used such that the solid content concentration in the coating composition alters from 0.1 to 20% by mass, more preferably from 1 to 15% by mass, and most preferably from 1 to 10% by mass.

(Production Method of Antireflection Film)

The antireflection film of the present invention can be formed by the following method, but is not limited to. A coating composition containing components for forming The polyfunctional fluorine-containing acrylate represented by formula (MF), can be easily synthesized by using each layer is prepared. Next, the coating composition is coated on a transparent support by a dip coating method, an air knife coating method, a curtain coating method, a roller coating method, a wire bar coating method, a gravure coating method, or a die coating method, and is then heated/dried. A microgravure coating method, a wire bar coating method and a die coating method (see, the specification of U.S. Pat. No. 2,681,294 and the specification of JP-A-2006-122889) are more preferred, and a die coating method is particularly preferred.

After the coating, the layer formed of the coating composition is cured by irradiating light or under heating, whereby a low refractive index layer is formed. If desired, an optical layer (a layer constituting the film, which is the described layer, for example, a hardcoat layer, an antiglare layer, a medium refractive index layer, a high refractive index layer, and the like) may be previously coated on a transparent support, and a low refractive index layer may be formed thereon. In this way, the optical film of the present invention is obtained.

(Construction of Layer of Antireflective Film)

The antireflective film of the present invention can be prepared by providing at least a low refractive index layer, and as demanded according to the purpose, one, or two or more functional layers on the transparent support.

As one preferred embodiment, an antireflective film laminated on a transparent support, taking into consideration a refractive index, a film thickness, the number of layers, the order of layers, and the like, so as to reduce the reflectivity by optical interference, may be mentioned. The antireflective film may be the simplest constitution in which only a low refractive index layer is placed on a transparent support. In order to further reduce the reflectivity, the antireflective layer preferably has a constitution in which a high refractive index layer having a higher refractive index than that of the transparent support and a low refractive index layer having a lower refractive index than that of the transparent support are combined. Examples of the constitution include a two-layer constitution having a high refractive index layer/low refractive index layer provided from the side of the transparent support, a three-layer constitution having layers having different refractive indices, a constitution having lamination of a medium refractive index layer (layer having a higher refractive index than that of the transparent support and a lower refractive index than that of the high refractive index layer)/a high refractive index layer/a low refractive index layer in this order, and the like, and a constitution having lamination of a larger number of antireflective layers has been also proposed. Among these, a constitution having a medium refractive index layer/a high refractive index layer/a low refractive index layer in this order on a transparent support having a hardcoat layer is preferred from the viewpoints of durability, optical characteristics, cost, productivity, and the like, and examples thereof include the constitutions as described in JP-A-8-122504, JP-A-8-110401, JP-A-10-300902, JP-A-2002-243906, JP-A-2000-111706, and the like. Further, a different function may be imparted on each layer, and examples of such a layer include a low refractive index layer having an antifouling property, a high refractive index layer having antistatic property (for example, JP-A-10-206603, JP-A-2002-243906, and the like), and the like.

The antireflection layer of the present invention has a configuration in which a medium refractive index layer, a high refractive index layer, and a low refractive index layer are laminated on a transparent support in this order from the side of the transparent support, wherein the medium refractive index layer has a refractive index at a wavelength of 550 nm of 1.60 to 1.65 and a thickness of 50.0 nm to 70.0 nm, the high refractive index layer has a refractive index at a wavelength of 550 nm of 1.70 to 1.74 and a thickness of 90.0 nm to 115.0 nm, and the low refractive index layer has a refractive index at a wavelength of 550 nm of 1.33 to 1.38 and a thickness of 85.0 nm to 95.0 nm.

Among these constitutions for the antireflection layer of the present invention, Constitution (1) or Constitution (2) below are particularly preferred.

Constitution (1)

The medium refractive index layer has a refractive index at a wavelength of 550 nm of 1.60 to 1.64 and a thickness of 55.0 nm to 65.0 nm, the high refractive index layer has a refractive index at a wavelength of 550 nm of 1.70 to 1.74 and a thickness of 105.0 nm to 115.0 nm, and the low refractive index layer has a refractive index at a wavelength of 550 nm of 1.33 to 1.38 and a thickness of 85.0 nm to 95.0 nm.

Constitution (2)

The medium refractive index layer has a refractive index at a wavelength of 550 nm of 1.60 to 1.65 and a thickness of 55.0 nm to 65.0 nm, the high refractive index layer has a refractive index at a wavelength of 550 nm of 1.70 to 1.74 and a thickness of 90.0 nm to 100.0 nm, and the low refractive index layer has a refractive index at a wavelength of 550 nm of 1.33 to 1.38 and a thickness of 85.0 nm to 95.0 nm.

By allowing the refractive index and the thickness of each layer to be in the above-described ranges, variation in the reflected color can be reduced. The constitution (1) is a constitution which is capable of inhibiting variation in the reflected color and particularly reducing the reflectivity, which is particularly preferable. Further, the constitution (2) is a constitution which is capable of inhibiting variation in the reflectivity to one smaller than the constitution (1), which is particularly preferable since it provides excellent robustness properties against variation in the film thickness.

Furthermore, in the present invention, with regard to the designed wavelength λ (=550 nm: representative of a wavelength region in which a luminous efficacy is highest), it is preferable that the medium refractive index layer satisfies the following equation (I), the high refractive index layer satisfies the following equation (II), and the low refractive index layer satisfies the following equation (III).

$$\lambda/4 \times 0.68 < n^1 d^1 < \lambda/4 \times 0.74 \qquad \text{Equation (I)}$$

$$\lambda/2 \times 0.66 < n^2 d^2 < \lambda/2 \times 0.72 \qquad \text{Equation (II)}$$

$$\lambda/4 \times 0.84 < n^3 d^3 < \lambda/4 \times 0.92 \qquad \text{Equation (III)}$$

(wherein $n^1$ is a refractive index of the medium refractive index layer, $d^1$ is a layer thickness (nm) of the medium refractive index layer, $n^2$ is a refractive index of the high refractive index layer, $d^2$ is a layer thickness (nm) of the high refractive index layer, $n^3$ is a refractive index of the low refractive index layer, $d^3$ is a layer thickness (nm) of the low refractive index layer, and $n^3 < n^1 < n^2$).

If the equation (I), the equation (II), and the equation (III) are satisfied, the reflectivity is lowered, and a change in the reflected color can be inhibited, which is thus preferable. Further, this reduces a change in the color tint when fat and oil components such as those from a fingerprint, a sebaceous oil, and the like are attached, and thus the stains are hardly perceived, which is thus preferable.

The color tint of a regular reflecting light for incident light at an angle of 5° of a CIE (Commission Internationale l'Éclairage) standard light source D65 in a wavelength region from 380 to 780 nm satisfies the conditions that the a* and b* values of the CIE1976 L*a*b* color space are in the ranges of $0 \leq a^* \leq 8$ and $-10 \leq b^* \leq 0$, respectively. Further, if the color difference ΔE due to 2.5% variation in the thickness of an arbitrary layer out of the layers within the color tint variation range falls in the range of the following equation (5), the reflected color with good neutrality is obtained, the reflected color does not differ among the finished products, and if fat and oil components such as those from a fingerprint, a sebaceous oil, and the like are attached, the stains are not visible by the eyes, which is thus preferable. By using the fluorine-containing antifouling agent having a polymerizable unsaturated group, and the low refractive index layer containing a fluorine-containing polyfunctional acrylate, and the constitution of the layers in the combination in the present invention, magic markers or fat and oil components such as those from a fingerprint, a sebaceous oil, and the like are hardly attached even with a multi-layer interference film constitution, and if attached, they are easily wiped off, and cannot be visible by the eyes.

$$\Delta E = \{(L^*-L^{*\prime})^2 + (a^*-a^{*\prime})^2 + (b^*-b^{*\prime})^2\}^{1/2} \leq 3 \qquad \text{Equation (5)}$$

(wherein $L^{*\prime}$, $a^{*\prime}$, and $b^{*\prime}$ are the color tints of reflected light at a designed film thickness).

Further, by setting an average value of the mirror surface reflectivity to 0.5% or less upon installation on the surface of an image display device, the reflected glare can be remarkably reduced, which is thus preferable.

Further, when the refractive index of the high refractive index layer is controlled, it is preferable to use the inorganic fine particle as described later, but a titanium dioxide particle that is well-used in the art brings about problems such as light resistance deterioration and the like due to a photocatalyst action, and also problems with preparation adaptability, durability, and the like in some cases. The present inventors have found that by setting the refractive index of the high refractive index layer to the above-described range, it is unexpectedly possible to use an inorganic fine particle having a lower refractive index than that of the titanium dioxide particle, for example, a zirconium oxide particle, which leads to excellent preparation adaptability and durability.

As for the measurement of the specular reflectivity and the color tint, the antireflection property can be evaluated by mounting an adapter "ARV-474" on a spectrophotometer "V-550" (manufactured by JASCO Corp.), measuring the specular reflectivity for the outgoing angle of −θ at an incident angle of θ (θ: from 5 to 45°, intervals of 5°) in the wavelength region of 380 to 780 nm, and calculating the average reflectivity at 450 to 650 nm. Furthermore, the color tint of reflected light can be evaluated by calculating, from the reflection spectrum measured, the L*, a*, and b* values of the CIE1976 L*a*b* color space, which are values indicating the color tint of regularly reflected light for incident light at each incident angle of a CIE standard illuminant D65.

The refractive index of each layer can be measured using Multi-Wavelength Abbe Refractometer DR-M2 (manufactured by ATAGO Co., Ltd.) after applying the coating solution for each layer onto a glass plate to a thickness of 3 to 5 μm. In the present specification, a refractive index measured using a filter, "Interference Filter 546(e) nm for DR-M2, M4, Parts No. RE-3523", is employed as the refractive index at a wavelength of 550 nm.

The film thickness of each layer can be measured by observing the cross-section by means of a reflection spectroscopy film thickness meter "FE-3000" (manufactured by Otsuka Electronics Co., Ltd.) utilizing light interference or a TEM (transmission electron microscope). The refractive index can be measured simultaneously with the film thickness also by the reflection spectroscopy film thickness meter, but in order to increase the measurement accuracy of the film thickness, a refractive index of each layer measured by a different device is preferably used. In the case where the refractive index of each layer cannot be measured, the measurement of the film thickness by TEM is preferred. In this case, it is preferred to measure the film thickness at 10 or more portions and use the average value thereof.

The antireflective film of the present invention preferably takes a form, in terms of a form at the production, in which the film is in a roll. In this case, in order to obtain color tint neutrality of the reflected color, the layer thickness distribution value calculated by the following formula (6) with the parameters being the average d (average value), minimum d (minimum value) and maximum d (maximum value) of the layer thickness in the range of an arbitrary 1000 m length is preferably 5% or less, more preferably 4% or less, still more preferably 3% or less, yet still more preferably 2.5% or less, and particularly preferably 2% or less, in each layer of the thin-film layers.

$$(\text{Maximum d} - \text{Minimun d}) \times 100 / \text{Average d} \qquad \text{Equation (6)}$$

Next, the transparent support and each of the layers, which constitute the antireflective film of the present invention, will be described in detail.

[Transparent Support]

The transparent support of the antireflective film of the present invention is preferably a transparent substrate film. The transparent substrate film is not particularly limited, but examples thereof include a transparent resin film, a transparent resin plate, a transparent resin sheet, a transparent glass, and the like. Examples of the transparent resin film include a cellulose acylate film (for example, a cellulose triacetate film (refractive index: 1.48), a cellulose diacetate film, a cellulose acetate butyrate film, a cellulose acetate propionate film), a polyethylene terephthalate film, a polyethersulfone film, a polyacrylic-based resin film, a polyurethane-based resin film, a polyester film, a polycarbonate film, a polysulfone film, a polyether film, a polymethylpentene film, a polyether ketone film, a (meth)acrylonitrile film, a polyolefin, a polymer having an alicyclic structure (a norbornene-based resin (Aton: trade name, manufactured by JSR Corporation), an amorphous polyolefin (ZEONEX: trade name, manufactured by ZEON Corporation, Japan)), and the like. Among these, triacetylcellulose, polyethylene terephthalate, and a polymer having an alicyclic structure are preferred, and triacetylcellulose is particularly preferred.

The thickness of the transparent support used may be usually of the order of 25 to 1000 μm, but it is preferably from 25 to 250 μm, and more preferably from 30 to 90 μm.

The width of the transparent support may be arbitrarily used but from the viewpoint of handling, yield and productivity, the width is usually from 100 to 5000 mm, preferably from 800 to 3000 mm, and more preferably from 1000 to 2000 mm. The transparent support can be handled as a lengthy film in the roll form, and the length is usually from 100 to 5000 m, and preferably from 500 to 3000 m.

The surface of the transparent support is preferably smooth and preferably has an average roughness Ra value of 1 μm or less. The average roughness value is preferably from 0.0001 to 0.5 μm, and more preferably from 0.001 to 0.1 μm.

The transparent support is described in the paragraphs [0163] to [0169] of JP-A-2009-98658, and also in the present invention.

(Hardcoat Layer)

The antireflective film of the present invention can be provided with a hardcoat layer in order to impart the physical strength of a film. Though, in the present invention, the hardcoat layer is not necessary to be provided, the antireflective film provided with a hardcoat layer has enhanced scratch resistance against scratch test with pencil or the like, and which is thus preferable.

Preferably, a low refractive index layer is provided on the hardcoat layer, and more preferably, a medium refractive index layer and a high refractive index layer are provided between the hardcoat layer and the low refractive index layer, thereby constituting the antireflective film.

The hardcoat layer may be composed of a lamination of two or more layers.

In the present invention, from the viewpoint of optical design for obtaining an antireflective film, the refractive index of the hardcoat layer is preferably from 1.48 to 2.00, and more preferably from 1.48 to 1.60. In the present invention, at least one low refractive index layer is present on the hardcoat layer and therefore, if the refractive index is too smaller than the above-described range, the antireflection property tends to decrease, whereas if it is too large, the color tint of the reflected light tends to be intensified.

From the viewpoint of imparting sufficient durability and impact resistance on the film, the film thickness of the hardcoat layer is usually from about 0.5 μm to 50 μm, preferably from 1 μm to 20 μm, and more preferably from 5 μm to 20 μm.

Further, the strength of the hardcoat layer is preferably H or more, more preferably 2H or more, and most preferably 3H or more, in a pencil hardness test. Also, in the Taber test in accordance with JIS (Japanese Industrial Standars) K5400, the abrasion loss of the specimen between the before and after tests is preferably smaller.

The hardcoat layer is preferably formed through a crosslinking or polymerization reaction of an ionizing radiation curable compound. For example, by applying a coating composition containing an ionizing radiation curable polyfunctional monomer or polyfunctional oligomer on a transparent support, and performing a crosslinking or polymerization reaction of the polyfunctional monomer or polyfunctional oligomer, the hardcoat layer can be formed.

The functional group in the ionizing radiation curable polyfunctional monomer or polyfunctional oligomer is preferably a photo-, electron beam- or radiation-polymerizable functional group, and among these, a photopolymerizable functional group is preferred.

Examples of the photopolymerizable functional group include unsaturated polymerizable functional groups such as a (meth)acryloyl group, a vinyl group, a styryl group, an allyl group, and the like. Among these, a (meth)acryloyl group is preferred. Specifically, the compounds as mentioned in the section (Polyfunctional monomer having a polymerizable unsaturated group) as described above can be preferably used.

For the purpose of imparting internal scattering property, the hardcoat layer may contain a matte particle, for example, an inorganic compound particle or a resin particle, having an average particle diameter from 1.0 to 10.0 μm, and preferably from 1.5 to 7.0 μm.

For the purpose of controlling the refractive index of the hard coat layer, various refractive index monomers or inorganic particles, or both of these may be added to the hard coat layer. The inorganic particle is effective not only in controlling the refractive index but also in suppressing curing shrinkage caused by cross-linking reaction. In the present invention, the term "binder" includes a polymer formed by polymerization of polyfunctional monomers and/or high refractive index monomers described above, or the like; and inorganic particles dispersed therein, after the hardcoat layer formed. From the stand point of suppressing the tint unevenness caused by interference between the hardcoat layer and the support, using of silica fine particle as the inorganic particle for controlling the refractive index is preferred.

(Antiglare Layer)

The antiglare layer contained in the film of the present invention is formed for the purpose of imparting the antiglare property due to the surface scattering, and preferably the hardcoat property for improving the hardness, the scratch resistance of the film, to the film.

The antiglare layer is described in the paragraphs [0178] to [0189] of JP-A-2009-98658, and also in the present invention.

(High Refractive Index Layer and Medium Refractive Index Layer)

The refractive index of the high refractive index layer is preferably from 1.70 to 1.74, and more preferably from 1.71 to 1.73 as described above. The refractive index of the medium refractive index layer is adjusted to be between the refractive index of the low refractive index layer and the refractive index of the high refractive index layer. The refractive index of the medium refractive index layer is preferably from 1.60 to 1.64, and more preferably from 1.61 to 1.63.

As for a method for forming the high refractive index layer and the medium refractive index layer, a transparent thin film of inorganic oxide formed by a chemical vapor deposition (CVD) method or a physical vapor deposition (PVD) method, particularly, a vacuum deposition method or a sputtering method, which is a kind of physical vapor deposition method, may be used, but a method by all-wet coating is preferred.

The medium refractive index layer can be prepared in the same manner by using the same materials as the high refractive index layer, except that the refractive indices are different from that of the high refractive index layer, and therefore, the high refractive index layer is particularly described below.

The high refractive index layer is preferably formed by applying a coating composition containing an inorganic fine particle, a curable compound (hereinafter sometimes referred to as a "binder") containing a trifunctional or greater polymerizable group, a solvent, and a polymerization initiator, drying of the solvent, and curing the coating by either one or both means of heating and irradiation of ionizing radiation. In the case of using a curable compound or an initiator, the curable compound is cured through a polymerization reaction by the effect of heat and/or ionizing radiation after coating, whereby a medium or high refractive index layer having excellent scratch resistance and adhesion can be formed.

(Inorganic Fine Particle)

The inorganic fine particle is preferably a inorganic fine particle containing an oxide of a metal, and a inorganic fine particle containing at least one oxide of a metal selected from Ti, Zr, In, Zn, Sn, Al and Sb is more preferable. It is also preferable that at least one of the medium refractive index layer and the high refractive index layer contains a conductive inorganic fine particle. From the viewpoint of a refractive index, a fine particle of zirconium oxide is preferred as the inorganic fine particle. From the viewpoint of conductivity, it is preferred to use an inorganic fine particle in which the main component is an oxide of at least one metal of Sb, In, and Sn. As the conductive inorganic fine particle, at least one oxide of a metal selected from tin doped indium oxide (ITO), antimony doped tin oxide (ATO), fluorine doped tin oxide (FTO), phosphorous doped tin ixide (PTO), zinc antimonite (AZO), indium doped zinc oxide (IZO), zinc oxide, ruthenium oxide, rhenium oxide, silver oxide, nickel oxide and copper oxide is more preferable. The refractive index can be adjusted to a predetermined range by changing the amount of the inorganic fine particle. The average particle diameter of the inorganic fine particle in the layer is, when zirconium oxide is used as the main component, preferably from 1 to 120 nm, more preferably from 1 to 60 nm, and still more preferably from 2 to 40 nm. This range is preferred because the haze is inhibited and dispersion stability and adhesion to the upper layer by virtue of appropriate irregularities on the surface are enhanced.

The refractive index of the inorganic fine particle comprising zirconium oxide as the main component is preferably from 1.90 to 2.80, more preferably from 2.00 to 2.40, and most preferably from 2.00 to 2.20.

The amount of the inorganic fine particle added varies depending on the layer to which the inorganic fine particle is added, and in the medium refractive index layer, the amount added is preferably from 20 to 60% by mass, more preferably from 25 to 55% by mass, and still more preferably from 30 to 50% by mass, based on the solid content of the entire medium refractive index layer. In the high refractive index layer, the amount added is preferably from 40 to 90% by mass, more preferably from 50 to 85% by mass, and more preferably from 60 to 80% by mass, based on the solid content of the entire high refractive index layer.

The particle diameter of the inorganic fine particle can be measured by a light-scattering method or an electron micrograph.

The specific surface area of the inorganic fine particle is preferably from 10 to 400 $m^2/g$, more preferably from 20 to 200 $m^2/g$, and most preferably from 30 to 150 $m^2/g$.

For the purpose of dispersion stability in the dispersion or coating solution or enhancement in the affinity or binding with the binder component, the inorganic fine particle may be subjected to a physical surface treatment such as a plasma discharge treatment, a corona discharge treatment, and the like, or a chemical surface treatment with a surfactant, a coupling agent or the like. Use of a coupling agent is particularly preferred. As for the coupling agent, an alkoxy metal compound (for example, a titanium coupling agent and a silane coupling agent) is preferably used. Among these, a treatment with a silane coupling agent having an acryloyl or methacryloyl group is particularly effective. The chemical surface treating agent of inorganic fine particle, the solvent, the catalyst, and the stabilizer of dispersion are described in the paragraphs [0058] to [0083] of JP-A-2006-17870.

The inorganic fine particle can be dispersed using a disperser. Examples of the disperser include a sand grinder mill (for example, a bead mill with pin), a high-speed impeller mill, a pebble mill, a roller mill, an attritor, a colloid mill, and the like. Among these, a sand grinder mill and a high-speed impeller mill are preferred. A preliminary dispersion treatment may be performed. Examples of the disperser for use in the preliminary dispersion treatment include a ball mill, a three-roll mill, a kneader and an extruder. The inorganic fine particle is preferably dispersed in the dispersion medium to have a particle size as small as possible. The mass average diameter is from 10 to 120 nm, preferably from 20 to 100 nm, more preferably from 30 to 90 nm, and still more preferably from 30 to 80 nm.

By dispersing the inorganic fine particle to a small particle size of 200 nm or less, the high refractive index layer and the medium refractive index layer can be formed without impairing transparency.

(Curable Compound)

The curable compound is preferably a polymerizable compound, and as the polymerizable compound, an ionizing radiation curable polyfunctional monomer or polyfunctional oligomer is preferably used. The functional group in this compound is preferably a photo-, electron beam- or radiation-polymerizable functional group, and among these, a photopolymerizable functional group is preferred.

Examples of the photopolymerizable functional group include an unsaturated polymerizable functional group such as a (meth)acryloyl group, a vinyl group, a styryl group, an allyl group, and the like. Among these, a (meth)acryloyl group is preferred.

As Specific examples the photopolymerizable polyfunctional monomer having a photopolymerizable functional group, the compounds as mentioned in the section (Polyfunctional monomer having a polymerizable unsaturated group) as described above can be preferably used.

In the high refractive index layer, a surfactant, an antioxidant, a coupling agent, a thickener, a coloration inhibitor, a coloring agent (for example, pigment, dye), a defoaming agent, a leveling agent, a flame retardant, an ultraviolet absorbent, an infrared absorbent, an adhesion-imparting agent, a polymerization inhibitor, an antioxidant, a surface modifier, a conductive metal fine particle, and the like may be added in addition to the above-described components (for example, an inorganic fine particle, a curable compound, a polymerization initiator, a photosensitizer, and the like).

The high refractive index layer and the medium refractive index layer for use in the present invention are each preferably formed as follows. A curable compound (for example, the above-described ionizing radiation curable polyfunctional monomer, polyfunctional oligomer, and the like) as a binder precursor necessary for the matrix formation, a photopolymerization initiator, and the like are added to a dispersion obtained by dispersing the inorganic fine particle in a dispersion medium as described above, to prepare a coating composition for the formation of the high refractive index layer and the medium refractive index layer, and the coating composition for the formation of the high refractive index layer and the medium refractive index layer are preferably coated on the transparent support and cured through a crosslinking or polymerization reaction of the curable compound.

Simultaneously with or after the coating of the high refractive index layer or the medium refractive index layer, the binder of the layer is preferably crosslinked or polymerized with the dispersant.

The binder in the thus-produced high or medium refractive index layer takes a form, for example, such that the anionic group of the dispersant is taken into the binder as a result of crosslinking or the polymerization reaction between the above-described preferred dispersant and the ionizing radiation curable polyfunctional monomer or polyfunctional oligomer. The anionic group taken into the binder of the high refractive index layer and the medium refractive index layer has a function of maintaining the dispersed state of the inorganic fine particle, and the crosslinked or polymerized structure imparts a film-forming ability to the binder, whereby the high refractive index layer and the medium refractive index layer containing the inorganic fine particle are improved in terms of the physical strength, the chemical resistance, and the weather resistance.

In the formation of the high refractive index layer, the crosslinking or the polymerization reaction of the curable compound is preferably performed in an atmosphere having an oxygen concentration of 10% by volume or less.

By forming the high refractive index layer in an atmosphere having an oxygen concentration of 10% by volume or less, the high refractive index layer can be improved in terms of the physical strength, the chemical resistance, the weather resistance, and the adhesion between the high refractive index layer and a layer adjacent to the high refractive index layer. The layer formation through a crosslinking or polymerization reaction of the curable resin is preferably performed in an atmosphere having an oxygen concentration of 6% by volume or less, more preferably 4% by volume or less, still more preferably 2% by volume or less, and most preferably 1% by volume or less.

As described above, the medium refractive index layer can be obtained using the same materials in the same manner as the high refractive index layer.

Specifically, for example, a main composition is formulated by selecting the type of fine particle and the type of resin and determining the blending ratio therebetween so that the medium refractive index layer and the high refractive index layer can satisfy the film thickness and refractive index of the equations (I) and (II) above.

The same solvents as being used for the coating composition for the low refractive index layer also can be used for coating compositions for forming every layer described above.

[Low Refractive Index Layer]

The refractive index of the low refractive index layer of the present invention is preferably from 1.30 to 1.47. The refractive index of the low refractive index layer in the case of a multi-layer thin film interference type of an antireflective film (medium refractive index layer/high refractive index layer/low refractive index layer) is preferably from 1.33 to 1.38, and more preferably from 1.35 to 1.37. This range is preferably set since the film strength can be maintained while reducing the reflectivity. As for the method of forming the low refractive index layer, similarly to the above, a transparent thin film of inorganic oxide formed by a chemical vapor deposition (CVD) method or a physical vapor deposition (PVD) method, particularly, a vacuum deposition method or a sputtering method, which is a kind of physical vapor deposition method, may be used, but a method by all-wet coating using a composition for a low refractive index layer is preferably used.

The haze of the low refractive index layer is preferably 3% or less, more preferably 2% or less, and most preferably 1% or less.

The strength of the antireflective film where layers up to the low refractive index layer are formed, is preferably H or more, more preferably 2H or more, and most preferably 3H or more, in a pencil hardness test with a load of 500 g.

Also, in order to improve the antifouling performance of the antireflective film, the contact angle for water on the surface is preferably 95° or more, and more preferably 102° or more. In particular, if the contact angle is 105° or more, the antifouling performance against a fingerprint is remarkable and improved, which is thus particularly preferable. Further, it is more preferable that the contact angle of water is 102° or more, and the surface free energy is 25 dyne/cm or less, particularly preferably 23 dyne/cm or less, and still more preferably 20 dyne/cm or less. It is most preferable that the contact angle of water is 105° or more, and the surface free energy is 20 dyne/cm or less.

(Formation of Low Refractive Index Layer)

The low refractive index layer is preferably formed by applying the coating composition having dissolved or dispersed therein the fluorine-containing antifouling agent having a polymerizable unsaturated group (A), the fluorine-containing copolymer having a polymerizable unsaturated group (B), the inorganic fine particle (C), and, if desired, other arbitrary components, and simultaneously with the applying or after the applying and drying, curing the resulting through a crosslinking or polymerization reaction by the irradiation of ionizing radiation (for example, irradiation of light, irradiation of electron beam, and the like) or by heating.

In particular, when the low refractive index layer is formed through a crosslinking or polymerization reaction of an ionizing radiation curable compound, the crosslinking or polymerization reaction is preferably performed in an atmosphere having an oxygen concentration of 10% by volume or less. By forming the low refractive index layer in an atmosphere having an oxygen concentration of 1% by volume or less, an outermost layer having excellent physical strength and chemical resistance can be obtained.

The oxygen concentration is preferably 0.5% by volume or less, more preferably 0.1% by volume or less, particularly preferably 0.05% by volume or less, and most preferably 0.02% by volume or less.

As a means of reducing the oxygen concentration to 1% by volume or below, replacement of the air (nitrogen concentration: about 79% by volume, oxygen concentration: about 21% by volume) with another gas is suitable, and replacement with nitrogen purge by nitrogen) is particularly suitable.

[Conductive Layer]

In the present invention, the fluorine-containing antifouling agent (A) can exhibit an excellent antifouling property by a low refractive index, but since fluorine is oriented on the surface of the coated film, there is a tendency of static electricity and a reduction in antidust property. The antireflective film preferably has a conductive layer from the standpoint of preventing the static electricity on the film surface in the present invention. The conductive layer may be provided separately from the thin-film layer described above of the present invention or the layer may be made to serve also as the conductive layer. For example, further to the medium refractive index layer or the high refractive index layer, a conductive layer may be provided between the transparent support and the low refractive index layer, or the medium or high refractive index layer may be a medium or high refractive index layer having conductive property.

In the present invention, when the conductive layer is a separate layer from the layers as described above, the conductive layer may be provided as a layer located between layers, as a layer located between the transparent support and a layer closest to the transparent support, or an upper layer of the layer close to the film surface. The thickness of the conductive layer is preferably from 0.01 to 10 μm, more preferably from 0.03 to 7 μm, and still more preferably from 0.05 to 5 μm.

In the present invention, at least one layer of the layers possessed by the antireflective film can be formed as a conductive layer. Particularly, at least any one layer of the low refractive layer, the medium refractive index layer, and the high refractive index layer may be formed as a conductive layer by imparting conductivity to at least several layers of the these layers, which is highly preferable since it can simplify the process. In this case, the materials of the conductive layer are preferably selected so that the thickness and the refractive index of the layer can satisfy the condition of the medium refractive index layer and the high refractive index layer as described above. The low refractive index layer is the surface layer or a layer close to the surface of the antireflective film and therefore, when conductivity is imparted, this is most preferred from the standpoint of preventing the static electricity on the film surface. However, there is a problem that in many cases, the conductive particle or compound is a material having a high refractive index and a desired low refractive index can be hardly obtained. Since the conductive particle or compound is a material having a high refractive index, conductivity can be easily imparted to the medium or the high refractive index layer. The low refractive index layer, the medium refractive index layer, or the high refractive index layer imparted with conductivity preferably has a surface resistance value satisfying the equation (4) described below.

The materials used for the conductive layer and the performance of the conductive layer are described in detail below.

Examples of the method for forming the conductive layer include conventionally known methods such as a method of applying a conductive coating solution containing a conductive fine particle and a reactive curable resin, a method of applying a transparent conductive material comprising a transparent polymer having conductivity, and a method of vapor-depositing or sputtering a metal, a metal oxide, or the like, capable of forming a transparent film to form a conductive thin film. The conductive layer may be formed on the transparent support directly or through a primer layer which affords firm adhesion to the transparent support. In the case of providing the conductive layer as a layer close to the outermost surface layer of the antireflective film, the antistatic property can be satisfactorily obtained even when the layer thickness is small and this is preferred. In the present invention, at least one antireflective layer or a layer located between the transparent support and a antireflective layer closed to the transparent support of the antireflective layers is preferably a conductive layer. The coating method is not particularly limited, and an optimal method may be selected from known methods such as roll coating, gravure coating, bar coating, extrusion coating, and the like, according to the characteristics of the coating solution or the coated amount.

The conductive layer preferably has a surface resistance (SR) satisfying the following equation (4).

$$\text{Log } SR \leq 12 \qquad \text{Equation (4)}$$

The Log SR is preferably from 5 to 12, more preferably from 5 to 9, and most preferably from 5 to 8. The surface resistance (SR) of the conductive layer can be measured by a four-probe method or a circular electrode method.

The conductive layer is preferably substantially transparent. Specifically, the haze of the conductive layer is preferably 10% or less, more preferably 5% or less, still more preferably 3% or less, and most preferably 1% or less. Furthermore, the transmittance for light at a wavelength of 550 nm is preferably 50% or more, more preferably 60% or more, still more preferably 65% or more, and most preferably 70% or more.

(Conductive Inorganic Fine Particle of Conductive Layer)

The conductive layer may be formed using a coating composition obtained by dissolving a conductive fine particle and a reactive curable compound in a solvent. In this case, the conductive inorganic fine particle is preferably formed of a metal oxide or nitride. Examples of the metal oxide or nitride include tin oxide, indium oxide, zinc oxide and titanium nitride. Among these, tin oxide and indium oxide are particularly preferred. The conductive inorganic fine particle comprises such a metal oxide or nitride as the main component and may further contain other elements. The main component means a component having a largest content (% by mass) of the components constituting the particle. Examples of the other elements include Ti, Zr, Sn, Sb, Cu, Fe, Mn, Pb, Cd, As, Cr, Hg, Zn, Al, Mg, Si, P, S, B, Nb, In, V, and halogen atoms. To increase the conductivity of the tin oxide or indium oxide, addition of at least one of Sb, P, B, Nb, In, V, and halogen atoms is preferred. Specifically, one or two or more metal oxides selected from the group consisting of tin-doped indium oxide (ITO), antimony-doped tin oxide (ATO), fluorine-doped tin oxide (FTO), phosphorus-doped tin oxide (PTO), zinc antimonate (AZO), indium-doped zinc oxide (IZO), zinc oxide, ruthenium oxide, rhenium oxide, silver oxide, nickel oxide, and copper oxide is preferably used in combination. More preferred of them are tin-doped indium oxide (ITO), antimony-doped tin oxide (ATO), and phosphorus-doped tin oxide (PTO). The Sb proportion in ATO is preferably from 3% to 20% by mass, and the In proportion in ITO is preferably from 5% to 20% by mass.

The average particle diameter of the primary particle of the conductive inorganic fine particle for use in the conductive layer is preferably from 1 to 150 nm, more preferably from 5 to 100 nm, and most preferably from 5 to 70 nm. The average particle diameter of the conductive inorganic fine particle in the conductive layer formed is from 1 to 200 nm, preferably from 5 to 150 nm, more preferably from 10 to 100 nm, and most preferably from 10 to 80 nm. The average particle diameter of the conductive inorganic fine particle is an average diameter weighed by the mass of the particle and can be measured by a light scattering method or an electron micrograph.

The conductive inorganic fine particle may be surface-treated. The surface treatment is performed using an inorganic compound or an organic compound. Examples of the inorganic compound for use in the surface treatment include alumina and silica. A silica treatment is preferred. Examples of the organic compound for use in the surface treatment include a polyol, an alkanolamine, a stearic acid, a silane coupling agent, and a titanate coupling agent, with a silane coupling agent being most preferred. Specifically, the method as described in the section {Method for Surface Treatment of Inorganic Fine Particle} as described for the constituting component (C) of the present invention is preferably used. Further, the method as described in the paragraph numbers [0101] to [0122] of JP-A-2008-31327 can also be preferably used. Two or more surface treatments may be carried out in combination.

The shape of the conductive inorganic fine particle is preferably rice grain-like, spherical, cubic, spindle-like or amorphous.

Two or more kinds of conductive inorganic fine particles may be used in combination in the conductive layer.

The proportion of the conductive inorganic fine particle in the conductive layer is preferably from 20 to 90% by mass, more preferably from 25 to 85% by mass, and still more preferably from 30 to 80% by mass, based on the entire solid content.

The conductive inorganic fine particle is used in a dispersion state for the formation of the conductive layer. The dispersion medium for the conductive inorganic fine particle is preferably a liquid having a boiling point of 60 to 170° C. Examples of the dispersion medium include water, an alcohol (for example, methanol, ethanol, isopropanol, butanol, benzyl alcohol), a ketone (for example, acetone, methyl ethyl ketone, methyl isobutyl ketone, cyclohexanone), an ester (for example, methyl acetate, ethyl acetate, propyl acetate, butyl acetate, methyl formate, ethyl formate, propyl formate, butyl formate), an aliphatic hydrocarbon (for example, hexane, cyclohexane), a halogenated hydrocarbon (for example, methylene chloride, chloroform, carbon tetrachloride), an aromatic hydrocarbon (for example, benzene, toluene, xylene), an amide (for example, dimethylformamide, dimethylacetamide, n-methylpyrrolidone), an ether (for example, diethyl ether, dioxane, tetrahydrofuran), and an ether alcohol (for example, 1-methoxy-2-propanol). Among these, toluene, xylene, methyl ethyl ketone, methyl isobutyl ketone, cyclohexanone and butanol are particularly preferred. The conductive inorganic fine particle may be dispersed in medium using a disperser. Examples of the disperser include a sand grinder mill (for example, a bead mill with pin), a high-speed impeller mill, a pebble mill, a roller mill, an attritor, and a colloid mill. Among these, a sand grinder mill and a high-speed impeller mill are particularly preferred. A preliminary dispersion treatment may also be performed. Examples of the disperser for use in the preliminary dispersion treatment include a ball mill, a three-roll mill, a kneader, and an extruder.

It is preferred that the conductive inorganic compound particle is allowed to react with an alkoxysilane compound in an organic solvent. By using a reaction liquid obtained by previously reacting the conductive inorganic particle with the alkoxysilane compound, an effect of excellent storage stability and curability can be obtained.

Examples of commercially available products useful as the powder of conductive inorganic oxide particle include T-1 (ITO, manufactured by Mitsubishi Material Corp.), Pastran (ITO, ATO, manufactured by Mitsui Mining & Smelting Co., Ltd.), SN-100P (ATO, manufactured by Ishihara Sangyo Kaisha, Ltd.), Nano Tek ITO (manufactured by C.I. Kasei Co., Ltd.), ATO and FTO (manufactured by Nissan Chemical Industries, Ltd.), and the like.

It is preferred to use the conductive inorganic oxide particle having silicon oxide supported on the surface thereof since such a particle particularly effectively reacts with an alkoxysilane compound. The conductive inorganic oxide particle having silicon oxide supported thereon can be obtained, for example, by the method as described in Japanese Patent 2858271, which includes forming a coprecipitate of a tin oxide and antimony oxide hydrate, depositing a silicon compound thereon, classification, and sintering.

Examples of the commercially available products of the conductive inorganic oxide particle having silicon oxide supported thereon include products under the trade names of SN-100P (ATO), SNS-10M, FSS-10M, and the like, manufactured by Ishihara Sangyo Kaisha, Ltd.

Examples of a commercially available product of a dispersion of the conductive inorganic oxide particles in an organic solvent include products under the trade names of SNS-10M (antimony-doped tin oxide dispersed in methyl ethyl ketone) and FSS-10M (antimony-doped tin oxide dispersed in isopropyl alcohol) manufactured by Ishihara Sangyo Kaisha, Ltd., trade names of Celnax CX-Z401M (zinc antimonate dispersed in methanol) and Celnax CX-Z200IP (zinc antimonate dispersed in isopropyl alcohol) manufactured by Nissan Chemical Industries, Ltd., the trade name of ELCOM JX-1001PTV (phosphorus-containing tin oxide dispersed in propylene glycol monomethyl ether) manufactured by Catalysts & Chemicals Industries Co., Ltd., and the like.

(Organic Solvent)

The organic solvent used in the curable composition for forming a conductive layer is used as a medium for dispersing the conductive inorganic oxide particles. The organic solvent is used in an amount preferably of 20 to 4000 parts by mass, and more preferably 100 to 1000 parts by mass, based on 100 parts by mass of the conductive inorganic oxide particles. If the amount of the solvent is less than 20 parts, the viscosity is too high, and thus, a uniform reaction is hardly performed in some cases. If the amount of the solvent is more than 4000 parts by mass, the coating property may be reduced in some cases.

Examples of the organic solvent include those having a boiling point of 200° C. or lower at a normal pressure, and specifically, alcohols, ketones, ethers, esters, hydrocarbons, and amides are used. The solvents may be used singly or in combination of two or more thereof. Among these, alcohols, ketones, ethers, and esters are preferred.

Here, examples of the alcohols include methanol, ethanol, isopropyl alcohol, isobutanol, n-butanol, tert-butanol, ethoxyethanol, butoxyethanol, diethylene glycol monoethyl ether, benzyl alcohol, phenethyl alcohol, and the like. Examples of the ketones include acetone, methyl ethyl ketone, methyl isobutyl ketone, cyclohexanone, and the like. Examples of the ethers include dibutyl ether, propylene glycol monoethyl ether acetate, and the like. Examples of the esters include ethyl acetate, butyl acetate, ethyl lactate, and the like. Examples of the hydrocarbons include toluene, xylene, and the like. Examples of the amides include formamide, dimethylacetamide, N-methylpyrrolidone, and the like. Isopropyl alcohol, ethoxyethanol, butoxyethanol, diethylene glycol monoethyl ether, methyl ethyl ketone, methyl isobutyl ketone, cyclohexanone, propylene glycol monoethyl ether acetate, butyl acetate, ethyl lactate, and the like are preferred.

(Binder of Conductive Layer)

As the binder of the conductive layer, a curable compound used in the high refractive index layer, particularly, an ionizing radiation curable polyfunctional monomer or polyfunctional oligomer, is preferably used. However, a crosslinked polymer obtained by reacting a reactive curable resin may also be used as the binder. The crosslinked polymer preferably has an anionic group.

The crosslinked polymer having an anionic group has a structure that the main chain of the polymer having an anionic group is crosslinked. The anionic group has a function of maintaining the dispersed state of the conductive inorganic fine particle, and the crosslinked structure has a function of imparting a film-forming ability to the polymer and strengthening the conductive layer.

Examples of the polymer main chain include polyolefins (saturated hydrocarbons), polyethers, polyureas, polyurethanes, polyesters, polyamines, polyamides, and melamine resins. Preferred of them are polyolefin main chains, polyether main chains, and polyurea main chains, polyolefin main chains and polyether main chains are more preferred, and polyolefin main chains are most preferred.

A polyolefin main chain is composed of a saturated hydrocarbon. A polyolefin main chain is obtained by, for example, addition polymerization of an unsaturated polymerizable group. A polyether main chain is composed of repeating units linked via an ether linkage (—O—) and is obtained by, for example, ring-opening polymerization of an epoxy group. A polyurea main chain is composed of repeating units linked via an urea linkage (—NH—CO—NH—) and is obtained by, for example, polycondensation of an isocyanate group and an amino group. A polyurethane main chain is composed of repeating units linked via an urethane linkage (—NH—CO—O—) and is formed by, for example, polycondensation of an isocyanate group and a hydroxyl group (inclusive of an N-methylol group). A polyester main chain is composed of repeating units linked via an ester linkage (—CO—O—) and is obtained by, for example, polycondensation between a carboxyl group (inclusive of an acid halide group) and a hydroxyl group (inclusive of an N-methylol group). A polyamine main chain is composed of repeating units linked via an imino linkage (—NH—) and is formed by, for example, ring-opening polymerization of an ethyleneimine group. A polyamide main chain is composed of repeating units linked via an amide linkage (—NH—CO—) and is obtained by, for example, reaction between an isocyanate group and a carboxyl group (inclusive of an acid halide group). A melamine resin main chain is obtained by, for example, polycondensation between a triazine group (for example, melamine) and an aldehyde (for example, formaldehyde). The main chain of the melamine resin has per se a crosslinked structure.

The anionic group is bonded to the polymer main chain directly or via a linking group. The anionic group is preferably bonded as a side chain to the main chain via a linking group.

Examples of the anionic group include a carboxyl group, a sulfo group, and a phosphoric (phosphono) group, and the like, and a sulfo group and a phosphono group are preferred.

The anionic group may be in a salt state. The cation forming the salt with the anionic group is preferably an alkali metal ion. Also, the proton of the anionic group may be dissociated.

The linking group connecting the anionic group and the polymer main chain is preferably a divalent group selected from —CO—, —O—, an alkylene group, an arylene group and a combination thereof.

The crosslinked structure forms the chemical (preferably covalent) bonding of two or more main chains. The crosslinked structure preferably forms a covalent bonding of three or more main chains. The crosslinked structure is preferably composed of a divalent or greater group selected from —CO—, —O—, —S—, a nitrogen atom, a phosphorus atom, an aliphatic residue, an aromatic residue, and a combination thereof.

The crosslinked polymer having an anionic group is preferably a copolymer comprising a repeating unit having an anionic group and a repeating unit having a crosslinked structure. In the copolymer, the proportion of the repeating unit having an anionic group is preferably from 2 to 96% by mass, more preferably from 4 to 94% by mass, and most preferably from 6 to 92% by mass. The repeating unit may have two or more anionic groups. In the copolymer, the proportion of the repeating unit having a crosslinked structure is preferably from 4 to 98% by mass, more preferably from 6 to 96% by mass, and most preferably from 8 to 94% by mass.

The repeating unit of the crosslinked polymer having an anionic group may have both an anionic group and a crosslinked structure. Also, other repeating units (a repeating unit having neither an anionic group nor a crosslinked unit) may be contained. Other repeating units are preferably a repeating unit having an amino group or a quaternary ammonium group and a repeating unit having a benzene ring. The amino group or quaternary ammonium group, similarly to the anionic group, maintains the dispersed state of the inorganic fine particle. Incidentally, the same effects can be obtained even when the amino group, the quaternary ammonium group, or the benzene ring is contained in the repeating unit having an anion group or in the repeating unit having a crosslinked structure.

In the repeating unit having an amino group or a quaternary ammonium group, the amino group or quaternary ammonium group is bonded directly to the polymer main chain or bonded to the main chain through a linking group. The amino group or quaternary ammonium group is preferably bonded as a side chain to the main chain through a linking group. The amino group or quaternary ammonium group is preferably a secondary amino group, a tertiary amino group or a quaternary ammonium group, more preferably a tertiary amino group or a quaternary ammonium group. The group bonded to the nitrogen atom of the secondary or tertiary amino group or quaternary ammonium group is preferably an alkyl group, more preferably an alkyl group having a carbon atom number of 1 to 12, and still more preferably an alkyl group having a carbon atom number of 1 to 6. The counter ion of the quaternary ammonium group is preferably a halide ion. The linking group connecting the amino group or quaternary ammonium group and the polymer main chain is preferably a divalent group selected from —CO—, —NH—, —O—, an alkylene group, an arylene group, and a combination thereof. In the case where the crosslinked polymer having an anionic group contains a repeating unit having an amino group or a quaternary ammonium group, the proportion of the repeating unit is preferably from 0.06 to 32% by mass, more preferably from 0.08 to 30% by mass, and most preferably from 0.1 to 28% by mass.

The above-described binder may also be used in combination with the following reactive organosilicon compound described, for example, in JP-A-2003-39586. The reactive organosilicon compound is used in an amount of 10 to 70% by mass based on the ionizing radiation curable resin as the binder above. The reactive organosilicon compound is preferably an organosilane compound represented by the general formula (I), more preferably an organosilane compound represented by the general formula (II), and a conductive layer can be formed by using only this compound as the resin component.

[Protective Film for Polarizing Plate]

In the case of using the antireflective film as a surface protective film of a polarizing film (protective film for a polarizing plate, the adhesion to the polarizing film comprising a polyvinyl alcohol as the main component can be improved by hydrophilizing the surface of the transparent support opposite the side having the thin-film layer, that is, the surface on the side to be laminated with the polarizing film.

It is also preferred that out of the two protective films of the polarizer, the film other than the antireflective film is an optically compensatory film having an optically compensatory layer comprising an optically anisotropic layer. The optically compensatory film (phase difference film) can improve the viewing angle characteristics on the liquid crystal display screen.

A known optically compensatory film may be used but from the standpoint of enlarging the viewing angle, the optically compensatory film described in JP-A-2001-100042 is preferred.

In the case of using the antireflective film as a surface protective film of a polarizing film (protective film for a polarizing plate), as the transparent support, a triacetyl cellulose film is used.

The method for preparing the protective film for a polarizing plate in the present invention includes three methods, that is, (1) a method of applying the layers for forming an antireflection layer on one surface of a transparent support previously subjected to a saponification treatment, (2) a method of applying antireflection layers on one surface of a transparent support and subjecting the side to be laminated with a polarizing film or both surfaces to a saponification treatment, and (3) a method of applying a part of the antireflection layers on one surface of a transparent support, subjecting the side to be laminated with a polarizing film or both surfaces to a saponification treatment, and then coating the remaining layers. In the method of (1), the surface where antireflection layers are coated is also hydrophilized and the adhesion between the transparent support and the antireflective layer film can be hardly ensured. Therefore, the method of (2) is particularly preferred.

[Polarizing Plate]

The polarizing plate of the present invention is described below. The polarizing plate of the present invention is a polarizing plate comprising a polarizing film and two surface protective films which protects the both sides of the polarizing film, wherein the antireflective film of the present invention is used as one of those protective films.

It is preferable that the transparent support of the antireflective film is adhered to a polarizing film, if desired, through an adhesive layer comprising a polyvinyl alcohol and a protective film is also provided on another side of the polarizing film. On the surface of another protective film opposite the polarizing film, an adhesive layer may be provided.

By virtue of using the antireflective film of the present invention as a protective film for a polarizing plate, a polarizing plate having excellent physical strength and light resistance and having an antireflection function can be prepared, and a great reduction in the cost and thinning of the display device can be realized.

Furthermore, the polarizing plate of the present invention may also have an optically compensating function. In this case, it is preferred that for the formation of the polarizing plate, the antireflective film is used only for one surface side, that is, either the front surface side or the back surface side, out of two surface protective films and the surface protective film on the surface of the polarizing plate opposite the side having the antireflective film is an optically compensatory film.

By preparing a polarizing plate wherein the antireflective film of the present invention is used as one protective film for a polarizing plate and an optically compensatory film having optical anisotropy is used as another protective film of the polarizing film, the bright-room contrast and the up/down right/left viewing angle of a liquid crystal display device can be improved.

Among the constitutions of the antireflective film of the present invention, particularly by using the following constitutions (3) or (4) of the antireflective film, the reflected color is uniformly neutral with a low reflectivity, a fingerprint or a sebaceous oils, if attached, is easily wiped off, and further, is hardly noticeable by the eyes, thereby exhibiting an excellent antifouling property, and excellent scratch resistance, which is thus preferable.

Constitution (3)

Transparent substrate: Tricellulose acetate film (refractive index: 1.49, film thickness: 80 μm)

Hardcoat layer: Polyfunctional monomer having a polymerizable unsaturated group, a silica sol solution, a photopolymerization initiator (refractive index: 1.49, film thickness: 10 μm)

Medium refractive index layer: Polyfunctional monomer having a polymerizable unsaturated group, a zirconium oxide fine particle, a photopolymerization initiator (refractive index: 1.62, film thickness 60 nm,)

High refractive index layer: Polyfunctional monomer having a polymerizable unsaturated group, a zirconium oxide fine particles, a photopolymerization initiator (refractive index: 1.72, film thickness 110 nm)

Low refractive index layer: Fluorine-containing copolymer having a polymerizable unsaturated group, a hollow silica fine particle, a polyfunctional monomer having a polymerizable unsaturated group (fluorine-containing compound and non-fluorine-containing compound), a fluorine-containing antifouling agent having a polymerizable unsaturated group, a photopolymerization initiator (refractive index: 1.36, film thickness 90 nm)

Constitution (4)

Transparent substrate: Tricellulose acetate film (refractive index: 1.49, film thickness 80 μm)

Hardcoat layer: Polyfunctional monomer having a polymerizable unsaturated group, silica sol, photopolymerization initiator (refractive index: 1.49, film thickness: 10 μm)

Medium refractive index layer: Polyfunctional monomer having a polymerizable unsaturated group, a phosphorous-containing tin oxide fine particle or antimony-doped tin oxide fine particle, photopolymerization initiator (refractive index: 1.635, film thickness 60 nm,)

High refractive index layer: Polyfunctional monomer having a polymerizable unsaturated group, a zirconium oxide fine particle, a photopolymerization initiator (refractive index: 1.72, film thickness 95 nm)

Low refractive index layer: Fluorine-containing copolymer having a polymerizable unsaturated group, a hollow silica fine particle, a polyfunctional monomer having a polymerizable unsaturated group (a fluorine-containing compound, and a non-fluorine-containing compound), a fluorine-containing antifouling agent having a polymerizable unsaturated group, a photopolymerization initiator (refractive index: 1.36, film thickness 90 nm)

Further, the display device of the present invention is characterized by having the anti reflection film or the polarizing plate of the present invention on the outermost surface of the display.

EXAMPLES

The present invention is described in greater detail below by referring to Examples, but the present invention should not be construed as being limited to these Examples.

Example 1

[Production of Antireflective Film]

Preparation of the coating solution for the formation of each layer and formation of each layer were performed as follows to produce Antireflective film Nos. 1 to 18.

(Preparation of Coating Solution A for Hardcoat Layer)

The composition shown below was charged into a mixing tank and the resulting solution was stirred to prepare a coating solution for a hardcoat layer.

100 Parts by mass of cyclohexanone, 750 parts by mass of partially caprolactone-modified polyfunctional acrylate (DPCA-20, manufactured by Nippon Kayaku Co., Ltd.), 200 parts by mass of a silica sol (MIBK-ST, manufactured by Nissan Chemical Industries, Ltd.), and 50 parts by mass of a photopolymerization initiator (Irgacure 184, manufactured by Ciba Specialty Chemicals Corp.) were added to 900 parts by mass of methyl ethyl ketone. The mixture was stirred, and then filtered through a polypropylene-made filter having a pore size of 0.4 μm to prepare a coating solution A for a hardcoat layer.

(Preparation of Coating Solution A for Medium Refractive Index Layer)

1.5 Parts by mass of a mixture (DPHA) of dipentaerythritol pentaacrylate and dipentaerythritol hexaacrylate, 0.05 parts by mass of a photopolymerization initiator (Irgacure 907, manufactured by Ciba Specialty Chemicals Corp.), 66.6 parts by mass of methyl ethyl ketone, 7.7 parts by mass of methyl isobutyl ketone, and 19.1 parts by mass of cyclohexanone were added to 5.1 parts by mass of a ZrO$_2$ fine particle-containing hardcoat agent (Desolite Z7404 [refractive index: 1.72, solid content concentration: 60% by mass, content of zirconium oxide fine particle: 70% by mass (based on solid content), average particle diameter of zirconium oxide fine particle: about 20 nm, solvent composition: methyl isobutyl ketone/methyl ethyl ketone=9/1, manufactured by JSR Corp.]) and the mixture was stirred. After thorough stirring, the solution was filtered through a polypropylene-made filter having a pore size of 0.4 µm to prepare a coating solution A for a medium refractive index layer.

(Preparation of Coating Solution B for Medium Refractive Index Layer)

4.5 Parts by mass of a mixture (DPHA) of dipentaerythritol pentaacrylate and dipentaerythritol hexaacrylate, 0.14 parts by mass of a photopolymerization initiator (Irgacure 907, manufactured by Ciba Specialty Chemicals Corp.), 66.5 parts by mass of methyl ethyl ketone, 9.5 parts by mass of methyl isobutyl ketone, and 19.0 parts by mass of cyclohexanone were added, and the mixture was stirred. After thorough stirring, the solution was filtered through a polypropylene-made filter having a pore size of 0.4 µm to prepare a coating solution B for a medium refractive index layer.

Appropriate amounts of the coating solution A for a medium refractive index layer and the coating solution B for a medium refractive index layer were mixed to give the refractive index of each sample as shown in Table 2 below, thereby preparing a coating solution C for a medium refractive index layer and a coating solution D for a medium refractive index layer.

(Preparation of Coating Solution E for Medium Refractive Index Layer)

6.0 Parts by mass of the following dispersant (B-1) having an anionic group and a methacryloyl group and 74 parts by mass of methyl isobutyl ketone were added to 20.0 parts by mass of a commercially available conductive fine particle ATO "antimony-doped tin oxide T-1" {specific surface area 80 m²/g, manufactured by Mitsubishi Material Corp.}, and the mixture was stirred.

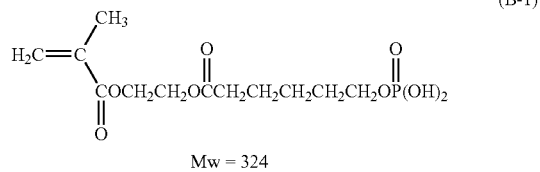

(B-1)

Mw = 324

Using a media disperser (using a zirconium oxide bead having a diameter of 0.1 mm), the ATO particles were dispersed in the solution as described above. By a light scattering method, the mass average particle diameter of the ATO particle in the dispersion was evaluated, and as a result, it was found to be 55 nm. In this way, an ATO dispersion was produced.

6 Parts by mass of a mixture "DPHA" of dipentaerythritol pentaacrylate and dipentaerythritol hexaacrylate {manufactured by Nippon Kayaku Co., Ltd.} and 0.8 part by mass of a polymerization initiator "Irgacure 184" {manufactured by Ciba Specialty Chemicals Corp.} were added to 100 parts by mass of the above-described ATO dispersion, and the mixture was stirred. In this way, a coating solution E for a medium refractive index layer was prepared. The refractive index of the coated film by this coating material was found to be 1.62.

(Preparation of Coating Solution F for Medium Refractive Index Layer)

A phosphorous-containing tin oxide (PTO) dispersion (ELCOM JX-1001 PTV manufactured by Catalysts & Chemicals Industries Co., Ltd.), and a mixture (DPHA) of dipentaerythritol pentaacrylate and dipentaerythritol hexaacrylate were appropriately mixed to prepare a coating solution F for a medium refractive index layer having a refractive index adjusted to 1.635.

(Preparation of Coating Solution A for High Refractive Index Layer)

61.9 Parts by mass of methyl ethyl ketone, 3.4 parts by mass of methyl isobutyl ketone, and 1.1 parts by mass of cyclohexanone were added to 15.7 parts by mass of a ZrO₂ fine particle-containing hardcoat agent (Desolite Z7404 [refractive index: 1.72, solid content concentration: 60% by mass, content of zirconium oxide fine particle: 70% by mass (based on solid content), average particle diameter of zirconium oxide fine particle: about 20 nm, solvent composition: methyl isobutyl ketone/methyl ethyl ketone=9/1, manufactured by JSR Corp.]). The mixture was stirred, and then filtered through a polypropylene-made filter having a pore size of 0.4 µm to prepare a coating solution A for a high refractive index layer.

(Preparation of Coating Solution B for High Refractive Index Layer)

(Preparation of Titanium Dioxide Fine Particle Dispersion)

As for the titanium dioxide fine particle, a cobalt-containing titanium dioxide fine particle surface-treated by using aluminum hydroxide and zirconium hydroxide (MPT-129C, manufactured by Ishihara Sangyo Kaisha Ltd., TiO₂:Co₃O₄: Al₂O₃:ZrO₂=90.5:3.0:4.0:0.5 by mass) was used. After adding 41.1 parts by mass of a dispersant shown below and 701.6 parts by mass of cyclohexanone to 257.7 parts by mass of the titanium dioxide fine particle above, the mixture was dispersed by a Dyno-mill to prepare a titanium dioxide dispersion having a mass average diameter of 69 nm.

Dispersant

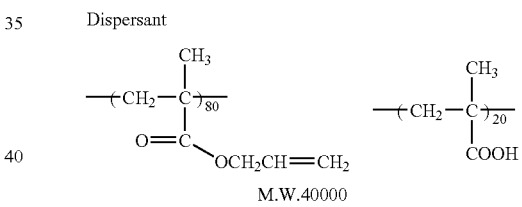

M.W.40000

To 469.9 parts by mass of the titanium dioxide dispersion were added 40.1 parts by weight of a mixture of dipentaerythritol pentaacrylate/dipentaerythritol hexaacrylate (DPHA, manufactured by Nippon Kayaku co., Ltd.), 3.4 parts by mass of a photopolymerization initiator (Irgacure 907, manufactured by Ciba Specialty Chemicals, Inc.), 1.1 parts by mass of a photosensitizer (KAYACURE DETX, manufactured by Nippon Kayaku Co., Ltd.), 526.0 parts by mass of methyl ethyl ketone, and 459.8 parts by mass of cyclohexanone, and the mixture was stirred. After thorough stirring, the mixture was filtered through a polypropylene-made filter having a pore size of 0.4 µm to prepare a coating solution B for a high refractive index layer.

(Preparation of Coating Solution C for High Refractive Index Layer)

0.75 Part by mass of a mixture (DPHA) of dipentaerythritol pentaacrylate and dipentaerythritol hexaacrylate, 62.0 parts by mass of methyl ethyl ketone, 3.4 parts by mass of methyl isobutyl ketone, and 1.1 parts by mass of cyclohexanone were added to 14.4 parts by mass of a ZrO₂ fine particle-containing hardcoat agent (Desolite Z7404 [refractive index: 1.72, solid content concentration: 60% by mass, content of zirconium oxide fine particle: 70% by mass (based on solid content), average particle diameter of zirconium oxide fine particle:

about 20 nm, photopolymerization initiator contained, solvent composition: methyl isobutyl ketone/methyl ethyl ketone=9/1, manufactured by JSR Corp.]) and the mixture was stirred. After thorough stirring, the solution was filtered through a polypropylene-made filter having a pore size of 0.4 μm to prepare a coating solution C for a high refractive index layer.

(Preparation of Coating Solution for Low Refractive Index Layer)
(Synthesis of Perfluoroolefin Copolymer (1))

Perfluoroolefin copolymer
(1):

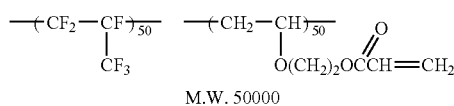

M.W. 50000

In the structural formula above, 50:50 indicates a molar ratio.

In a stainless steel-made autoclave having an inner volume of 100 ml and equipped with a stirrer, 40 ml of ethyl acetate, 14.7 g of hydroxyethyl vinyl ether, and 0.55 g of dilauroyl peroxide were charged, and the inside of the system was degassed and displaced with nitrogen gas. Furthermore, 25 g of hexafluoropropylene (HFP) was introduced into the autoclave, and the temperature was elevated to 65° C. The pressure when the temperature in the autoclave reaches 65° C. was 0.53 MPa (5.4 kg/cm$^2$). The reaction was continued for 8 hours while keeping this temperature and when the pressure reaches 0.31 MPa (3.2 kg/cm$^2$), the heating was stopped and the system was allowed to cool. At the time when the inner temperature dropped to room temperature, the unreacted monomer was expelled, and the autoclave was opened to take out the reaction solution. The obtained reaction solution was poured in a large excess of hexane and after removing the solvent by decantation, the precipitated polymer was taken out. This polymer was dissolved in a small amount of ethyl acetate, and the residual monomer was completely removed by performing reprecipitation twice from hexane. After drying, 28 g of a polymer was obtained. Subsequently, 20 g of this polymer was dissolved in 100 ml of N,N-dimethylacetamide, and 11.4 g of acrylic acid chloride was added dropwise thereto under ice cooling, followed by stirring at room temperature for 10 hours. Thereafter, ethyl acetate was added to the reaction solution, and the resulting solution was washed with water. The organic layer was extracted and then concentrated, and the obtained polymer was reprecipitated from hexane to obtain 19 g of a perfluoroolefin copolymer (1). The refractive index and the mass average molecular weight of the obtained polymer were 1.422 and 50,000, respectively.

(Preparation of Hollow Silica Particle Dispersion)

30 Parts by mass of acryloyloxypropyltrimethoxysilane and 1.51 parts by mass of diisopropoxyaluminum ethyl acetate were added to 500 parts by mass of a fine particle sol of hollow silica particle (isopropyl alcohol silica sol, CS60-IPA, manufactured by Catalysts & Chemicals Ind. Co., Ltd., average particle diameter: 60 nm, thickness of shell: 10 nm, silica concentration: 20% by mass, refractive index of silica particle: 1.31), and mixed, and 9 parts by mass of ion-exchanged water was added thereto. After allowing the reaction to proceed at 60° C. for 8 hours, the reaction solution was cooled to room temperature, and 1.8 parts by mass of acetyl acetone was added to obtain a dispersion. Thereafter, solvent replacement by reduced-pressure distillation was performed under a pressure of 30 Torr while adding cyclohexanone to keep the silica content almost constant, and finally the concentration was adjusted to obtain a dispersion A having a solid content concentration of 18.2% by mass. The amount of IPA remaining in the obtained dispersion A was analyzed by gas chromatography and found to be 0.5% by mass or less.

(Preparation of Coating Solution for Low Refractive Index Layer)

Each of the components was mixed as shown in Table 1 below, and dissolved in methyl ethyl ketone to produce coating solutions for low refractive index layers, Ln1 to Ln12, each having a solid content concentration of 5% by mass.

TABLE 1

| | Coating solution composition | | | | | | | | |
|---|---|---|---|---|---|---|---|---|---|
| Coating solution No. | Content amount of P-1 | Polyfunctional monomer Kind | Content amount | Kind | Content amount | Antifouling agent Kind | Content amount | Content amount of Irg. 127 | Dispersion A | Note |
| Ln1 | 47 | — | 0 | — | 0 | — | — | 3 | 50 | Comp. Ex. |
| Ln2 | 42 | — | 0 | — | 0 | X22-164C | 5 | 3 | 50 | Comp. Ex. |
| Ln3 | 42 | — | 0 | — | 0 | MF1 | 5 | 3 | 50 | The present invention |
| Ln4 | 90 | — | 0 | — | 0 | MF1 | 5 | 5 | 0 | Comp. Ex. |
| Ln5 | 35 | — | 0 | DPHA | 7 | MF1 | 5 | 3 | 50 | The present invention |
| Ln6 | 15 | M1 | 20 | DPHA | 7 | MF1 | 5 | 3 | 50 | The present invention |
| Ln7 | 22 | M1 | 20 | DPHA | 20 | MF1 | 5 | 3 | 50 | The present invention |
| Ln8 | 15 | M1 | 20 | DPHA | 7 | MCF-323 | 5 | 3 | 50 | The present invention |
| Ln9 | 15 | M1 | 20 | DPHA | 7 | Optool DA | 5 | 3 | 50 | The present invention |
| Ln10 | 15 | M1 | 20 | DPHA | 7 | d-4 | 5 | 3 | 50 | The present invention |
| Ln11 | 15 | M1 | 20 | DPHA | 7 | B-2 | 5 | 3 | 50 | The present invention |
| Ln12 | 15 | — | — | DPHA | 27 | MF1 | 5 | 3 | 50 | The present invention |

The content amount of each component is represented by a ratio (% by mass) of the solid content of each component with respect to total solid content of the coating composition.

Each of the compounds used are shown below.
P-1: Perfluoroolefin copolymer (1)
DPHA: Mixture of dipentaerythritol pentaacrylate and dipentaerythritol hexaacrylate (manufactured by Nippon Kayaku Co., Ltd.)
MF1: Fluorine-containing unsaturated compound as described in Examples in the publication of WO2003-022906 (weight average molecular weight: 1600)

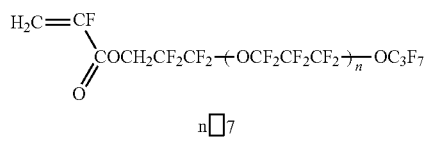

n☐7

B-2: Perfluoropolyether-containing acrylate as described in the present specification (weight average molecular weight: 1117)
Optool DAC: Perfluoropolyether-containing UV curable antifouling additive (manufactured by Daikin Industries, Ltd.)
MCF-323: Dipenser MCF-323 non-fluoroether type fluorine-based surfactant (manufactured by Dainippon Ink & Chemicals, Inc.)
d-4: Perfluoropolyether-containing acrylate as described in the present specification (weight average molecular weight: 1600)
M1: Fluorine-containing polyfunctional acrylate as described in the present specification (content rate of fluorine: 44.9%, tetrafunctional)
Dispersion A: Hollow silica particle dispersion A as described above (hollow silica particle sol surface-modified with acryloyloxypropyltrimethoxysilane, solid content concentration 18.2%)
X22-164C: Reactive silicone (manufactured by Shin-Etsu Chemical Co., Ltd.)
Irg127: Photopolymerization initiator Irgacure 127 (manufactured by Ciba Specialty Chemicals Corp.)

(Production of Hardcoat Layer A)

On a triacetyl cellulose film (TD80UF, produced by Fujifilm Corp., refractive index: 1.48) having a thickness of 80 μm as a transparent support, the coating solution A for the hardcoat layer in the formulation above was coated using a gravure coater and dried at 100° C. Thereafter, the coated layer was cured by irradiating an ultraviolet ray at an illuminance of 400 mW/cm² and an irradiation dose of 150 mJ/cm² with use of an air-cooled metal halide lamp (manufactured by Eye Graphics Co., Ltd.) of 160 W/cm while purging the system with nitrogen to give an atmosphere having an oxygen concentration of 1.0% by volume or less, whereby a hardcoat layer A of 12 μm in thickness was formed.

On the hardcoat Layer A, the coating solution for a medium refractive index layer, the coating solution for a high refractive index layer, and the coating solution for a low refractive index layer each prepared to have a desired refractive index were coated using a gravure coater. Incidentally, the refractive index of each layer was measured by Multi-Wavelength Abbe Refractometer DR-M2 (manufactured by ATAGO K.K.) after applying the coating solution for each layer on a glass plate to a thickness of about 4 μm. A refractive index measured using a filter, "Interference Filter 546(e) nm for DR-M2, M4, Parts No. RE-3523", was employed as the refractive index at a wavelength of 550 nm.

The thickness of each layer was calculated by laminating the medium refractive index layer, the high refractive index layer, and the low refractive index layer, and then using a reflection spectral film thickness meter "FE-3000" (manufactured by Otsuka Denshi Co., Ltd.). As the refractive index of each layer upon determination, the value as obtained by the Abbe Refractometer was used.

The drying conditions of the medium refractive index layer were 90° C. and 30 seconds, and the ultraviolet curing conditions were such that an air-cooled metal halide lamp (manufactured by Eye Graphics Co., Ltd.) of 180 W/cm was used at an illuminance of 300 mW/cm and an irradiation dose of 240 mJ/cm while purging the system with nitrogen to give an atmosphere having an oxygen concentration of 1.0% by volume or less.

The refractive index and the layer thickness of the medium refractive index layer after curing were varied as shown in Table 2.

The drying conditions of the high refractive index layer were 90° C. and 30 seconds, and the ultraviolet curing conditions were such that an air-cooled metal halide lamp (manufactured by Eye Graphics Co., Ltd.) of 240 W/cm was used at an illuminance of 300 mW/cm² and an irradiation dose of 240 mJ/cm² while purging the system with nitrogen to give an atmosphere having an oxygen concentration of 1.0% by volume or less.

The refractive index and layer thickness of the high refractive index layer after curing were as shown in Table 2.

(Production of Low Refractive Index Layer)

The drying conditions of the low refractive index layer were 90° C. and 30 seconds, and the ultraviolet curing conditions were such that an air-cooled metal halide lamp (manufactured by Eye Graphics Co., Ltd.) of 240 W/cm was used at an illuminance of 600 mW/cm² and an irradiation dose of 600 mJ/cm² while purging the system with nitrogen to give an atmosphere having an oxygen concentration of 0.1% by volume or less.

The coating solution, and the refractive index and the layer thickness, of each layer, used for production of the antireflective film samples 1 to 18 produced by the above-described methods are shown in Table 2.

TABLE 2

| Sample No. | Hardcoat layer | Medium refractive index layer | | | High refractive index layer | | | Low refractive index layer | | | Note |
|---|---|---|---|---|---|---|---|---|---|---|---|
| | | Coating solution | Refractive Index | Film thickness (nm) | Coating solution | Refractive Index | Film thickness (nm) | Coating solution | Refractive Index | film thickness (nm) | |
| 1 | A | — | — | — | — | — | — | Ln1 | 1.36 | 94 | Comp. Ex. |
| 2 | A | — | — | — | — | — | — | Ln2 | 1.36 | 94 | Comp. Ex. |
| 3 | A | — | — | — | — | — | — | Ln3 | 1.36 | 94 | The present invention |
| 4 | A | — | — | — | — | — | — | Ln4 | 1.42 | 94 | Comp. Ex. |
| 5 | A | — | — | — | — | — | — | Ln5 | 1.36 | 94 | The present invention |

TABLE 2-continued

| Sample No. | Hardcoat layer | Medium refractive index layer | | | High refractive index layer | | | Low refractive index layer | | | Note |
|---|---|---|---|---|---|---|---|---|---|---|---|
| | | Coating solution | Refractive Index | Film thickness (nm) | Coating solution | Refractive Index | Film thickness (nm) | Coating solution | Refractive Index | film thickness (nm) | |
| 6 | A | — | — | — | — | — | — | Ln6 | 1.36 | 94 | The present invention |
| 7 | A | C | 1.62 | 60 | C | 1.68 | 117 | Ln6 | 1.36 | 90 | The present invention |
| 8 | A | D | 1.64 | 60 | B | 1.85 | 101 | Ln7 | 1.4 | 86 | The present invention |
| 9 | A | C | 1.62 | 60 | A | 1.72 | 110 | Ln6 | 1.36 | 90 | The present invention |
| 10 | A | E | 1.62 | 60 | A | 1.72 | 110 | Ln6 | 1.36 | 90 | The present invention |
| 11 | A | C | 1.62 | 60 | A | 1.72 | 110 | Ln8 | 1.36 | 90 | The present invention |
| 12 | A | C | 1.62 | 60 | A | 1.72 | 110 | Ln9 | 1.36 | 90 | The present invention |
| 13 | A | C | 1.62 | 60 | A | 1.72 | 110 | Ln10 | 1.36 | 90 | The present invention |
| 14 | A | C | 1.62 | 60 | A | 1.72 | 110 | Ln11 | 1.36 | 90 | The present invention |
| 15 | A | F | 1.635 | 60 | A | 1.72 | 95 | Ln6 | 1.36 | 90 | The present invention |
| 16 | A | F | 1.635 | 60 | A | 1.72 | 95 | Ln10 | 1.36 | 90 | The present invention |
| 17 | A | C | 1.62 | 60 | A | 1.72 | 110 | Ln2 | 1.36 | 90 | Comp. Ex. |
| 18 | A | — | — | — | — | — | — | Ln12 | 1.39 | 94 | The present invention |

(Evaluation of Antireflective Film)

All of the characteristics of the antireflective film were evaluated by the following methods. The results are shown in Table 3.

(1) Evaluation of Steel Wool Scratch Resistance

By using a rubbing tester, a rubbing test was conducted under the following conditions, and used as an indicator of scratch resistance.

Environmental conditions for evaluation: 25° C., 60% RH

Rubbing material: Steel wool (Grade No. 0000, manufactured by Nippon Steel Wool Co., Ltd.)

Band wound and fixed at the rubbing tip (1 cm×1 cm) of the tester in contact with the sample Shifting distance (one way): 13 cm Rubbing speed: 13 cm/sec Load: 500 g/cm$^2$ Contact area at the tip: 1 cm×1 cm Number of rubbing: 10 reciprocations Evaluation was made by coating an oily black ink on the back side of the sample after the rubbing, and the damage at the rubbed portion was evaluated by observation with the eyes with reflection light.

A: No damage is seen even when observed extremely carefully.

B: Weak damages are faintly seen when observed extremely carefully.

C: Weak damages are seen.

D: Damages of medium degree are seen.

E: There are damages recognizable at a glance.

(2) Fingerprint Wiping-Off Property 1

An oily black ink was coated on the back side of the sample, and a fingerprint was attached thereon while strongly pressing the coated surface with a finger. Then, the fingerprint was wiped off with ten reciprocations with clean paper, and the remaining trace of the fingerprint attached was observed and evaluated.

A: No trace of the attached fingerprint is completely seen.

B: A small trace of the attached fingerprint is seen, but not a bothersome amount.

C: The trace of the attached fingerprint is seen, and is bothersome.

D: The wipe-off trace of the fingerprint can be clearly perceived, and is bothersome.

Fingerprint Wiping-Off Property 2

An oily black ink was coated on the back side of the sample, and a fingerprint was attached thereon while strongly pressing the coated surface with a finger. Then, the fingerprint was wiped off with clean paper, and the number of wiping-off repetitions (reciprocations) performed until the remaining trace of the fingerprint completely disappeared was evaluated. Complete disappearance with a smaller number of repetitions is preferred.

(3) Antifouling Durability

The film was fixed on a glass surface via a adhesive, and a circle of 5 mm in diameter was written thereon in three turns with a pen tip (fine) of a black magic marker, "Macky Gokuboso" (trade name, manufactured by ZEBRA Co.), under the conditions of 25° C. and 60% RH, and after 10 seconds, wiped off with a 10-ply folded and bundled Bencot (trade name, manufactured by Asahi Kasei Corp.) by moving the bundle back and forth 2 times under a load large enough to make a dent in the Bencot bundle. The writing and wiping were repeated under the above-described conditions until the magic marker stain could not be eliminated by the wiping, and thus the antifouling durability could be evaluated by the number of repetitions taken to wipe off the magic marker stain. The number of repetitions until the marker stain cannot be eliminated is preferably 5 or more, more preferably 10 or more.

(4) Specular Reflectivity, Color Tint, and Color Difference at Variation in Film Thickness The antireflection property was evaluated by mounting an adapter ARV-474 on a spectrophotometer V-550 (manufactured by JASCO Corp.), measuring the specular reflectivity for the outgoing angle of 5° at an incident angle of 5° in the wavelength region of 380 to 780 nm, and calculating the average reflectivity at 450 to 650 nm. Furthermore, the color tint of reflected light was evaluated by calculating, from the reflection spectrum measured, the L*, a*, and b* values of the CIE1976 L*a*b* color space, which were values indicating the color tint of regularly reflected light for incident light at 5° of a CIE standard illuminant D65. The color tint (L*', a*', b*') of the reflected light when the thickness of an arbitrary layer out of the low refractive index layer, high refractive index layer and medium refractive index layer was changed by 2.5% was measured, the color difference ΔE from the color tint (L*, a*, b*) of reflected light at a designed film thickness was determined, and the value giving the maximum color difference was calculated and the color difference when the film thickness is varied was evaluated.

$$\Delta E = \{(L^* - L^{*'})^2 + (a^* - a^{*'})^2 + (b^* - b^{*'})^2\}^{1/2}$$

(5) Measurement of Surface Resistance Value

About all samples, the sample was left standing under the conditions of 25° C. and 60% RH for 2 hours and thereafter, the surface resistance value (SR) was measured under the same conditions by a circular electrode method. The surface resistance value is shown by its logarithm (log SR).

(6) Evaluation of Stain Attachment

The transparent support side of the antireflective film was laminated on the CRT surface, and the device was used for 24 hours in a room having from 100 to 2,000,000 particles of dust and tissue paper scraps of 0.5 μm or more per 1 ft$^3$ (cubic feet). The number of particles of dust and tissue paper scraps attached per 100 cm$^2$ of the antireflective film was measured, and the sample was rated A when the average value of the results was less than 20 pieces, rated B when from 20 to 49 pieces, rated C when from 50 to 199 pieces, and rated D when 200 pieces or more.

(7) Contact Angle

A contact angle meter (a contact angle meter "CA-X" manufactured by Kyowa Interface Science Co., Ltd.) was used in the dry atmosphere (20° C./65% RH), and pure water was used as the liquid. A droplet having a diameter of 1.0 mm of water was made on the tip of stylus, and brought into contact with a film surface, thereby making this droplet on the film surface. The contact angle was defined as the angle that the line tangent to the liquid surface at a film-liquid contact point forms with the film surface on the side including the liquid. Further, using methylene iodide instead of water, the contact angle was measured, and the surface free energy was determined by the following equation.

The surface free energy ($\gamma s^v$: unit, mN/m) was defined as a value $\gamma s^v$ ($=\gamma s^d + \gamma s^h$) expressed as a sum of $\gamma s^d$ and $\gamma S^h$ determined by the following simultaneous equations a and b, from the contact angles $\theta_{H2O}$ and $\theta_{CH2I2}$ of pure water H$_2$O and methylene iodide CH$_2$I$_2$, as determined experimentally on the antireflective film, with reference to D. K. Owens: J. Appl. Polym., Sci., 13, 1741 (1969).

$$1+\cos \theta_{H2O} = 2\sqrt{\gamma s^d}(\sqrt{\gamma_{H2O}^d}/\gamma_{H2O}^v) + 2\sqrt{\gamma s^h}(\sqrt{\gamma_{H2O}^h}/\gamma_{H2O}^v) \quad \text{a.}$$

$$1+\cos \theta_{CH2I2} = 2\sqrt{\gamma s^d}(\sqrt{\gamma_{CH2I2}^d}/\gamma_{CH2I2}^v) + 2\sqrt{\gamma s^h}(\sqrt{\gamma_{CH2I2}^h}/\gamma_{CH2I2}^v) \quad \text{b.}$$

$\gamma_{H2O}^d = 21.8, \gamma_{H2O}^h = 51.0, \gamma_{H2O}^v = 72.8, \gamma_{CH2I2}^d = 49.5, \gamma_{CH2I2}^h = 1.3, \gamma_{CH2I2}^v = 50.8$ As shown in Table 3, it could be confirmed that the antireflective film containing a fluorine-containing antifouling agent having a polymerizable unsaturated group, in addition to the fluorine-containing copolymer having a polymerizable unsaturated group and the inorganic fine particle has a low refractive index, and thus fat and oil components such as those from a fingerprint, a sebaceous oil, and the like, if attached, are easily wiped off, and the scratch resistance is also excellent. Further, by using a polyfunctional monomer having a polymerizable unsaturated group, particularly a polyfunctional monomer containing fluorine and having a calculated value of intercrosslink molecular weights of less than 500, an antireflective film having improved scratch resistance as well as excellent antifouling durability was obtained.

In the samples Nos. 9 to 14 of the present invention, the refractive index and the film thickness of the medium refractive index layer satisfy the ranges of 1.60 to 1.64 and 55.0 to 65.0 nm, respectively, the refractive index and the film thickness of the high refractive index layer satisfy the ranges of 1.70 to 1.74 and 105.0 to 115.0 nm, respectively, the refractive index and the film thickness of the low refractive index layer satisfy the ranges of 1.33 to 1.38 and 85.0 to 95.0 nm, respectively. In the samples Nos. 9 to 14 of the present invention, the reflectivity was as low as about 0.35%, and the reflection color tint was neutral, as seen from $0 \leq a^* \leq 8$ and $-10 \leq b^* \leq 0$. Further, in the sample Nos. 9 to 14 of the present invention, an antireflective film in which the fingerprint as a fouling component, if attached, was hardly noticeable by the eyes after wiping-off, the antifouling durability was excellent, and the color difference $\Delta E$ due to 2.5% variation in the thickness of an arbitrary layer out of the low refractive index layer, the high refractive index layer, and the medium refractive index layer, with the designed film thickness was small, $\Delta E \leq 3$, was obtained.

Further, in sample No. 15 of the present invention, the refractive index and the film thickness of the medium refractive index layer satisfy the ranges of 1.60 to 1.65 and 50.0 to 65.0 nm, respectively, the refractive index and the film thickness of the high refractive index layer satisfy the ranges of 1.70 to 1.74 and 90.0 to 105.0 nm, respectively, the refractive index and the film thickness of the low refractive index layer 1.33 to 1.38 and 85.0 to 95.0 nm, respectively. In the sample No. 15 of the present invention, the reflectivity was as low as 0.5% or less, and the reflection color tint was neutral, as seen from $0 \leq a^* \leq 8$ and $-10 \leq b^* \leq 0$. Further, in the sample No. 15 of

TABLE 3

| Sample No. | SW scratch resistance | Antifouling durability | Fingerprint wiping off property 1 | Fingerprint wiping off property 2 | Average reflectivity | a* | b* | logSR | Stain attachment | Color difference at variation in film thickness ΔE | Note |
|---|---|---|---|---|---|---|---|---|---|---|---|
| 1 | D | 1 | D | >30 | 1.20% | 2.99 | −0.30 | >14 | B | 1.27 | Comp. Ex. |
| 2 | C | 4 | C | 22 | 1.15% | 3.01 | −0.29 | >14 | B | 1.25 | Comp. Ex. |
| 3 | C | 8 | A | 4 | 1.15% | 3.00 | −0.29 | >14 | C | 1.25 | The present invention |
| 4 | D | 9 | A | 4 | 1.66% | 1.47 | −0.88 | >14 | C | 0.81 | Comp. Ex. |
| 5 | B | 9 | A | 4 | 1.11% | 3.02 | −0.30 | >14 | C | 1.29 | The present invention |
| 6 | A | 18 | A | 2 | 1.09% | 3.05 | −0.28 | >14 | C | 1.29 | The present invention |
| 7 | A | 18 | B | 11 | 0.41% | 0.65 | 3.48 | >14 | C | 3.01 | The present invention |
| 8 | A | 18 | B | 14 | 0.23% | 1.60 | −0.90 | >14 | C | 3.40 | The present invention |
| 9 | A | 18 | A | 3 | 0.35% | 1.65 | −0.77 | >14 | C | 2.52 | The present invention |
| 10 | A | 18 | A | 3 | 0.34% | 1.66 | −0.75 | 10.3 | A | 2.53 | The present invention |
| 11 | A | 20 | A | 10 | 0.35% | 1.65 | −0.77 | >14 | C | 2.52 | The present invention |
| 12 | A | 25 | A | 3 | 0.35% | 1.65 | −0.77 | >14 | C | 2.52 | The present invention |
| 13 | A | 25 | A | 3 | 0.35% | 1.65 | −0.77 | >14 | C | 2.52 | The present invention |
| 14 | A | 22 | A | 3 | 0.35% | 1.65 | −0.77 | >14 | C | 2.52 | The present invention |
| 15 | A | 18 | A | 3 | 0.35% | 1.35 | −1.22 | 9.9 | A | 1.75 | The present invention |
| 16 | A | 25 | A | 3 | 0.35% | 1.35 | −1.22 | 9.9 | A | 1.75 | The present invention |
| 17 | D | 4 | D | >30 | 0.35% | 1.65 | −0.77 | >14 | C | 2.52 | Comp. Ex. |
| 18 | A | 9 | A | 4 | 1.52% | 1.89 | −0.66 | >14 | C | 0.83 | The present invention | the present invention, an antireflective film in which the fingerprint as a fouling component, if attached, was hardly noticeable by the eyes after wiping-off, the antifouling durability was excellent, the color difference ΔE due to 2.5% variation in the thickness of an arbitrary layer out of the low refractive index layer, the high refractive index layer, and the medium refractive index layer, with the designed film thickness was small, ΔE=1.75, which was remarkably smaller, as compared to the samples Nos. 9 to 14, and had high robust property against variation in the film thickness was obtained.

The contact angle of water and the surface free energy of the sample No. 1 were 90° and 30 dyne/cm, respectively. Further, the contact angle of water and the surface free energy of the sample No. 2 were 94° and 26 dyne/cm, respectively, and also, the contact angle of water and the surface free energy of the sample Nos. 9 to 15 were all 102° or more and 23 dyne/cm or less, respectively. In all of the samples having a contact angle of water and a surface free energy of 102° or more and 23 dyne/cm or less, respectively, an antireflective film having a preferably excellent fingerprint wiping-off property was obtained.

Among these, in the sample Nos. 12 to 14, and 16 using a compound having a perfluoropolyether structure, and also, a plurality of polymerizable unsaturated groups in one molecule as the fluorine-containing antifouling agent having a polymerizable unsaturated group, an antireflective film having an excellent fingerprint wiping-off property, in which a fingerprint can be completely wiped off with only three wipes of the film, and having an extremely excellent antifouling durability, was obtained.

Furthermore, in the sample No. 10, No. 15, and No. 16 added with a conductive inorganic oxide fine particle, an antireflective film which gave log SR≤12 and had an improved stain attachment inhibiting property was obtained.

Example 2

A phosphorous-containing tin oxide (PTO) dispersion (ELCOMJX-1001 PTV manufactured by Catalysts & Chemicals Industries Co., Ltd., and a mixture (DPHA) of dipentaerythritol pentaacrylate and dipentaerythritol hexaacrylate were appropriately mixed to prepare a coating solution G for a medium refractive index layer having a refractive index adjusted to 1.62.

In the sample No. 10 of Example 1, an antireflective film No. 19 was produced in the same manner, except that the coating solution G for a medium refractive index layer was used instead of the coating solution E for a medium refractive index layer.

The obtained film exhibited the performances of the scratch resistance, the reflectivity, the antifouling durability, the fingerprint wiping-off property, and the color difference with the variation in the film thickness, each of which was equivalent to that of the sample No. 10. In addition, an excellent film which had a Log SR as low as 10.5, and had a small stain attachment property, was obtained.

Example 3

(Preparation of Coating Solution for Low Refractive Index Layer)

Each of the components was mixed as shown in Table 4 below, and dissolved in methyl ethyl ketone to produce a coating solution for a low refractive index layer of a solid content concentration of 5% by mass.

TABLE 4

| | | | | | | | | | | |
|---|---|---|---|---|---|---|---|---|---|---|
| | | | | Coating solution composition | | | | | | |
| | | | | | | Antifouling agent | | | | |
| Coating solution No. | Content amount of P-1 | Polyfunctional monomer | | | | Weight average molecular weight | Content amount | Content amount of Irg. 127 | Content amount of dispersion A | Note |
| | | Kind | Content amount | Kind | Content amount | Kind | | | | |
| Ln13 | 15 | M1 | 20 | DPHA | 7 | d-5 | 1800 | 5 | 3 | 50 | The present invention |
| Ln14 | 15 | M1 | 20 | DPHA | 7 | d-6 | 3100 | 5 | 3 | 50 | The present invention |
| Ln15 | 15 | M1 | 20 | DPHA | 7 | d-7 | 53000 | 5 | 3 | 50 | The present invention |

The content amount of each component is represented by a ratio (% by mass) of the solid content of each component with respect to total solid content of the coating composition.

Each of the compounds used are shown below.
d-5: Perfluoropolyether-containing acrylate as described in the present specification (weight average molecule weight: 1800)
d-6: Perfluoropolyether-containing acrylate d-4 as described in the present specification, in which the average p of HFPO "$F(CF(CF_3)CF_2O)_pCF(CF_3)-$" is from 14 to 15 (weight average molecule weight: 1300)
d-7: Perfluoropolyether-containing acrylate d-4 as described in the present specification, in which the average p of HFPO "$F(CF(CF_3)CF_2O)_pCF(CF_3)-$" is from 27 to 28 (weight average molecule weight: 5300)

(Production of Antireflective Film)

The antireflective film samples Nos. 20 to 22 were produced in the same manner, except that Ln13 to 15 were used instead of the coating solution Ln6 for a low refractive index layer in the antireflection film sample No. 15.

(Evaluation of Antireflective Film)

All of the characteristics of the antireflective film were evaluated by the method as described in Example 1. Further, the white turbidity of the coated film was evaluated by the following method. The results are shown in Table 5.

(8) Evaluation of White Turbidity

An oily black ink was coated on the back side of the sample, and the white turbidity was evaluated by observation with the eyes under sunlight according to the following criteria.

A: No white turbidity is seen even when observed extremely carefully.

B: Weak white color tint is faintly seen when observed extremely carefully, but not a bothersome amount.

C: White turbidity is seen when observed extremely carefully, but not a bothersome amount.

D: Weak white turbidity is recognized on the entire film at a glance.

E: There is strong white turbidity recognizable on the entire film at a glance.

TABLE 5

| Sample No. | SW scratch resistance | Antifouling durability (number of times) | Fingerprint wiping-off property 1 | Fingerprint wiping-off property 2 | Average reflectivity | a* | b* | logSR | Stain attachment property | Color difference at variation in film thickness | White turbidity | Note |
|---|---|---|---|---|---|---|---|---|---|---|---|---|
| 20 | A | 28 | A | 3 | 0.35% | 1.35 | −1.22 | 9.9 | A | 1.75 | A | The present invention |
| 21 | A | 15 | A | 3 | 0.35% | 1.35 | −1.22 | 9.9 | A | 1.75 | B | The present invention |
| 22 | A | 23 | A | 5 | 0.32% | 1.33 | −1.25 | 9.9 | A | 1.75 | D | The present invention |

From Table 5, it could be confirmed that by using one having a weight average molecular weight of less than 5000 as a fluorine-containing antifouling agent having a polymerizable unsaturated group, a film having good steal wool scratch resistance (SW scratch resistance), antifouling durability, antifouling wiping-off property, and white turbidity can be obtained.

Example 4

(Preparation of Coating Solution for Low Refractive Index Layer)

By mixing the components as in Table 6, and dissolving them in methyl ethyl ketone, a coating solution for a low refractive index layer having a solid content of 5% was prepared.

tional monomer FM-6 as described above, and used (fluorine content: 55.1%, trifunctional).

X-1: The compound X-1 as described above (FM-6) was synthesized in the following manner.

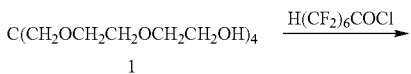

$$C(CH_2OCH_2CH_2OCH_2CH_2OH)_4 \xrightarrow{H(CF_2)_6COCl}$$
1

-continued

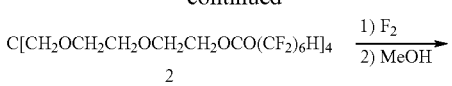

$$C[CH_2OCH_2CH_2OCH_2CH_2OCO(CF_2)_6H]_4 \xrightarrow[\text{2) MeOH}]{\text{1) } F_2}$$
2

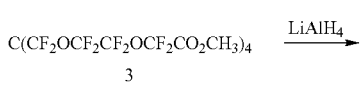

$$C(CF_2OCF_2CF_2OCF_2CO_2CH_3)_4 \xrightarrow{LiAlH_4}$$
3

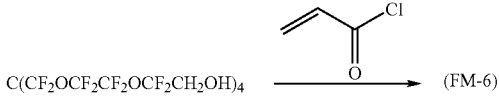

$$C(CF_2OCF_2CF_2OCF_2CH_2OH)_4 \longrightarrow \text{(FM-6)}$$
4

TABLE 6

| | | Coating Solution Composition | | | | | | | | | | |
|---|---|---|---|---|---|---|---|---|---|---|---|---|
| | | Polyfunctional Monomer (1) | | | | Polyfunctional Monomer (2) | | Antifouling agent | | | Content amount of hollow | | |
| Coating solution No. | Content amount of P-1 | Kind | Intercrosslink molecular weight | Number of functional group | Content amount | Kind | Content amount | Kind | Content amount | Irg. 127 content | silica dispersion A | Refractive index | Note |
| Ln13 | 15 | M1 | 212 | 4 | 20 | DPHA | 7 | d-5 | 5 | 3 | 50 | 1.36 | The present invention |
| Ln16 | 15 | FM-6 | 290 | 4 | 20 | DPHA | 7 | d-5 | 5 | 3 | 50 | 1.36 | The present invention |
| Ln17 | 15 | FM-7 | 522 | 3 | 20 | DPHA | 7 | d-5 | 5 | 3 | 50 | 1.357 | The present invention |
| Ln18 | 15 | X-1 | 416 | 2 | 20 | DPHA | 7 | d-5 | 5 | 3 | 50 | 1.357 | The present invention |

The content amount of each component is represented by a ratio (% by mass) of the solid content of each component with respect to total solid content of the coating composition.

Each of the compounds used are shown below.

FM-6: Fluorine-containing polyfunctional monomer as described above (fluorine content: 47.5%, tetrafunctional)

FM-7: The compound was synthesized by the same method as for the synthesis of the fluorine-containing polyfunc- Synthesis of Compound 2

While keeping the temperature at 20° C. or lower, 7H-dodecafluoropentanoyl chloride (321 g, 0.88 mol) was added dropwise to an ethyl acetate (1.5 L) solution containing pyridine (77.6 ml, 0.96 mol) and Compound 1 (97.7 g, 0.2 mol) synthesized by a method known in publications (for example, Eur. J. Ord. Chem., 485-490 (2000)). After the dropwise addition, the reaction solution was stirred at room temperature for 6 hours, and insoluble matters were removed by filtration. The filtrate was washed twice with sodium bicarbonate water (1.5 L) and twice further with saturated brine (1.5 L). The organic layer was dried over magnesium sulfate and concentrated under reduced pressure. The concentrate was purified by column chromatography (developing solvent: ethyl acetate/hexane=1/3) to obtain Compound 2 (306 g, 0.17 mol).

Synthesis of Compound 3

Into a 1000 ml-volume Teflon-made reaction vessel, sodium fluoride (54.2 g, 1.29 mol) and perfluorohexane (700 ml) were charged and kept at −10° C. At the outlet of the reaction vessel, a refluxing device kept at −50° C. or less was disposed. A nitrogen gas was blown into the reaction vessel at a rate of 200 ml/min for 1 hour and then, a fluorine gas diluted with nitrogen gas to 20% (hereinafter simply referred to as a fluorine gas) was blown thereinto at a rate of 250 ml/min for 30 minutes. While blowing a fluorine gas at the same rate, a mixed solution of Compound 2 (30 g, 16.7 mol) and hexafluorobenzene (5 g, 26.9 mol) was added over 5 hours and furthermore, while blowing a fluorine gas at the same rate, a perfluorohexane (10 ml) solution of hexafluorobenzene (2.0 g) was added over 1 hour and 30 minutes. A fluorine gas was further blown into the reaction vessel at a rate of 250 ml/min for 30 minutes, and a nitrogen gas was then blown at a rate of 200 ml/min for 1 hour. Subsequently, 100 ml of methanol was added to the reaction solution and the resulting solution was stirred at room temperature for 1 hour. After removing insoluble matters by filtration, the filtrate was concentrated under reduced pressure and low-boiling-point components were further removed by a vacuum pump (room temperature, 2 mmHg) to obtain 16.5 g of a concentrate. This concentrate was confirmed by NMR to be a mixture mainly comprising Compound 3 and was used in the next step without performing any further purification.

Synthesis of Compound 4

A diethyl ether (100 ml) solution of the concentrate above (16.5 g) was added dropwise to a diethyl ether (450 ml) dispersion of lithium aluminum hydride (5.43 g, 0.143 mol) at 5° C. in a nitrogen atmosphere. After stirring the reaction solution at room temperature for 5 hours, ice water (700 g) was slowly added with care so as not to cause effervescence and hydrochloric acid (48 ml) was further added dropwise. Insoluble matters were removed by Celite filtration and then, liquid separation was performed. The organic layer was washed with water and then with saturated brine (400 ml) and dried over magnesium sulfate. This organic layer was concentrated under reduced pressure and further purified by column chromatography (developing solvent: dichloromethane/ethanol=10/1) to obtain Compound 4 (9.1 g, 8.56 mmol).

Synthesis of Compound (FM-6)

Acrylic acid chloride (7.2 g, 79.5 mmol) was added dropwise to an acetonitrile (400 ml) dispersion of Compound 4 (9.1 g, 8.56 mmol) and potassium carbonate (32.9 g, 0.238 mol) at room temperature. The reaction solution was stirred at room temperature for 4 hours and then slowly charged into ethyl acetate (1 L)/1N aqueous hydrochloric acid (1 L). The organic layer was washed once with each of sodium bicarbonate water, water and saturated brine and dried over magnesium sulfate. The resulting organic layer was concentrated under reduced pressure and purified by column chromatography (developing solvent: ethyl acetate/hexane=1/5) to obtain Compound (MF-6) (8.5 g, 6.64 mmol).

(Production of Antireflective Film)

The antireflection film samples Nos. 23 to 25 were produced in the same manner, except that Ln16 to 18 were used instead of the coating solution Ln6 for a low refractive index layer respectively in the antireflection film sample No. 15.

(Evaluation of Antireflective Film)

All of the characteristics of the antireflective film were evaluated by the method as described in Example 1.

TABLE 7

| Sample No. | SW scratch resistance | Antifouling durability (number of times) | Fingerprint wiping-off property1 | Fingerprint wiping-off property2 | Average reflectivity | a* | b* | logSR | Stain attachment property | Color difference at variation in film thickness | Note |
|---|---|---|---|---|---|---|---|---|---|---|---|
| 20 | A | 28 | A | 3 | 0.35% | 1.35 | −1.22 | 9.9 | A | 1.75 | The present invention |
| 23 | A | 26 | A | 3 | 0.35% | 1.34 | −1.22 | 9.9 | A | 1.75 | The present invention |
| 24 | B | 15 | A | 3 | 0.33% | 1.37 | −1.18 | 9.9 | A | 1.75 | The present invention |
| 25 | C | 10 | A | 3 | 0.35% | 1.34 | −1.22 | 9.9 | A | 1.75 | The present invention |

From Table 7, it could be confirmed that a coated film having an excellent antifouling wiping-off property, a particularly excellent scratch resistance SW and antifouling durability was obtained by using a monomer having 3 or more functional groups, containing 35% by weight or more of fluorine, and having a calculated value of the entire intercrosslink molecular weight of less than 500.

The antireflective film according to the present invention is easy to wipe off fat and oil components such as those from a fingerprint, a sebaceous oil, and the like, if attached, with a low reflectivity, and it achieves excellent scratch resistance. Further, by using the polyfunctional monomer having a polymerizable unsaturated group, in particular, a polyfunctional monomer containing fluorine and having a calculated value of an intercrosslink molecular weight of less than 500 in combination, an antireflective film having improved scratch resistance as well as excellent antifouling durability can be obtained.

Further, it is possible to use a multi-layer type antireflective film in order to further reduce the reflectivity, but in hitherto known constructions, if a fingerprint or a sebaceous oil is attached on the surface of a coated film, even when it is wiped off, some residue of the fat and oil components, if any, remains, as a change in the color tints of the attachment trace, more than a mono-layer from the change in the refractive index and reduces the perceivability of the image. Thus, by allowing the antireflective film to have a configuration in which a medium refractive index layer, a high refractive index layer, and a low refractive index layer are laminated on a transparent support in this order from the side of the transparent support, the medium refractive index layer has a refractive index at a wavelength of 550 nm of 1.60 to 1.65 and a thickness of 50.0 nm to 70.0 nm, the high refractive index layer has a refractive index at a wavelength of 550 nm of 1.70 to 1.74 and a thickness of 90.0 nm to 115.0 nm, and the low refractive index layer has a refractive index at a wavelength of 550 nm of 1.33 to 1.38 and a thickness of 85.0 nm to 95.0 nm, an antireflective film, wherein although it is of a multi-layer type, the reflection color is neutral, a fingerprint or a sebaceous oil, if attached on the surface of a coated film, is easily wiped off, and also, the film is hardly visible by the eyes, can be obtained.

By using a fluorine-containing copolymer having a polymerizable unsaturated group, an inorganic fine particle, a fluorine-containing antifouling agent having a polymerizable unsaturated group, and a polyfunctional monomer having a polymerizable unsaturated group, particularly a polyfunctional monomer containing fluorine and having a calculated value of an intercrosslink molecular weight of less than 500 in combination, and also, by combining the above-described construction of the layers, an antireflective film which has an excellent antifouling property and scratch resistance and has a neutral color tint in spite of an extremely low reflectivity, can be obtained.

An antireflective film, which has a good property concerning stain attachment while not deteriorating the antstatic property even the use of a fluorine-containing antifouling agent, can be obtained by allowing the medium refractive index layer or the high refractive index layer to contain a conductive inorganic fine particle.

The entire disclosure of each and every foreign patent application from which the benefit of foreign priority has been claimed in the present application is incorporated herein by reference, as if fully set forth.

What is claimed is:

1. An antireflective film, comprising:
   a transparent support; and
   at least one low refractive index layer,
   wherein the low refractive index layer is formed from a composition containing the following (A) to (C):
   (A) a fluorine-containing antifouling agent having at least one polymerizable unsaturated group;
   (B) a fluorine-containing copolymer having at least one polymerizable unsaturated group; and
   (C) inorganic fine particles,
   the fluorine-containing antifouling agent having a polymerizable unsaturated group (A) has a weight average molecular weight of 400 or more and less than 5000, and
   the fluorine-containing antifouling agent having a polymerizable unsaturated group (A) is represented by Formula (F):

(Rf$^1$)—[(W)—(R$_A$)$_n$]$_m$  Formula (F)

wherein Rf represents a (per)fluoroalkyl group or a (per)fluoropolyether group, W represents a single bond or a linking group, R$_A$ represents a functional group having an unsaturated double bond, n represents an integer of 1 to 3, and m represents an integer of 1 to 3;
   wherein the composition further contains a polyfunctional monomer having 3 or more polymerizable unsaturated groups (D) represented by formula limitation (2), (3), (4), or (5):

Rf$^2$—{CH$_2$—OC(O)CH=CH$_2$}$_n$  formula (2)

Rf$^2$—{C(O)OCH=CH$_2$}$_n$  formula (3)

Rf$^{21}$—{Rf$^{22}$—CH$_2$—OC(O)CH=CH$_2$}$_n$  formula (4)

Rf$^{21}$—{Rf$^{22}$—C(O)OCH=CH$_2$}$_n$  formula (5)

wherein Rf$^2$ represents an n-valent group consisting of a carbon atom(s) and a fluorine atom(s), or an n-valent group consisting of a carbon atom(s), a fluorine atom(s) and an oxygen atom(s);
   Rf$^{21}$ represents an n-valent group having at least a carbon atom and a fluorine atom;
   Rf$^{22}$ represents a divalent group having at least a carbon atom and a fluorine atom;
   and n represents an integer of 3 or more,
   wherein the polyfunctional monomer contains 35% by weight or more of fluorine and has a calculated value of entire intercrosslink molecular weight of less than 500.

2. The antireflective film according to claim 1,
   wherein the fluorine-containing antifouling agent having a polymerizable unsaturated group (A) has a perfluoropolyether structure, and R$_A$ represents a plurality of polymerizable unsaturated groups in one molecule of the fluorine-containing antifouling agent.

3. The antireflective film according to claim 2, wherein the plurality of polymerizable unsaturated groups is four or more and 9 or less.

4. The antireflective film according to claim 1,
   wherein the fluorine-containing copolymer having a polymerizable unsaturated group (B) has a weight average molecular weight of 5000 or more and less than 500000.

5. The antireflective film according to claim 1,
   wherein the inorganic fine particles (C) are hollow silica particles.

6. The antireflective film according to claim 1,
   wherein color tint of regular reflecting light for incident light at an angle of 5° of a CIE standard light source D65 in a wavelength region from 380 to 780 nm satisfies following conditions that a* value and b* value in CIE1976 L*a*b* color space are in ranges of 0≤a*≤8 and −10≤b*≤0, respectively, and within this color tint variation range, a color difference ΔE due to 2.5% variation in a thickness of an arbitrary layer out of the layers contained in the antireflective film falls in a range of equation (5):

Δ9E={(L*−L*')$^2$+(a*−a*')$^2$+(b*−b*')$^2$}$^{1/2}$≤3  equation (5)

wherein L*', a*', and b*' are color tints of reflected light at a designed film thickness.

7. The antireflective film according to claim 1, further comprising:
   a medium refractive index layer and a high refractive index layer, the antireflective film comprising the medium refractive index layer, the high refractive index layer, and the low refractive index layer in this order from a side of the transparent support,
   wherein the medium refractive index layer has a refractive index at a wavelength of 550 nm of 1.60 to 1.65 and a thickness of 50.0 nm to 70.0 nm,
   the high refractive index layer has a refractive index at a wavelength of 550 nm of 1.70 to 1.74 and a thickness of 90.0 nm to 115.0 nm, and
   the low refractive index layer has a refractive index at a wavelength of 550 nm of 1.33 to 1.38 and a thickness of 85.0 nm to 95.0 nm.

8. The antireflective film according to claim 7,
   wherein at least one of the medium refractive index layer and the high refractive index layer contains conductive inorganic fine particles.

9. The antireflective film according to claim 8,
wherein the conductive inorganic fine particles contain at least one metal oxide selected from the group consisting of tin-doped indium oxide, antimony-doped tin oxide, fluorine-doped tin oxide, phosphorous-doped tin oxide, zinc antimonate, indium-doped zinc oxide, zinc oxide, ruthenium oxide, rhenium oxide, silver oxide, nickel oxide, and copper oxide.

10. The antireflective film according to claim 1, wherein a content of the component (A) is 1 to 15% by mass, a content of the component (B) is 5-70% by mass, a content of the component (C) is 10-70% by mass, and a content of the component (D) is 5-60% by mass, with respect to a total solid component in the composition.

11. A polarizing plate, comprising:
a polarizing film; and
two protective films that protect both sides of the polarizing film,
wherein at least one of the two protective films is the antireflective film according to claim 1.

12. An image display device, comprising:
a display; and
the antireflective film according to claim 1 provided at an outermost surface of the display.

13. An antireflecfive film, comprising:
a transparent support; and
at least one low refractive index layer,
wherein the low refractive index layer is formed from a composition containing the following (A) to (C):
(A) a fluorine-containing antifouling agent having at least one polymerizable unsaturated group;
(B) a fluorine-containing copolymer having at least one polymerizable unsaturated group; and
(C) inorganic fine particles,
wherein the fluorine-containing antifouling agent having a polymerizable unsaturated group (A) has at least one perfluoroalkyl group or perfluoroether group,
wherein the composition further contains a polyfunctional monomer having 3 or more polymerizable unsaturated groups (D) represented by formula (2), (3), (4), or (5);

 formula (2)

 formula (3)

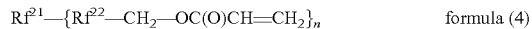 formula (4)

 formula (5)

wherein $Rf^2$ represents an n-valent group consisting of a carbon atom(s) and a fluorine atom(s), or an n-valent group consisting of a carbon atom(s), a fluorine atom(s) and an oxygen atom(s); $Rf^{21}$ represents an n-valent group having at least a carbon atom and a fluorine atom; $Rf^{22}$ represents a divalent group having at least a carbon atom and a fluorine atom; and n represents an integer of 3 or more, and
wherein the polyfunctional monomer contains 35% by weight or more of fluorine and has a calculated value of entire intercrosslink molecular weight of less than 500.

14. The antireflective film according to claim 13,
wherein the fluorine-containing antifouling agent having a polymerizable unsaturated group (A) has a weight average molecular weight of 400 or more and less than 5000.

15. The antireflective film according claim 13, wherein a content of the component (A) is 1 to 15% by mass, a content of the component (B) is 5-70% by mass, a content of the component (C) is 10-70% by mass, and a content of the component (D) is 5-60% by mass, with respect to a total solid component in the composition.

16. The antireflective film according to claim 13, wherein the polymerizabie unsaturated group is a methacryloyloxy group or an acryloyloxy group.

17. A polarizing plate, comprising:
a polarizing film; and
two protective films that protect both sides of the polarizing film,
wherein at least one of the two protective films is the antireflective film according to claim 13.

18. An image display device, comprising:
a display; and
the antireflective film according to claim 13 provided at an outermost surface of the display.

* * * * *